United States Patent [19]
Phillips

[11] Patent Number: 5,682,745
[45] Date of Patent: Nov. 4, 1997

[54] BOOTSTRAP POWER STEERING SYSTEMS

[75] Inventor: Edward H. Phillips, Troy, Mich.

[73] Assignee: Techco Corporation, Southfield, Mich.

[21] Appl. No.: 541,286

[22] Filed: Oct. 10, 1995

Related U.S. Application Data

[63] Continuation of Ser. No. 119,281, Sep. 9, 1993, abandoned, which is a continuation-in-part of Ser. No. 99,167, Jul. 29, 1993, Pat. No. 5,435,698.

[51] Int. Cl.[6] ............................................. F15B 9/02
[52] U.S. Cl. ........................ 60/431; 60/450; 60/468; 91/375 A
[58] Field of Search .................. 91/375 A, 451; 60/431, 450, 468

[56] References Cited

U.S. PATENT DOCUMENTS

| | | | |
|---|---|---|---|
| 4,139,021 | 2/1979 | Ailshie et al. | 137/596.13 |
| 5,249,420 | 10/1993 | Phillips | 91/375 A X |
| 5,305,604 | 4/1994 | Phillips | 60/450 |

Primary Examiner—Gerald A. Michalsky
Attorney, Agent, or Firm—Gifford, Krass, Groh, Sprinkle, Patmore, Anderson & Citkowski, P.C.

[57] ABSTRACT

Methods and devices for enabling simplified bootstrap hydraulic systems for use in bootstrap hydromechanical and electrohydraulic vehicular power steering systems are disclosed. A simplified bootstrap control valve is provided wherein the control valve's load circuit is not interdicted in any way. The simplified bootstrap control valve comprises a four-way control valve having input slots formed in an open-center manner, intermediate slots formed in an open-center manner, return slots formed in a closed-center manner, and a passage for picking off the pressure value present in the intermediate slots. The pressure value present in the intermediate slots is utilized for regulating pumping apparatus providing fluid to the simplified bootstrap control valve such that pressure value present in the intermediate slots is substantially maintained at a preselected value. A simplified servo motor-positive displacement pump assembly of integrated construction is also provided. The simplified servo motor-positive displacement pump assembly includes a common central housing and a quill drive.

6 Claims, 50 Drawing Sheets

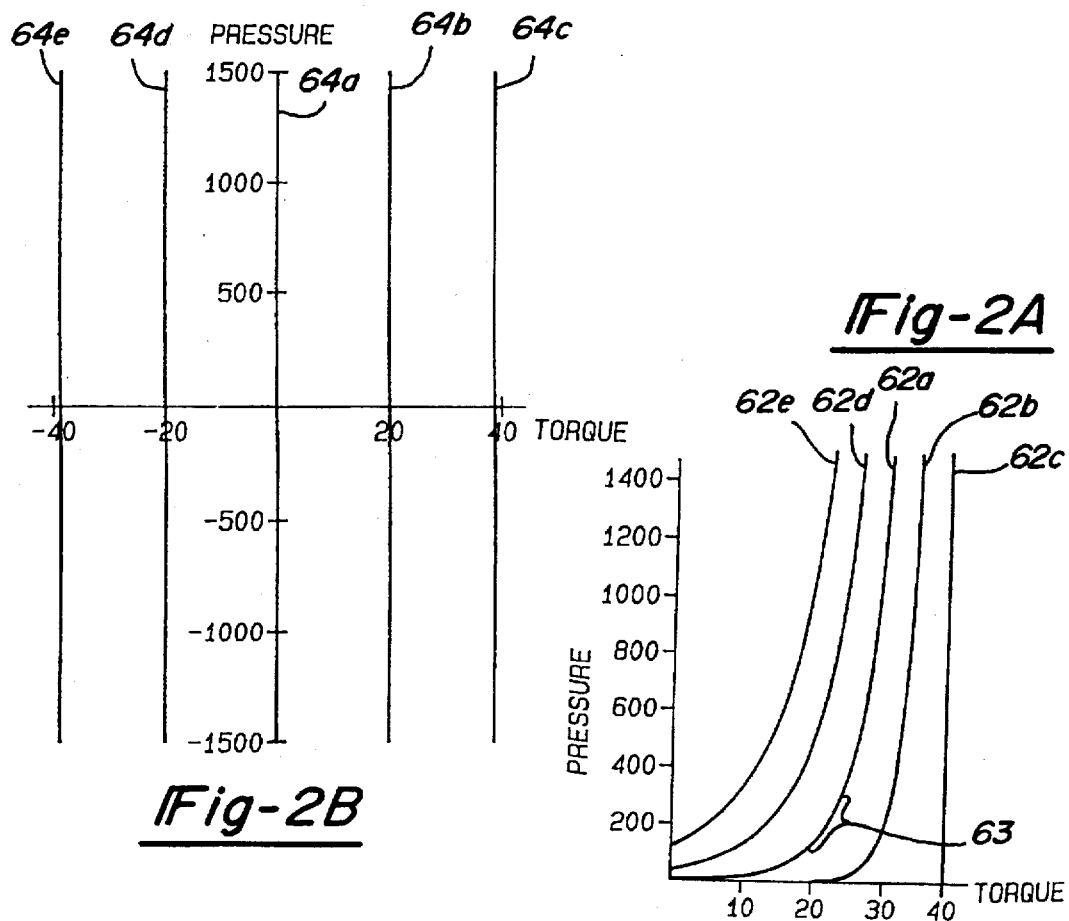
*Fig-2A*
*Fig-2B*
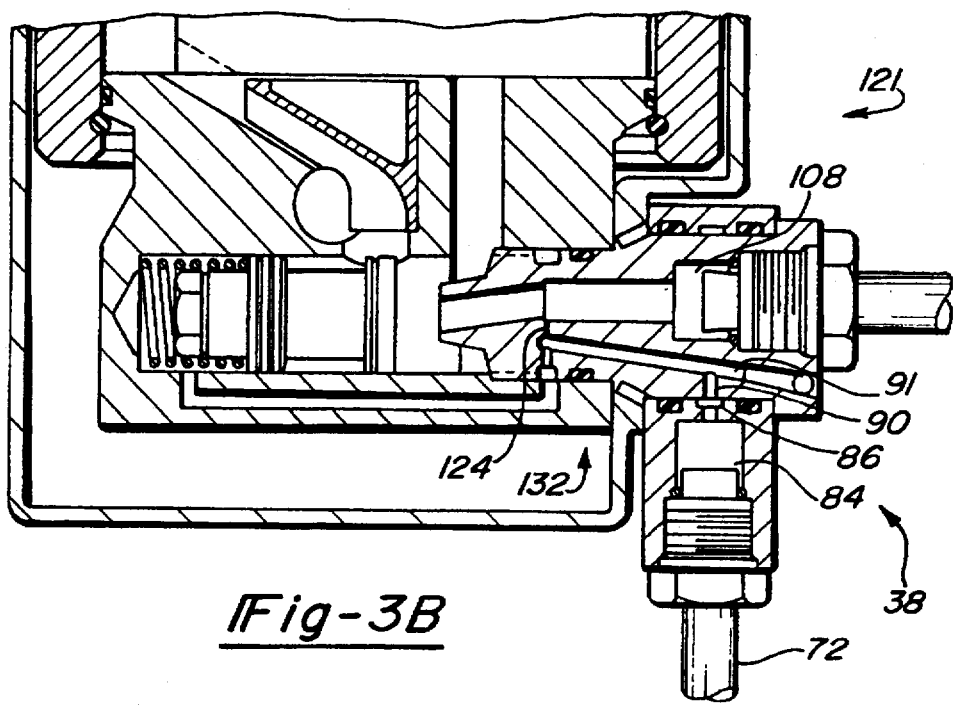
*Fig-3B*

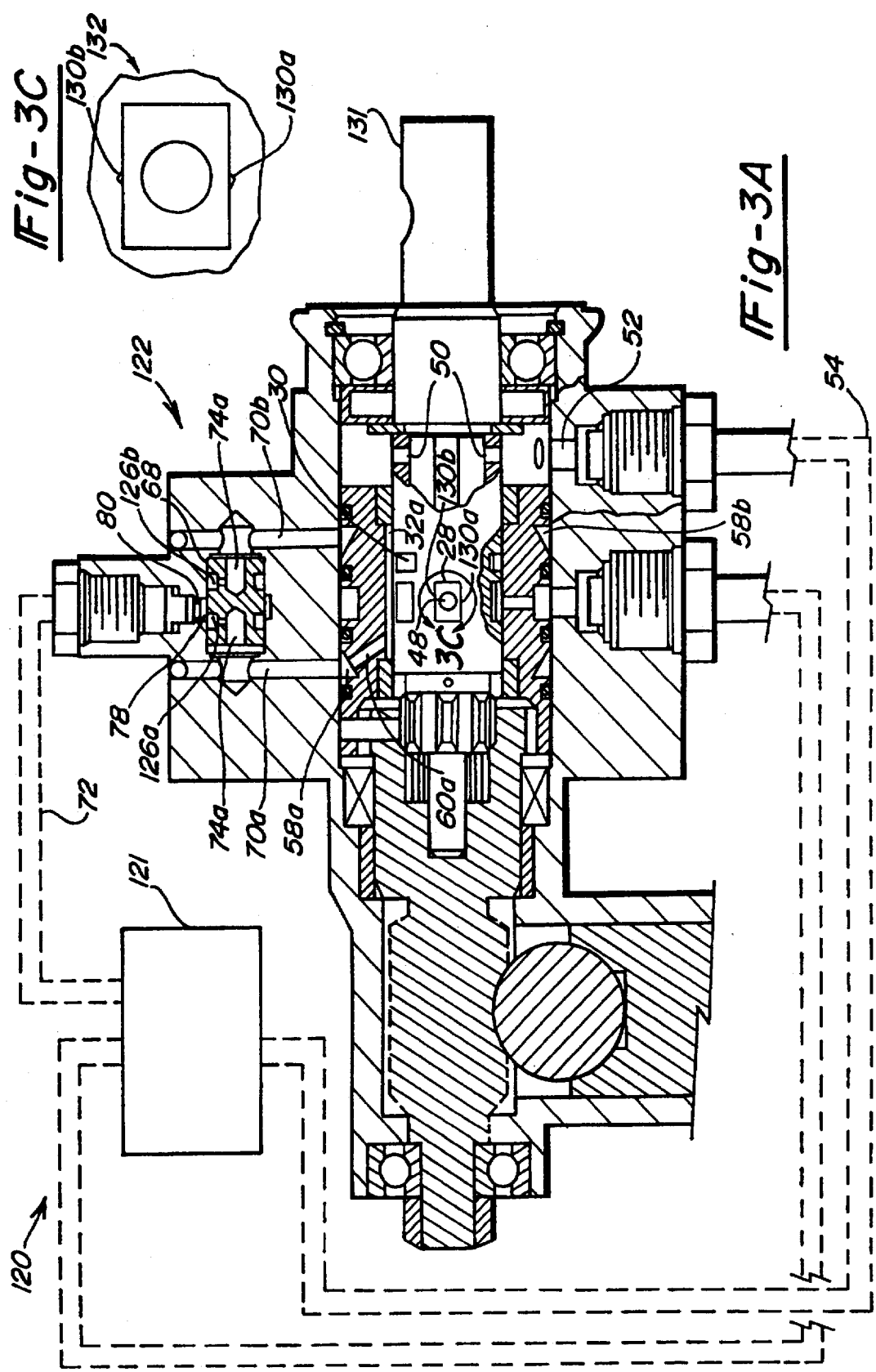

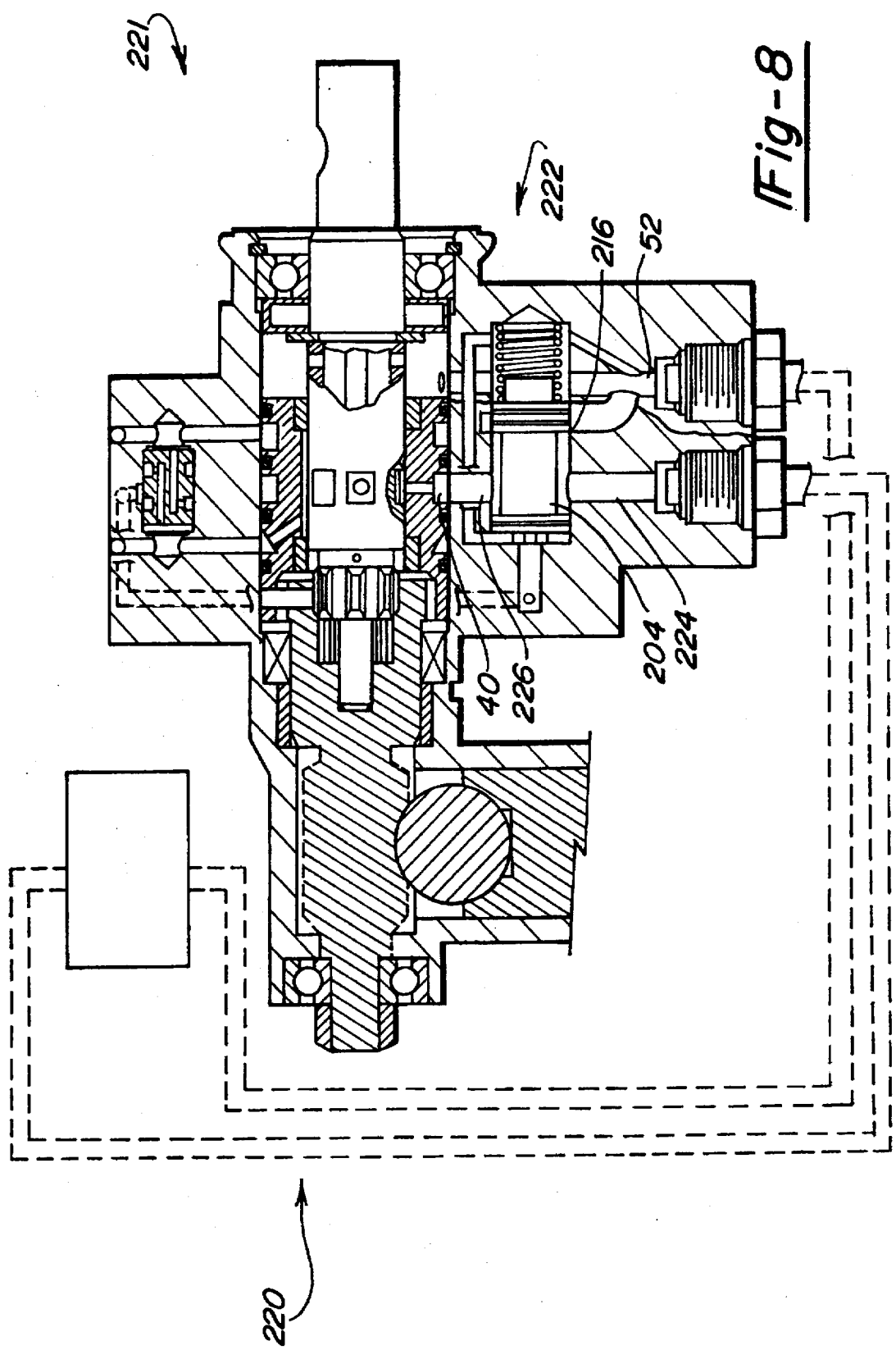

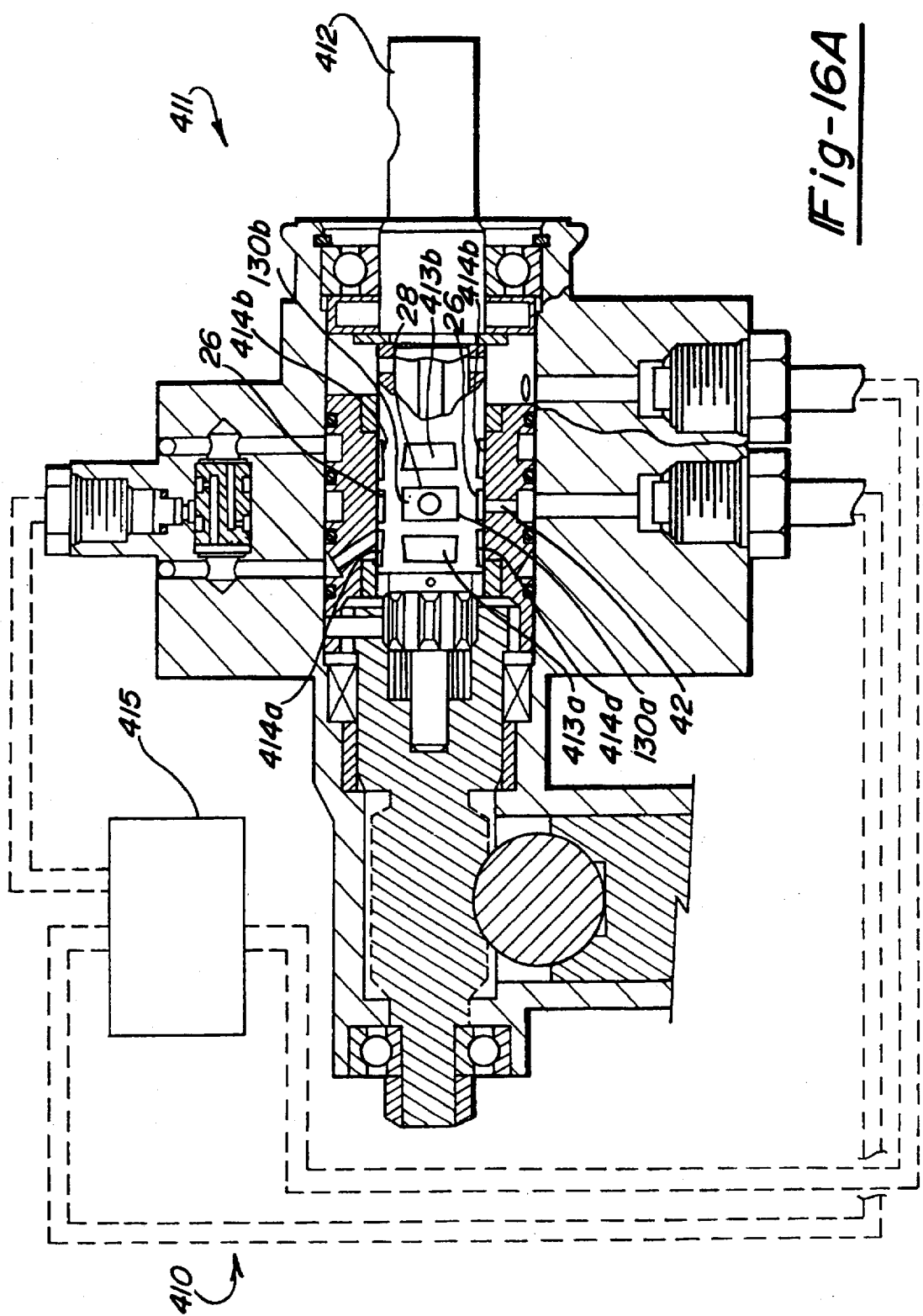

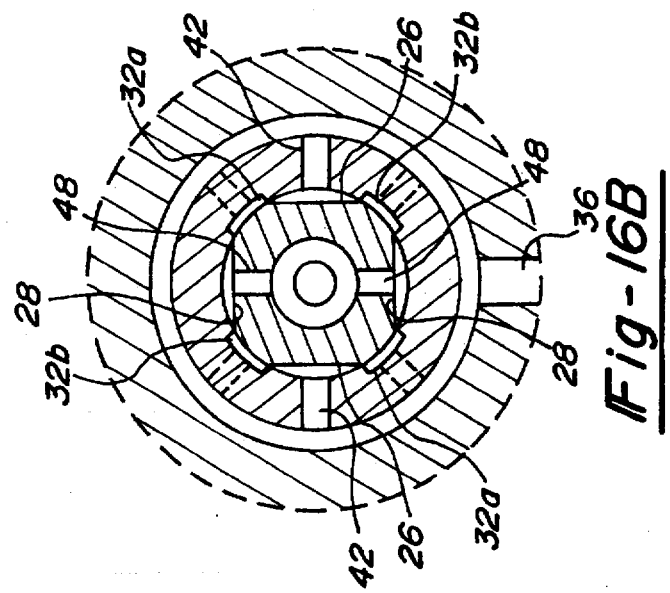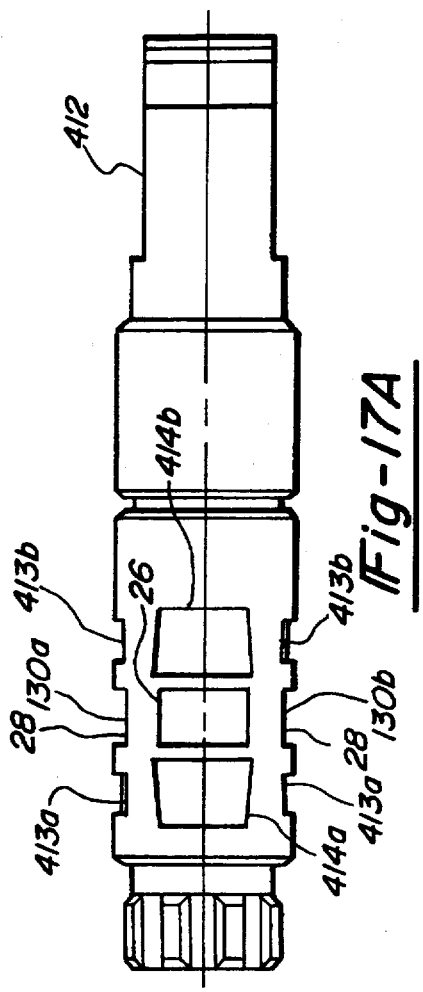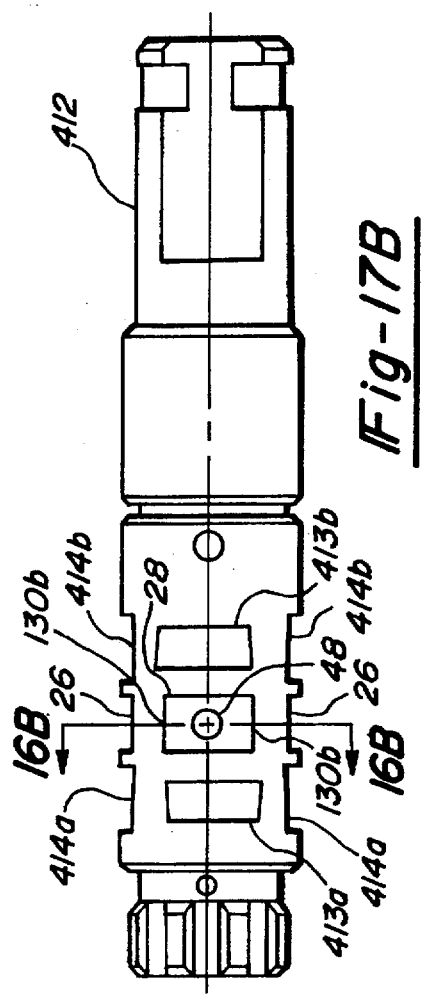

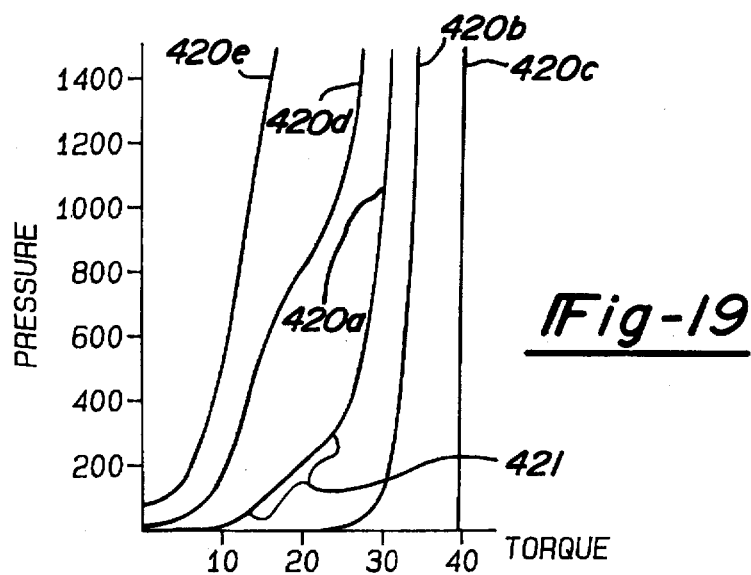
*Fig-19*
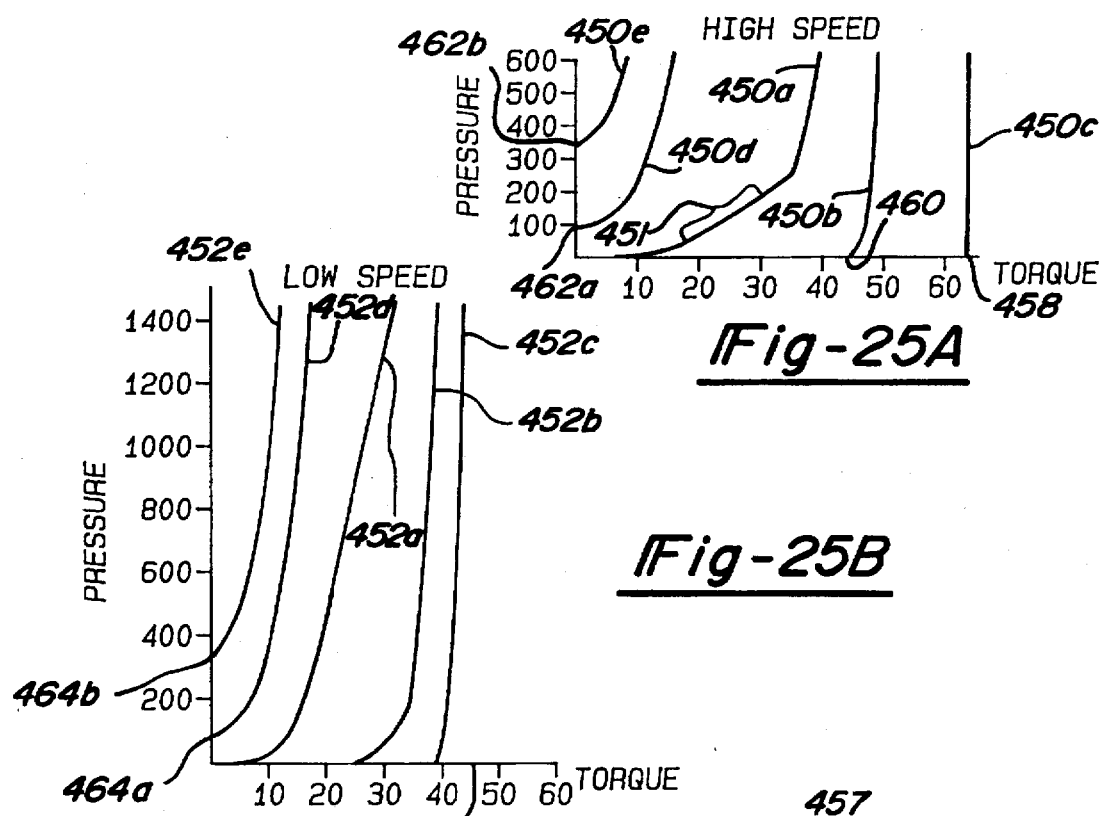
*Fig-25A*
*Fig-25B*
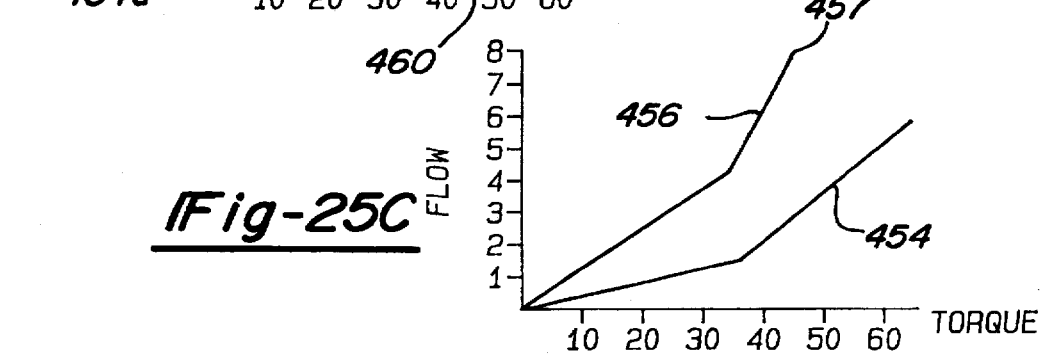
*Fig-25C*

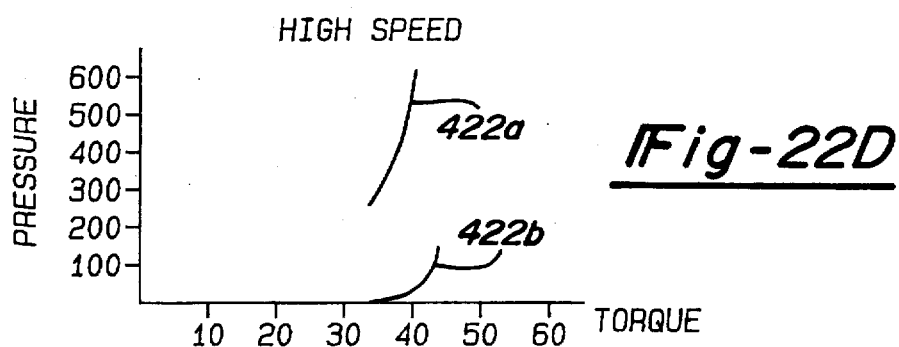
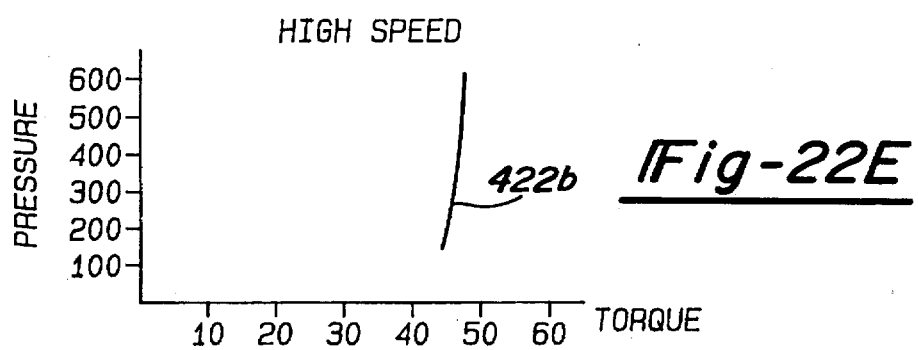
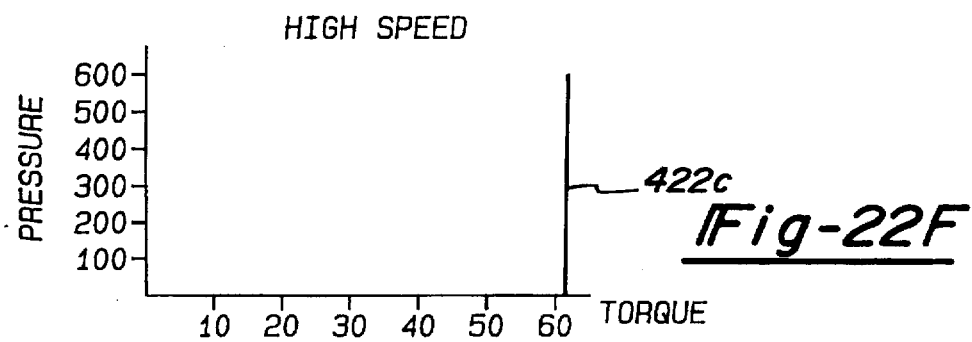
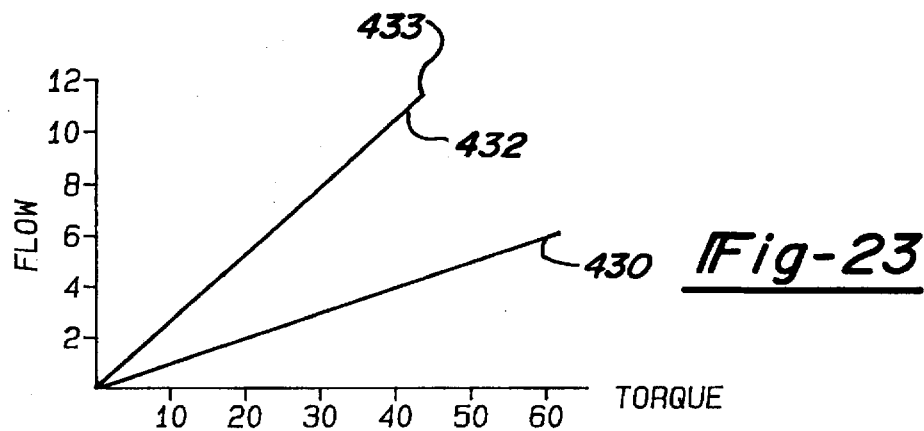

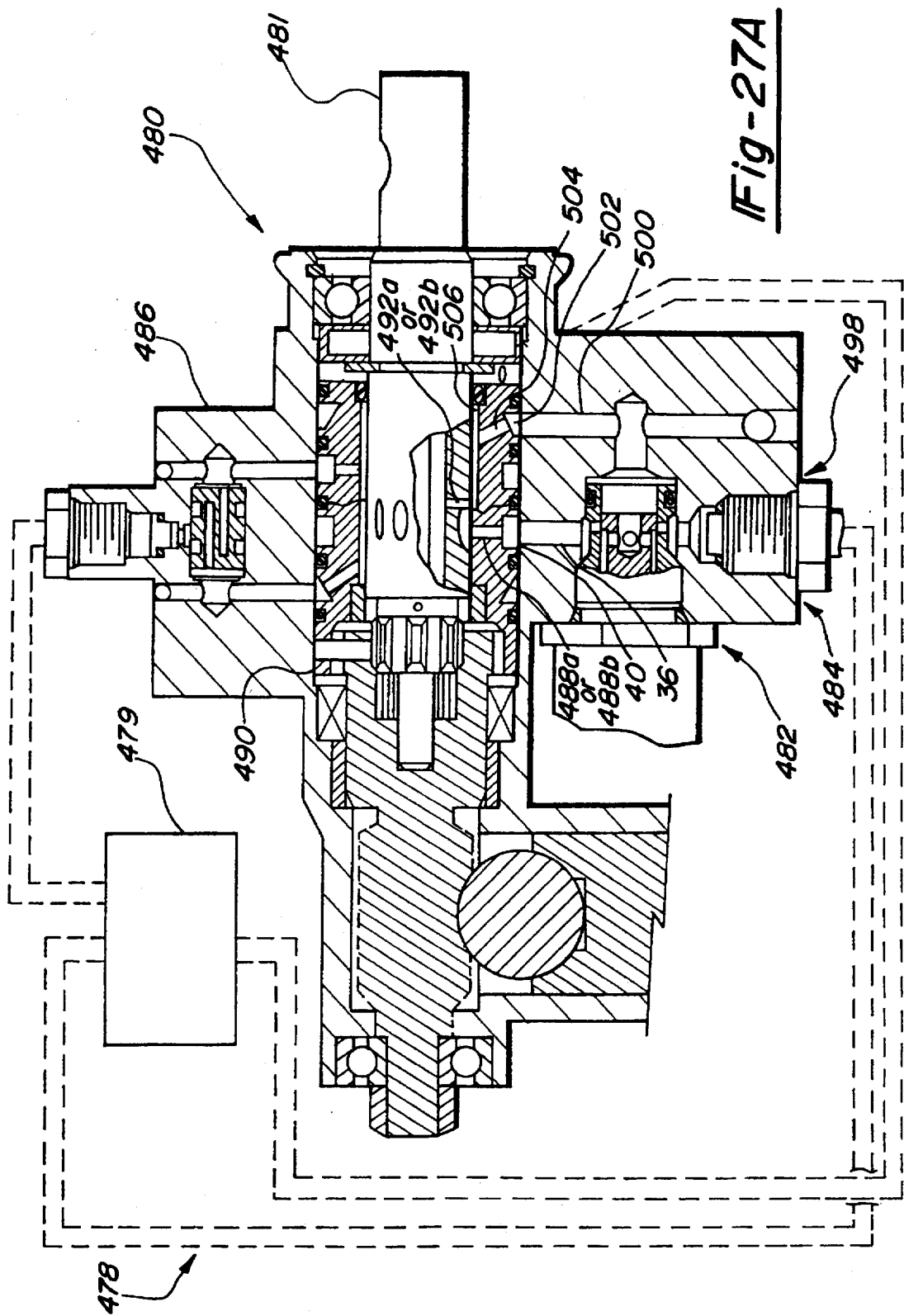

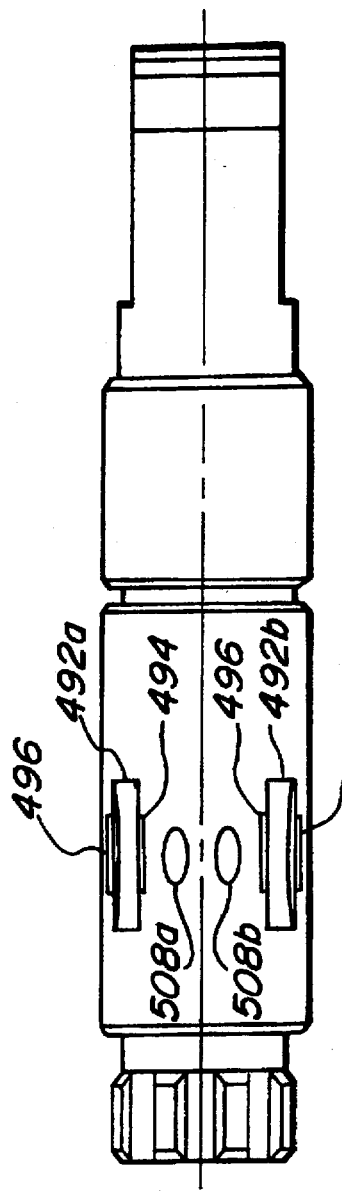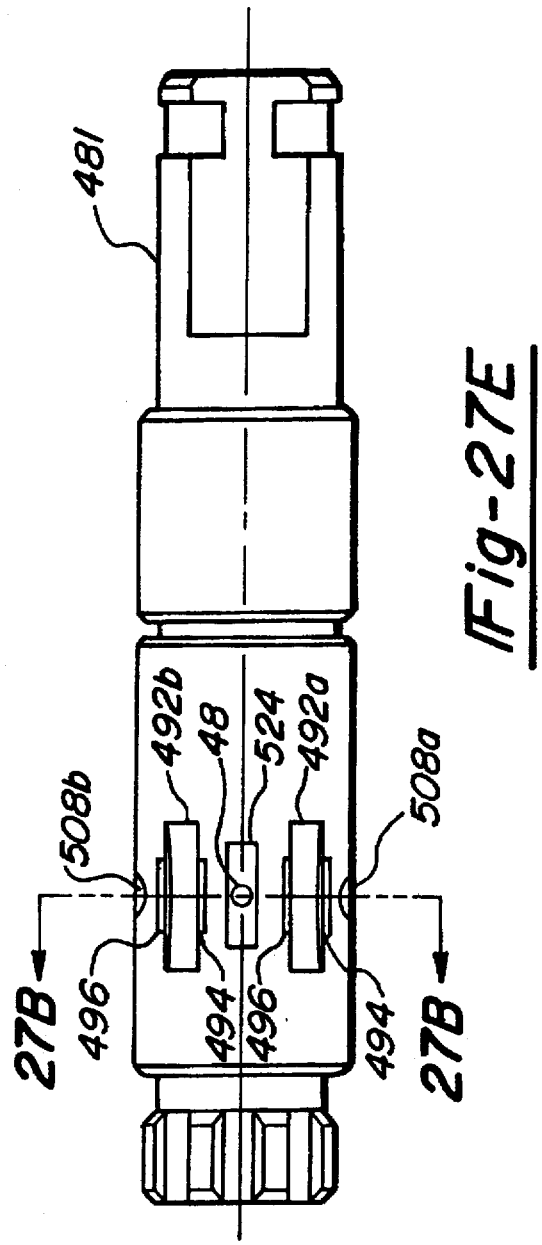

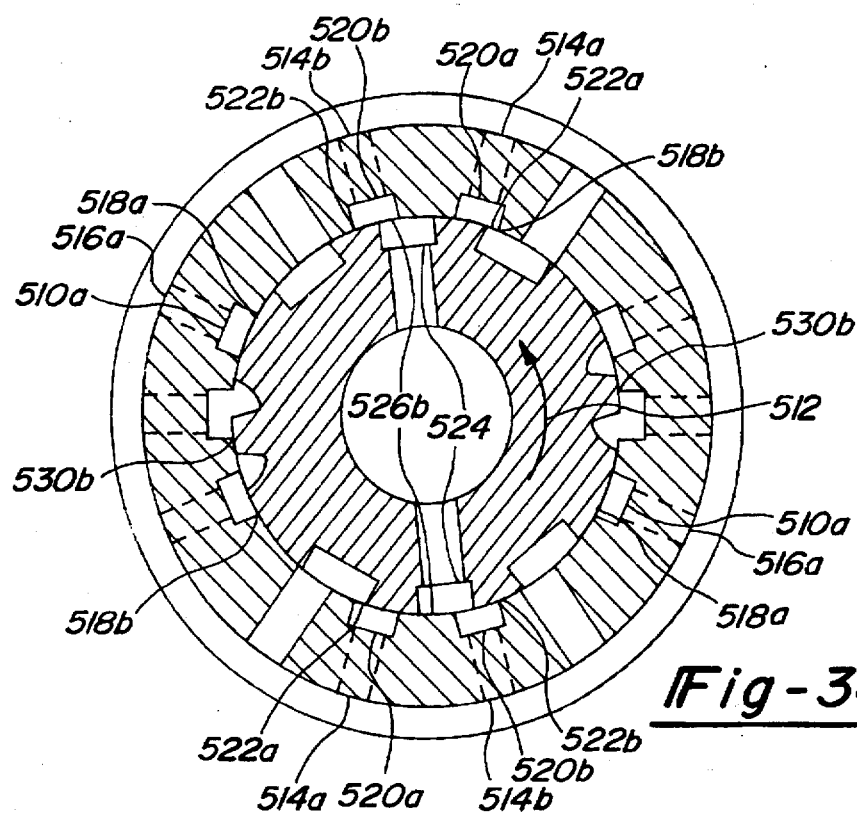
*Fig-30D*
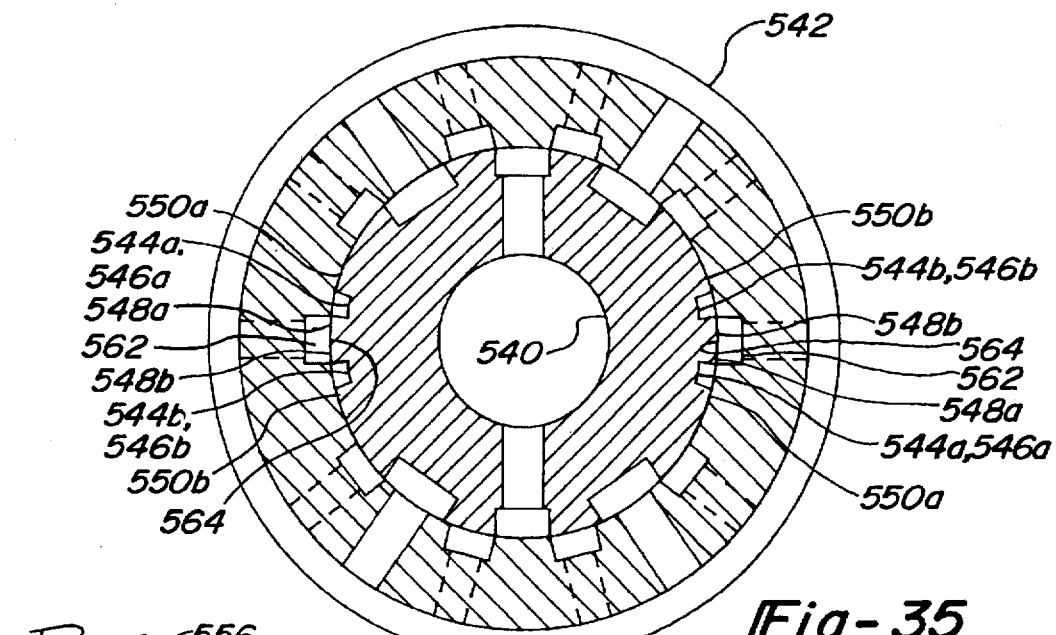
*Fig-35*
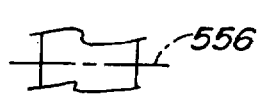
*Fig-36*

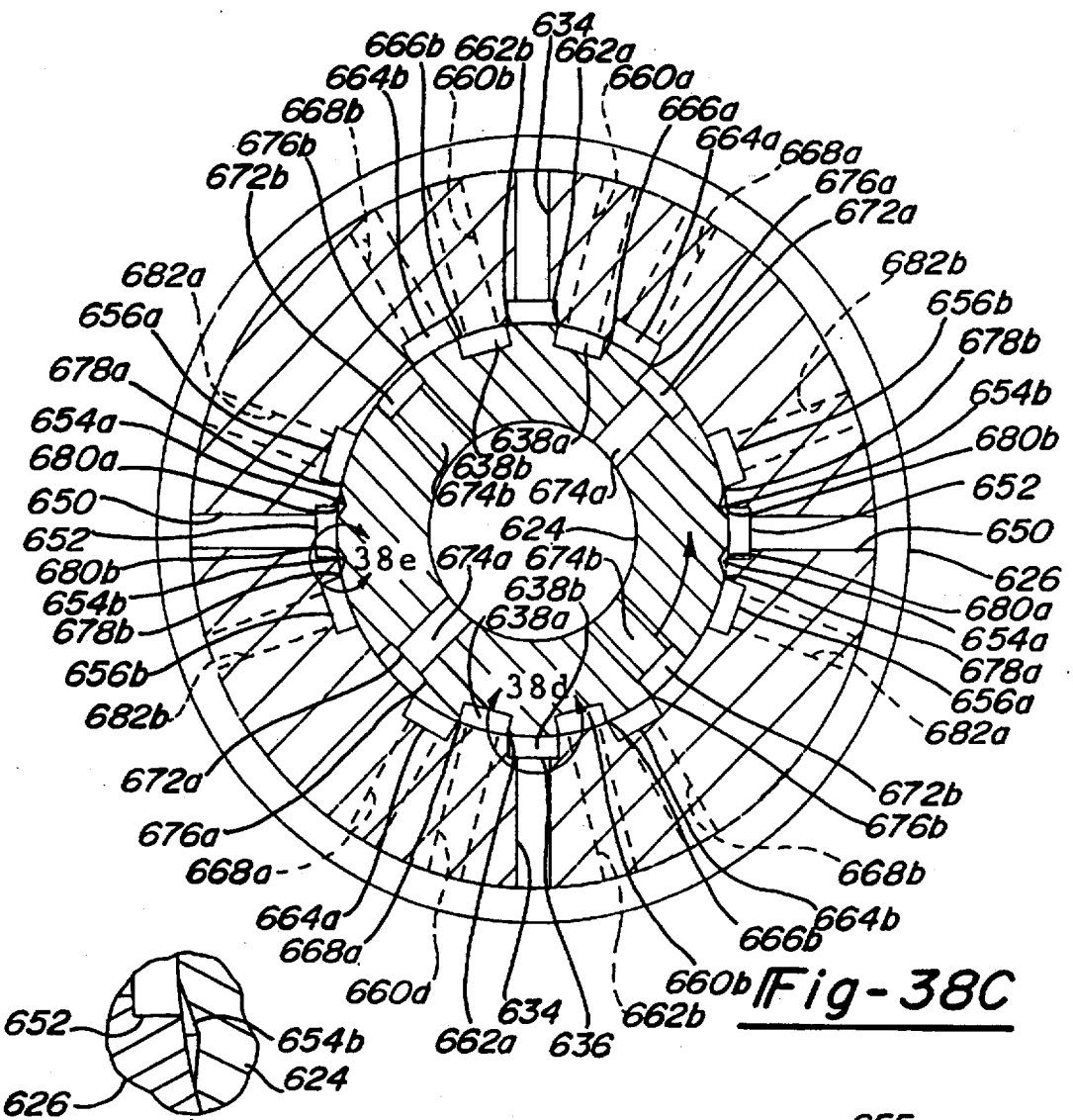
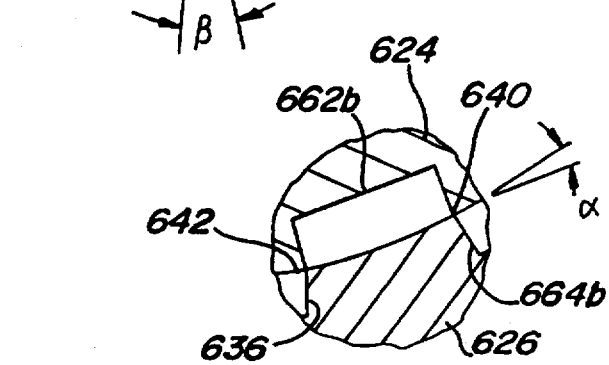
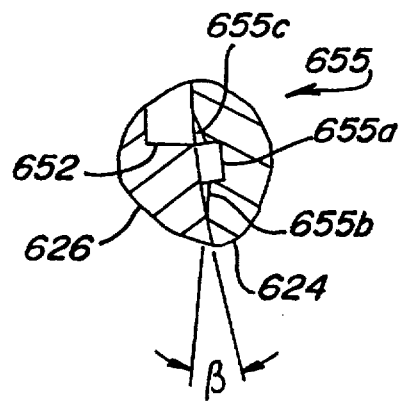

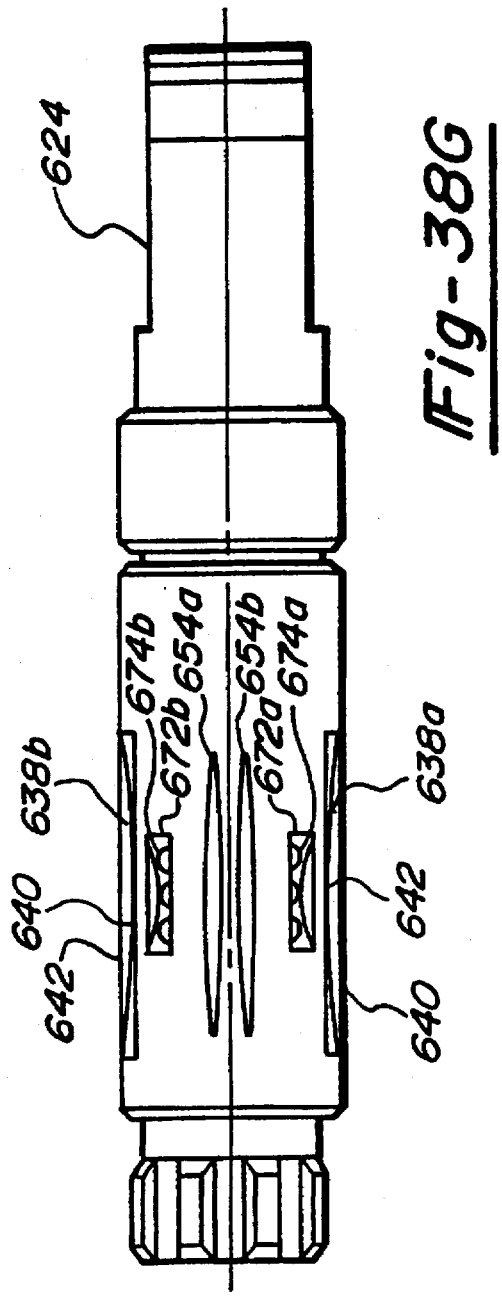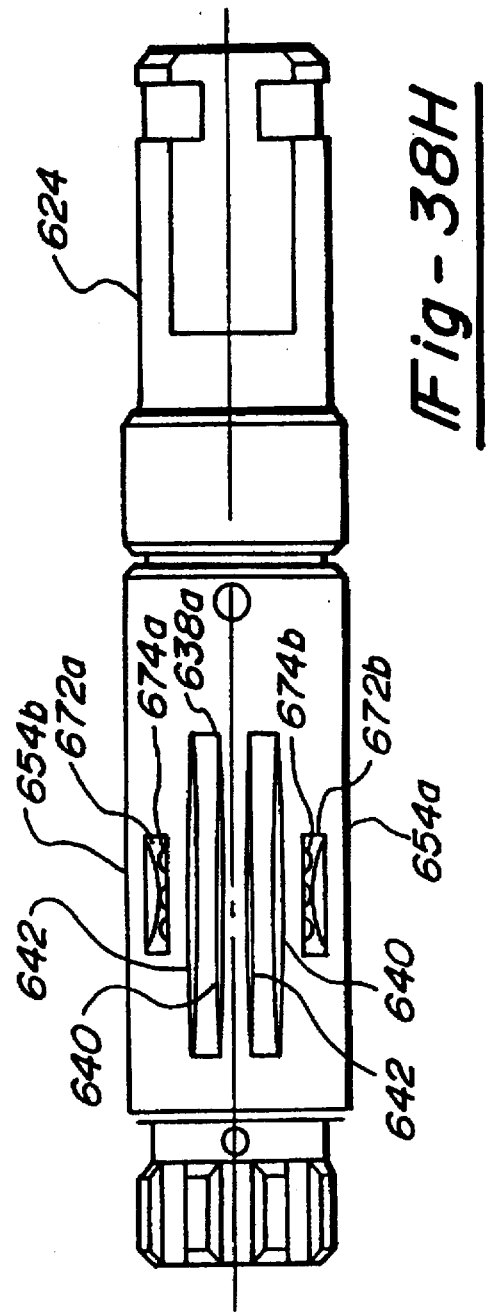

BOOTSTRAP POWER STEERING SYSTEMS

CROSS-REFERENCE TO RELATED APPLICATION

This is a continuation of application Ser. No. 08/119,281 filed Sep. 9, 1993, now abandoned, which is a CIP of U.S. Ser. No. 08/099,167 filed Jul. 29, 1993, now U.S. Pat. No. 5,435,698.

BACKGROUND OF THE INVENTION

I. Field of the Invention

The present invention relates generally to the utilization of bootstrap hydraulic systems in vehicular power steering systems and, more particularly, to enhancing tactile feedback characteristics and minimizing power consumption of such systems.

II. Description of the Prior Art

In bootstrap hydraulic systems of the prior art as applied to vehicular power steering systems, fluid is supplied by a pump to a nominally balanced, closed-center, four-way control valve (hereinafter being referred to as a closed-center control valve) comprising input, return, and first and second output ports. The input and return ports are coupled to input and return slots, and the first and second output ports are coupled to first and second output slots formed in valve input shaft and sleeve members, respectively, comprised in the closed-center control valve. Control valve input and return flow control orifices are formed by progressive overlapping of input and first or second output slots, and second or first output slots and return slots, respectively, as a result of differential positioning of the valve spool and sleeve members (hereinafter referred to as valve positioning or valve position). A first direction of valve positioning generates first input flow control orifices allowing fluid flow between input and first output ports, and second return flow control orifices allowing fluid flow between second output and return ports. The second, or opposite, direction of valve positioning generates second input flow control orifices allowing fluid flow between input and second output ports, and first return flow control orifices allowing fluid flow between first output and return ports. In either case, each open flow control orifice becomes an individual flow source having fluid flow therethrough equal in value to $$Q_o = A_o C_d (2\Delta P/\rho)^{0.5} \quad (1)$$

where $Q_o$ is fluid flow through a particular flow control orifice, $A_o$ is effective flow area of the flow control orifice, $C_d$ is discharge coefficient of the flow control orifice, $\rho$ is density of the fluid used and $\Delta P$ is nominal pressure drop across any of the open flow control orifices.

Most bootstrap hydraulic systems utilize square cut input and return slots which generate rectangularly shaped flow control orifices as a function of valve positioning. The flow control orifices are generated as a function of input and return slots overlapping respective ones of the first and second output slots. This results in volumetric fluid flow through the open ones of the flow control orifices being a linear function of the valve position. Thus, open ones of the closed-center control valve's input and return flow control orifices act as flow sources proportional to valve position and the combination of open ones of the flow control orifices may be thought of as a proportional flow source providing fluid flow directed toward one of the output ports and away from the other.

In order to attain a desired value for $\Delta P$, fluid is supplied in a controlled manner whereby pump delivery pressure is maintained equal to differential load pressure values imposed between the first and second output ports (i.e., by a steering load) plus a substantially constant supplemental pressure equal in value to twice the value of $\Delta P$. This results in a required value for pump delivery pressure according to the equation $P_S = P_L + 2\Delta P$ where $P_S$ is pump delivery pressure and $P_L$ is differential load pressure.

In bootstrap hydraulic systems of the prior art powered by an engine driven positive displacement pump assembly, this is accomplished by using a three-way valve to pick off the higher valued one of the first and second output port pressures, which pressure is conveyed to the pump assembly via a control line and applied as a control pressure to the control end of a piston normally utilized as a flow control valve for the pump assembly. The control pressure value is supplemented by force concomitantly provided by a compression spring also acting upon the control end of the piston in order to generate pump output pressure equal in value to the higher valued one of the first and second output port pressures plus $\Delta P$. Because of the nominally balanced nature of the closed-center control valve, the lower valued one of the first and second output port pressures is substantially equal to $\Delta P$. This results in a pump delivery pressure equal to the above mentioned value $P_S$.

In bootstrap hydraulic systems powered by a servo motor driven positive displacement pump, an equivalent pump delivery pressure is generated by using a three-way valve to pick off the lower valued one of the first and second output port pressures, which pressure is applied as a control pressure to a pressure transducer. An electronic signal emanating from the pressure transducer is utilized as an input to a controller which, in turn, drives the servo motor such that the lower valued one of the first and second output port pressures is maintained equal in value to $\Delta P$ regardless of load pressure values. Because of the nominally balanced nature of the closed-center control valve, the difference between the pump delivery pressure and the higher valued one of the first and second output port pressures is also substantially equal to $\Delta P$. This results in a pump delivery pressure equal to the above mentioned value $P_S$.

In order to avoid power cylinder hydrostatic lock when valve position has zero value, as well as generating useful pressure-effort characteristics when it has non-zero value, parasitic slots are usually formed in valve spool members in bootstrap hydraulic systems of the prior art when they are used for bootstrap power steering systems.

The parasitic slots are formed in an open-center manner comprising first and second parasitic orifices formed by overlapping of parasitic and first and second output slots, respectively. As a result, fluid flow is permitted through the output ports via series arrangement of the first and second parasitic orifices when valve position has zero value. Further, the first and second parasitic orifices can pass selected portions of the above mentioned linearly generated fluid flow directly through the closed-center control valve when valve position has non-zero value as long as both remain open. In general, this results in a particular pressure-effort characteristic curve for any selected load flow value (i.e., fluid flow delivered from the first output port and returned to the second output port) attainable with valve positions whereat both first and second parasitic orifices are open. For valve positions beyond where both first and second parasitic orifices are open, pressure-effort curves become straight lines denoting values of effort required for compatible values of flow control orifice areas. The resulting family of such pressure-effort curves is characterized by unusually wide effort separation values between individual curves.

Bootstrap power steering systems comprising bootstrap hydraulic systems have exceptionally smooth and precise operational characteristics when compared to open-center rotary valve equipped power steering systems. Intuitively, this should be expected because the above noted proportional flow source nature of open ones of the flow control orifices emulates the functioning of flow control orifices in a closed-center industrial control valve, and industrial hydraulically powered servo systems comprising such control valves are known to be exceptionally smooth and precise. The operational smoothness is also depicted by the above noted family of pressure-effort curves. The wide separation of the curves denotes exceptionally high damping values, whereby damping is indeed perceived by a driver of a host vehicle. This is because succeeding curves represent increasing steering wheel rotation rates whereby their widely separated effort values denote high supplementally applied torque to rotational velocity ratios. The rate of change of steering wheel torque with respect to increasing values of steering wheel rotational velocity can be defined as perceived steering wheel damping coefficient.

In bootstrap hydraulic systems of the prior art, it has been necessary to utilize a pressure dividing network comprising substantially equal valued pilot flow orifices disposed in series whereby input and control pressure ports, and control pressure and return ports are respectively coupled. This effects substantially balanced operation of the pressure control function when the valve position has zero value because the pilot flow dominates commonly encountered leakage flows and obviates an otherwise critical need to balance the leakage flows. However, the pilot flow is undesirable because it is subject in part to substantially full system pressure and places a significant parasitic load on the hydraulic power steering system. It would be desirable to delete the pilot flow function when the bootstrap hydraulic system is operated at the higher pressures or even eliminate it entirely to improve system efficiency.

Improved efficiency is becoming extremely important because of difficulties currently being encountered in meeting CAFE standards with prior art power steering systems. This is particularly true with hydromechanical power steering systems (hereinafter being referred to as HMPS systems). Such systems usually comprise open-center control valves having continuous fluid flow and very low system efficiency under virtually all operating conditions. Improved efficiency will also be quite important for electrohydraulic power steering systems (hereinafter being referred to as HMPS systems) to be used in electric cars. In an EHPS system it is particularly desirable to minimize electrical energy consumption by operating at significantly reduced volumetric flow rates whenever the EHPS system is subject to partial steering loads. In the prior art, it is known to provide volumetric flow rates in an EHPS as a function of applied torque. In this case applied torque is measured by a torque transducer and a controller regulated, servo-motor driven pump provides pumped fluid to an input port of a rotary four-way open-center control valve (hereinafter being referred to as a rotary control valve, or an open-center control valve, or more simply, a control valve) comprised in the host steering gear at servo-motor speeds determined by the controller. The fluid is returned to a reservoir associated with the pump via input, first and second output, and return slots of an open-center control valve.

However, because torque transducers are expensive and difficult to implement in conjunction with steering systems, other EHPS systems of the prior art utilize pumped fluid supplied at volumetric flow rates determined as selected functions of either steering wheel rotational velocity or system pressure. In the case of volumetric flow rates being determined by steering wheel rotational velocity, control is very difficult to establish during any given steering wheel maneuver because of the discontinuous nature of the steering wheel rotational velocity itself. In the case of volumetric flow rates being determined by system pressure, the system pressure is measured and a controller regulated, servo-motor driven pump provides pumped fluid to the open-center control valve according to the desired function of system pressure. Unfortunately, such a control scheme breaks down when the host vehicle is steered into a turn. This is because the resulting system pressure suffers considerable regulation as a function of differential load flow provided to a power cylinder associated with the steering gear. For positive values of load flow (i.e., such as attained when steering into a turn), the system pressure initially decreases with reference to increasing values of applied torque. The result is lack of steering assist when initially entering the turn followed by a "rush" of steering assist thereafter. Bootstrap hydraulic systems are desirable for application in EHPS systems because system flow rates are inherently proportional to applied torque. Thus, bootstrap EHPS systems combine the relative simplicity of a system controlled as a function of pressure with the functional performance of a system controlled as a function of applied torque.

However, it would be desirable to further improve efficiency by eliminating half of the supplemental pressure value of twice the value of $\Delta P$ such that a required pump delivery pressure would be reduced to a value determined by the equation $P_S = P_L + \Delta P$. Other desirable bootstrap hydraulic system enhancements include advanced input, return and parasitic slot geometries which would allow a more comprehensive selection of pressure-effort characteristics. Further, it would be desirable to provide a variable assist feature for bootstrap power steering systems to enable speed sensitive steering as an available option. It would also be desirable to simplify valve and servo motor driven positive displacement pump construction. Finally, it would also be desirable to simplify valve construction by eliminating the three-way valve and servo motor driven positive displacement pump by eliminating a mechanical coupling and thrust bearings commonly used therewith.

SUMMARY OF THE INVENTION

Accordingly, the present invention is directed to methods and devices for enhancing operational characteristics of bootstrap HMPS and EHPS systems utilizing bootstrap hydraulic systems. In a preferred embodiment, an improved pressure dividing network is provided for enabling balanced operation of the pressure control function when valve position is zero valued. In the improved pressure dividing network, a single pilot flow orifice conveys pilot flow from a pump output port through a three-way valve used to pick off the higher valued one of the first and second output port pressures of a closed-center control valve and through the control valve to a return port via small pilot flow metering slots similar in size to the pilot flow orifice and formed in flow control edges of the control valve's return slots. The pilot flow metering slots are formed in an open-center manner in order to provide for pilot flow when valve position is zero valued. However, their geometry is limited with respect to the control valve's parasitic slots such that they are fully closed before high pressures are developed. Thus, pilot flow function is deleted when the bootstrap hydraulic system is operated at higher pressures.

A first alternative preferred embodiment, directed to eliminating pilot flow entirely, includes input slots formed in a closed-center manner and return slots formed in an open-center manner. In addition, check valves are utilized to couple the return port to either of the first or second output ports as required in order to avoid either of them being subject to pressure values substantially below that of the return port. As a result of forming the return slots in an open-center manner, first and second output slots are coupled thereto when valve position is zero-valued. Since the input slots are formed in a closed-center manner, no fluid flows through the control valve when valve position is zero-valued. Thus, the return slots also function in a manner similar to parasitic slots. Further, since the first and second output slots are coupled to the return slots, pressure at the first and second output ports is substantially equal to pressure at the return port for conditions of zero load flow. Thus control pressure is equal to return port pressure and obviates any need for pilot flow whereby total supplemental pressure is reduced to a value of $\Delta P$.

A second alternative preferred embodiment, also directed to eliminating pilot flow entirely, includes a control valve having input slots formed in an open-center manner and return slots formed in a closed-center manner. In this case, a three-way valve is used to pick off the lower valued one of the first and second output port pressures, which pressure is applied as a control pressure to the control end of a valve spool member of a pressure regulating valve which is used to regulate pressure of fluid delivered by the pump member of the pump assembly. Control pressure is opposed by a compression spring acting upon the opposite end of the spool valve in a biasing chamber which is vented to a reservoir. Fluid delivered by the pump is ported into a central groove of the spool valve as well as an output port communicating with a delivery line to the control valve. A bypass port leading to an input port of the pump is progressively uncovered by the metering edge of the central groove whenever excessive control pressure further compresses the compression spring. Thus, a portion of the fluid delivered by the pump is available for delivery to the closed-center control valve at pump delivery pressure via the output port and delivery line (i.e., when valve position is other than zero-valued) while the remaining portion is re-circulated through the pump via the bypass port. An inverted pressure relief valve is provided for avoiding excessive pressures should a driver strike a curb or hold the steering system against a travel limit. Since control pressure is equal to pressure drop across the open one of the control valve's return orifices, there is no need for pilot flow.

A third alternative preferred embodiment emulates the features of the second preferred embodiment above but utilizes a prior art pump assembly comprising normal flow control. In this case pump delivery pressure is set by a pressure regulating valve which functions in a manner similar to the pressure regulating valve described above in the second preferred embodiment but is located externally with reference to the pump assembly. Usually the pressure regulating valve is included as a component portion of the control valve assembly along with the three-way valve. In this case, nominally constant flow circulates via pump delivery and return lines to and from the control valve assembly and no control line is required.

A fourth alternative preferred embodiment comprises a volumetrically efficient bootstrap HMPS system utilizing a bootstrap hydraulic system which functionally emulates the second preferred embodiment but utilizes a variable displacement pump whose displacement, and therefore pump delivery, is controlled by the control pressure. In this case there is no re-circulated fluid. Other than leakage flow, all fluid delivered by the variable displacement pump is delivered to the closed-center control valve.

The variable displacement pump operates in a pressure unbalanced manner and utilizes an odd number of rollers as radial sealing members between a like number of pumping chambers within a circular cam ring. Volumetric displacement of the variable displacement pump is varied by controlling lateral position of the cam ring in direct response to the lower valued one of the first and second output pressures. Cam ring positioning is effected in a substantially friction-free manner by a unique rolling motion of the cam ring through its range of motion.

The fifth alternative preferred embodiment is directed to methods and apparatus for providing speed sensitive control of steering assist for bootstrap HMPS systems utilizing bootstrap hydraulic systems constructed according to either of the preferred or first alternative preferred embodiments, wherein pilot flow is conveyed from a fixed pilot flow orifice past the pump assembly control pressure port and through a variable orifice on the way to the valve assembly control pressure port. Thus, pressure at the pump assembly control pressure port is raised to a value larger than that present at the valve assembly control pressure port as a function of variable orifice flow resistance. Because pressure at the pump assembly control port is raised, pressure drop across the input orifices of the closed-center control valve is elevated as well.

The sixth alternative preferred embodiment is also directed to methods and apparatus for providing speed sensitive control of steering assist for bootstrap HMPS systems utilizing bootstrap hydraulic systems constructed according to either of the second or third alternative preferred embodiments, wherein a single pilot flow orifice conveys pilot flow from a control pressure port to the biasing chamber in series with a variable orifice which conveys the pilot flow to the reservoir. Thus, pressure in the biasing chamber is raised to a value above that present in the reservoir with the result that pressure at the control pressure port is raised to a larger value. As a further result, pressure drop across the open one of the return orifices of the closed-center control valve is elevated as well.

A seventh alternative preferred embodiment is directed to methods and apparatus for providing speed sensitive control of steering assist for bootstrap HMPS systems utilizing bootstrap hydraulic systems configured with the variable displacement pump described above in the fourth alternative preferred embodiment, wherein a single pilot flow orifice conveys pilot flow from a control pressure port to a biasing chamber in series with a variable orifice which conveys the pilot flow to a reservoir. Thus, pressure in the biasing chamber is raised to a value above that present in the reservoir with the result that pressure at the control pressure port is raised to a larger value. As a further result, pressure drop across the return orifices of the closed-center control valve is elevated as well.

An eighth alternative preferred embodiment, directed to eliminating pilot flow entirely for bootstrap hydraulic systems powered by a servo motor driven positive displacement pump, includes a control valve having input slots formed in an open-center manner. In this case a three-way valve is used to pick off the lower valued one of the first and second output port pressures, which pressure is applied as a control pressure to a pressure transducer. Other than substituting a pressure transducer for its bypass port, the control valve is substantially identical to the control valve of the second alternative preferred embodiment described above and it functions in a substantially identical manner. A signal from the pressure transducer is utilized as an input signal by an amplifier which drives the servo motor such that the control pressure is maintained at a selected value. Since control pressure is equal to pressure drop across the open one of the control valve's return orifices, there is no need for pilot flow.

A ninth alternative preferred embodiment is directed to a method of providing speed sensitive control of steering assist for bootstrap EHPS systems utilizing bootstrap hydraulic systems powered by a servo motor driven positive displacement pump. In this case an electronic signal emanating from the pressure transducer is utilized as an input to a controller which, in turn, drives the servo motor such that the lower valued one of the first and second output port pressures is maintained at a value which is selectable as a function of vehicular speed and/or any other desired variable, regardless of load pressure values.

Tenth, eleventh and twelfth alternative preferred embodiments are directed to methods and apparatus for providing a more comprehensive selection of pressure-effort characteristics for bootstrap hydraulic systems. This is accomplished by providing advanced input, return and parasitic slot geometries which can, for instance, provide for emulation of the pressure-effort characteristics of a reaction valve having an on-center detent with a bootstrap hydraulic system. In control valves constructed according to teachings of the tenth, eleventh and twelfth alternate preferred embodiments an on-center region is provided wherein the application of low values of applied steering torque results in very low levels of load pressure. This is followed by a substantially linear region where applied steering torque and load pressure build proportionally. And finally, a parking region wherein high load pressures is provided. In a bootstrap power steering system without speed sensitive control, provision for a parking region is obtained via a non-linear valve pressure gain function at higher applied steering torque values while in a bootstrap power steering system with speed sensitive control, primary provision for a parking region is obtained via increasing the valve pressure gain function itself at all values of applied steering torque.

The tenth alternative preferred embodiment is implemented with reference to the preferred embodiment, wherein multiple parasitic slots are utilized in the host system's closed-center control valve. These parasitic slots comprise a symmetrical primary parasitic slot and supplemental first and second non-symmetrical parasitic slots formed as mirror images of one another with reference to the zero-valued valve position. The primary parasitic slot is terminated with pointed metering edges. A preferred geometry for the primary parasitic slot comprises a trapezoid wherein the closing one of the resulting parasitic orifices is triangular in shape. The mirror imaged first and second supplemental parasitic slots are located such that first ends thereof, which are also formed with pointed metering edges do not overlap first and second output slots of the control valve, respectively, when valve position is zero-valued. On the other hand, the second ends overlap the second and first output slots, respectively, to a greater extent than the pointed metering edges of the primary parasitic slot.

In operation, pressure-effort characteristics of any bootstrap hydraulic system are dominated by proportional valve flow. The above noted on-center region occurs as a consequence of limited amounts of valve flow combined with relatively low values of parasitic flow resistance (via the primary parasitic slots) obtained at low values of valve position. The linear region commences as a function of increasing valve flow and parasitic flow resistance at moderate values of valve position. The linear region is extended (in the face of ever increasing values of valve flow) by an inversion of parasitic flow resistance obtained by a parallel opening of a first secondary parasitic orifice as valve position further increases where the first secondary parasitic orifice is formed by progressive overlapping of a first end of the respective one of the first and second non-symmetrical parasitic slots and the respective one of the first and second output slots. Finally, non-linearly increasing values of valve pressure gain are obtained as the respective one of second secondary parasitic orifices begins to close due to regression of the respectively overlapping second end of the respective one of the first and second non-symmetrical parasitic slots and the respective other one of the first and second output slots.

The eleventh alternative preferred embodiment is implemented with reference to the tenth alternative preferred embodiment, via utilization of selectively stepped input and return slots to first reduce and then accelerate pump delivery volumetric flow rates. This serves to reduce peak values thereof otherwise required during parking maneuvers in speed sensitive bootstrap power steering systems. In addition, primary and secondary parasitic slots having proportionally reduced widths are incorporated in order to maintain static pressure-effort curves in their preferred form within maneuvering and parking ranges of a host vehicle.

The twelfth alternative preferred embodiment can be implemented with reference to any of the first through ninth alternative preferred embodiments, wherein the set of input or return slots formed in an open-center manner comprises the geometry of the above described primary parasitic slot. Thus, the above described functions of the primary parasitic slot are performed by the respective set of input or return slots.

Thirteenth and fourteenth alternative preferred embodiments are directed to method and apparatus for implementing speed sensitive control of steering assist in bootstrap HMPS or EHPS systems comprising a bootstrap hydraulic system without the necessity of increasing values of the respective one of the higher or lower valued output port pressures during parking maneuvers. In the thirteenth and fourteenth alternative preferred embodiments, the above described function of the first and second secondary parasitic slots is undertaken by first and second bypass slots that are selectively enabled at high vehicular speeds by a high speed pump delivery path. In this case, a valve is activated to open the high speed pump delivery path to high speed input slots and first and second bypass slots formed in valve sleeve and spool members, respectively. In the host control valve's linear region, second bypass orifices of the first or second bypass slots open into the supplemental first or second output slots, respectively, in order to generate the linear region in a manner similar to that resulting from the above described secondary parasitic flow function.

A fifteenth alternative preferred embodiment is directed to method and apparatus for enabling simplified control valve construction comprising elimination of the three-way valve. In this case, open-center input and return flow control orifices are utilized and series closed-center orifices are used to enable nominally linear flow through the control valve. In the fifteenth alternative preferred embodiment, the series closed-center orifices may either be implemented between input port and input flow control orifices, or between return flow control orifices and return port of comprised valve input shaft and sleeve members. In either case, control pressure is equal to pressure drop across open ones of the series closed-center orifices.

In bootstrap EHPS systems configured according to the fifteenth alternative preferred embodiment, the series closed-center orifices are implemented between return flow control orifices and return port, and control pressure is directly measured by a pressure transducer. A signal issued from the pressure transducer is compared with a command signal indicative of a selected value for the control pressure and a resulting error signal is amplified to drive a servo motor-pump such as to suitably maintain control pressure substantially at the selected value. In bootstrap HMPS systems configured according to the fifteenth alternative preferred embodiment, the series closed-center orifices may be implemented between either input port and input flow control orifices, or return flow control orifices and return port, and the control pressure used to control pump output as taught in the preferred and first alternate preferred, or second, third and fourth alternative preferred embodiments, respectively. Speed sensitive steering may be implemented in any of these variations by selectively enabling bypass slots according to teachings of the thirteenth and fourteenth alternative preferred embodiments above.

A sixteenth alternative preferred embodiment is directed to providing simplified construction of servo motor driven positive displacement pump wherein the pump is driven by the servo motor via a quill. The quill is directly attached to the pump's input shaft (i.e., as by a process known as friction welding), extends through an axially directed hole formed in the servo motor's shaft, and fixedly attached to the far end of the servo motor's shaft (i.e., as by pinning). The servo motor and pump are physically integrated via sharing a common intermediate housing member thus eliminating mechanical coupling and thrust bearing members commonly found in such assemblies. Servo motor driven positive displacement pump assemblies constructed according to the sixteenth alternate preferred embodiment also have the advantage of being more compact.

Seventeenth, eighteenth, nineteenth, twentieth, twenty-first, twenty-second and twenty-third alternative preferred embodiments of the invention are directed to various combinations of the above described embodiments in implementing various bootstrap HMPS and EHPS systems. In each case speed sensitive bootstrap HMPS or EHPS systems are illustrated.

BRIEF DESCRIPTION OF THE DRAWINGS

FIG. 2A is a graphical illustration depicting typical pressure-effort curves for the prior art closed-center four-way control valve of FIG. 1A;

FIG. 2B is a graphical illustration depicting pressure-effort curves of a prior art closed-center four-way control valve without parasitic slots;

FIG. 3A is a partially schematic view of a bootstrap hydraulic system of a preferred embodiment of the invention comprising a sectional view of a closed-center four-way control valve utilized therein;

FIG. 3B is a sectional view of a modified pump output regulating sub-assembly also comprised in the preferred embodiment of the invention;

FIG. 3C is an enlarged view of return slot in FIG. 3A;

FIG. 8 is a partially schematic view of a bootstrap hydraulic system of a third alternative preferred embodiment of the invention comprising a sectional view of a closed-center four-way control valve utilized therein;

FIG. 16A is a partially schematic view of a bootstrap hydraulic system of a tenth alternative preferred embodiment of the invention comprising a sectional view of a closed-center control valve utilized therein for providing improved pressure-effort characteristics;

FIG. 16B is a second sectional view of the closed-center control valve as shown in FIG. 16A of the invention;

FIGS. 17A and 17B are first and second side views of an input shaft comprised in the closed-center control valve as shown in FIG. 16 of the invention;

FIG. 19 is a graphical illustration depicting pressure-effort curves for the closed-center control valve of FIG. 16;

FIGS. 22A, 22B, 22C, 22D, 22E and 22F are graphical illustrations depicting pressure-effort curves for the closed-center control valve shown in FIG. 16 showing operation in each of the six respective operating zones depicted in FIGS. 18A, 18B, 18C, 18D, 18E and 18F;

FIG. 23 is a graphical illustration depicting pump delivery volumetric flow rates required by the closed-center control valve shown in FIG. 16 when it is utilized in a speed sensitive bootstrap hydraulic system;

FIGS. 25A, 25B and 25C are graphical illustrations depicting high and low speed performance, and pump delivery volumetric flow rates, respectively, for the closed-center control valve shown in FIG. 24;

FIG. 27A is a partially schematic view of a bootstrap hydraulic system of a thirteenth alternative preferred embodiment of the invention comprising a sectional view of a control valve utilized therein;

FIGS. 27D and 27E are first and second side views of an input shaft comprised in the control valve depicted in FIG. 27A of the invention;

FIGS. 30A, 30B, 30C and 30D are sectional views of the control valve as shown in FIG. 27A of the invention depicting flow patterns therein corresponding to the four respective operating zones depicted in FIGS. 29A, 29B, 29C and 29D;

FIG. 35 is a sectional view of the control valve of the fourteenth alternative preferred embodiment of the invention.

FIG. 36 is a sagital view of a grinding wheel used in forming flow control and fluid bypass edges of the input shaft as shown in FIG. 34.

FIGS. 38C, 38D, 38E and 38F are third, fourth, fifth and sixth sectional views, respectively, of the control valve depicted in FIGS. 38A and 38B;

FIGS. 38G and 38H are first and second side views of an input shaft comprised in the control valve depicted in FIGS. 38A and 38B of the invention;

PREFERRED EMBODIMENTS OF THE INVENTION

Figure 1A:
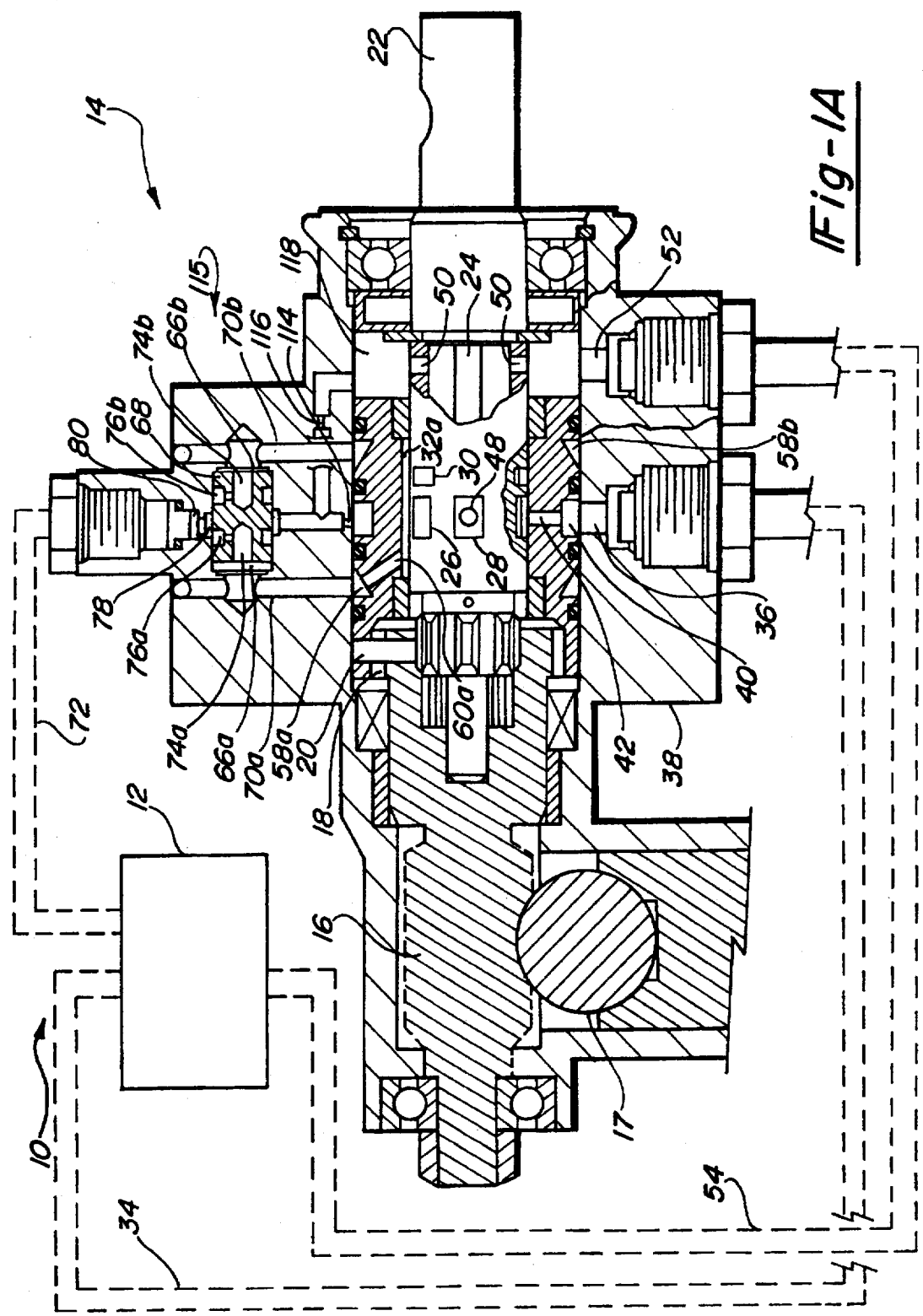
FIG. 1A is a partially schematic view of a prior art bootstrap hydraulic system comprising a sectional view of a closed-center four-way control valve utilized therein.
Figure 1B:
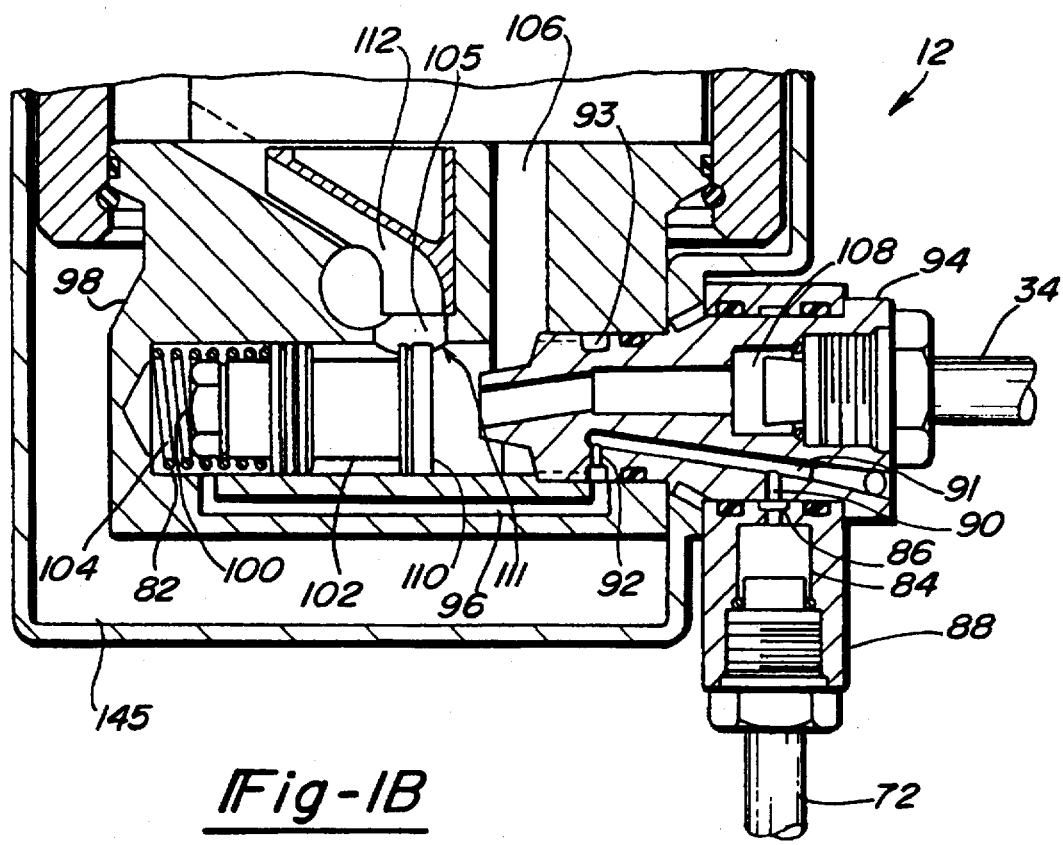
FIG. 1B is a sectional view of a pump output regulating sub-assembly also utilized in the prior art bootstrap hydraulic system.
Figure 1C:
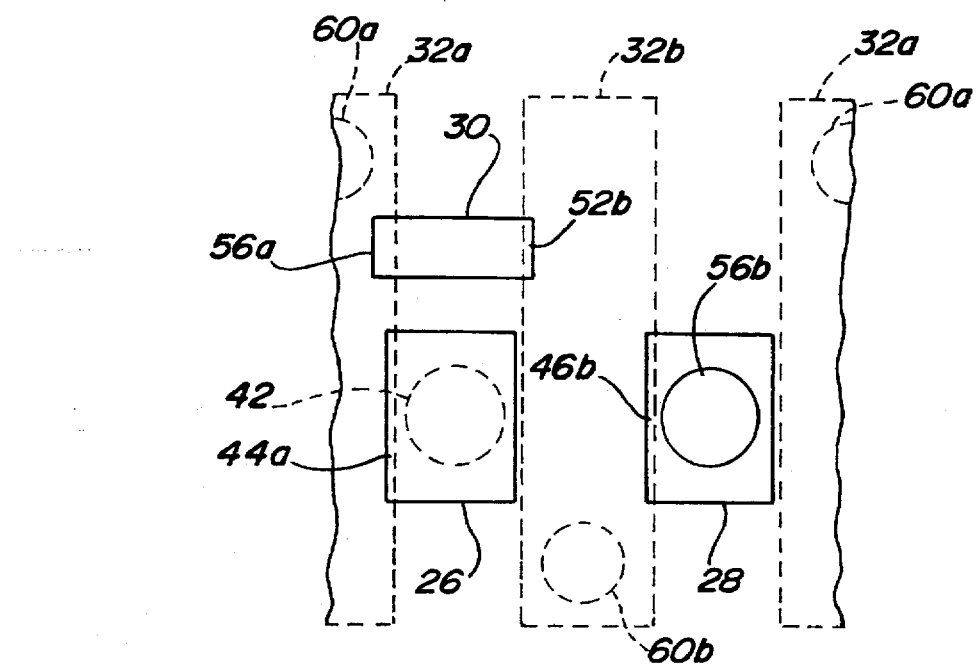
FIG. 1C is a descriptive plan view of flow control and parasitic slots of the prior art closed-center four-way control valve of FIG. 1A.

With reference to FIGS. 1A, 1B and 1C, a partially schematic view of a prior art bootstrap hydraulic system 10 comprising a sectional view of a closed-center control valve 14 (hereinafter referred to as control valve 14) utilized therein, a sectional view of a pump output regulating sub-assembly 12 also utilized therein, and a descriptive plan view depicting flow control and parasitic slots of control valve 14, respectively, are shown. With particular reference now to FIG. 1A, control valve 14 is shown multi-sectioned in a manner which depicts a selection of its flow control slots, parasitic slots and ports.

(In this and sectional views of other control valves to follow, depiction of various details must be viewed as being partially schematic in nature in order to convey functionality thereof. This is necessary because of the constraints imposed by the necessity of utilizing two-dimensional drawings.)

Similarly to any rack-and-pinion power steering system, control valve 14 controls lateral motions of rack 17, the lateral position of which is monitored within control valve 14 via pinion 16. Valve sleeve 18 is mechanically linked to pinion 16 by pin 20. Thus, rotational motions of valve sleeve 18 substantially mimic rotational motions of pinion 16. Input shaft 22 is compliantly coupled to pinion 16 by torsion bar 24. Thus, "follow along" position feedback is effected via pinion 16 and torsion bar 24. Application of torque to input shaft 22 results in application of mechanically derived force via mesh of pinion 16 and rack 17. Concomitantly, torsion bar 24 twists in an amount proportional to the applied torque whereby relative rotational deflection between input shaft 22 and valve sleeve 18 (defined above as valve position) occur in a linearly related manner.

With further reference now to FIGS. 1B and 1C as well as FIG. 1A, input slots 26, return slots 28 and parasitic slots 30 of control valve 14 are shown in an off-center position with respect to first and second output slots 32a and 32b (formed in valve sleeve 18 and depicted with dotted lines), respectively, as obtained with non-zero values of valve position. This is shown particularly in FIG. 1C, as well as similar views below wherein slot geometries have been exaggerated for clarity such that orifices formed by overlap of input, parasitic and return slots of one control valve member, and output slots of the other control valve member, can easily be seen. In FIG. 1C, first and second output slots 32a and 32b, respectively, input ports 42, and first and second output ports 60a and 60b, respectively, are assumed to be formed in valve sleeve 18 and are depicted as dotted line outlines. Input slots 26, parasitic slots 30, return slots 28 and return slot ports 48 are assumed to be formed in input shaft 22 and are depicted as solid line outlines. The placement of these various slots and ports could have been in opposite ones of valve sleeve 18 and input shaft 22. It will be appreciated that while this selection is carried throughout this disclosure, it is merely exemplary and is not intended to limit the scope of the present invention.

In operation, fluid is delivered from pump output regulating sub-assembly 12 via pump delivery line 34 to control valve 14 and enters input slots 26 via input port 36 of housing 38, and input groove 40 and input ports 42 of valve sleeve 18. Because of constant pressure differential (as imposed by the bootstrap principle of operation to be described below) across each one of first input orifices 44a and second return orifices 46b, pump delivery fluid flows in through first input orifices 44a and out through second return orifices 46b via input slots 26, first output slot 32a, parasitic slot 30 and/or a power cylinder associated with rack 17 (not shown), second output slot 32b, respectively, and return slots 28 in an amount proportional to valve position.

(It should be noted that the drawings do not show symmetrical second input orifices 44b and first return orifices 46a would have been formed as a result of oppositely directed valve position with an oppositely directed flow pattern. Unidirectional presentations are typical hereinbelow. They are presented with the understanding that, in every case, oppositely directed flow patterns exist as well.)

The fluid returns to pump output regulating sub-assembly 12 via return slot ports 48, shaft relief ports 50, return port 52, return line 54 and a reservoir port (not shown). Differential output pressure between first and second output slots 32a and 32b, respectively, causes parasitic flow through parasitic slots 30 via first parasitic orifices 56a, parasitic slots 30 and second parasitic orifices 56b. In general, the differential output pressure is due to steering loads in excess of mechanically derived force provided by mesh of pinion 16 and rack 17, and is sourced at a piston member (not shown) associated with rack 17 and located in the power cylinder. It enters control valve 14 via output ports (not shown but similar in nature to input port 36) of housing 38 and is conveyed to first and second output slots 32a and 32b, respectively, via first and second output grooves 58a and 58b, respectively, and first and second output ports 60a and 60b, respectively, of valve sleeve 18.

With reference to FIG. 2A, a typical family of pressure-effort curves for control valve 14 is shown. Parasitic flow through parasitic slots 30 enables control valve 14 to effect the pressure-effort curve shapes depicted in FIG. 2A wherein curves 62a, 62b, 62c, 62d and 62e depict pressure-effort curves for differential output flow values of 0.0 in³/sec, 3.0 in³/sec, 6.0 in³/sec, −3.0 in³/sec and −6.0 in³/sec, respectively. All curves are visible within first quadrant plotted in FIG. 2A. Axes are labeled "Torque" and "Pressure" with dimensions [in.lb] and [psi], respectively (Labeling axes "Torque" and "Pressure" with dimensions [in.lb] and [psi], respectively, is a format will be repeated for similar graphical illustrations to follow.)

Curve 62a is of particular interest because it depicts static pressure-effort performance of control valve 14 (i.e., due to its output flow value of 0.0 in³/sec). Generally, curve 62a depicts marginally acceptable performance wherein its rapidly increasing values reveal a pronounced "knee" 63. Such a curve is referred to in the industry as having poor linearity. In the case of open-center control valves, improved linearity is often obtained via geometric manipulation of flow control slots. This is difficult to accomplish with prior art bootstrap control valves because it is hard to accommodate increasing values of pump delivery flow with practical parasitic slot geometries. For instance, manipulation of equation (1) above reveals that a pressure drop across a controlling parasitic orifice, $\Delta P_p$, is nominally proportional to $(Q_p/A_p)^2$ where $Q_p$ is parasitic orifice flow and $A_p$ is parasitic orifice area. In this case $Q_p$ is proportional to torque and $A_p$ is inversely proportional to torque. Thus, $\Delta P_p$ is nominally proportional to the fourth power of torque which accounts for the highly non-linear character of curve 62a. In order to achieve a linear behavior for a portion of a static pressure-effort curve, $A_p$ would have to be inversely proportional to the square root of torque over that portion of the curve. Using prior art bootstrap technology this is not feasible because it would require increasing values of parasitic orifice area to occur concomitantly with control valve closing.

However, control valve 14 comprising parasitic slots 30 is far superior to a control valve without parasitic slots for an on-road bootstrap steering system. With reference now to FIG. 2B, a comparable typical family of pressure-effort curves for a closed-center four-way control valve without parasitic slots and operated in bootstrap hydraulic system mode is shown. Without parasitic flow, these pressure effort curves are substantially vertical lines symbolizing nominally infinite pressure gain as depicted by "curves" 64a, 64b, 64c, 64d and 64e, respectively, having the same respective differential output flow values as above. Since "curves" 64a, 64b and 64c are the only ones visible in the first quadrant of FIG. 2B, all four quadrants are plotted at the same scale as FIG. 2A. In terms of tactile feel, the foregoing means that operation anywhere along static curve 64a involves substantially zero input torque. Further, negative rotational velocities (i.e., such as encountered when exiting a turn) must be generated by negative torque.

With reference again to FIG. 1A and later to FIG. 1B, the bootstrap principle of operation will be described. First and second output pressures present in output grooves 58a and 58b, respectively, are conveyed to first and second ends 66a and 66b, respectively, of three-way valve spool 68 by first and second sampling ports 70a and 70b, respectively. Differential pressure between the first and second output pressures conveyed to first and second ends 66a and 66b, respectively, causes three-way valve spool 68 to move axially in the direction of the lower pressure one thereof as depicted by rightward position of three-way valve spool 68. This allows the higher pressure one of the first and second output pressures to be conveyed to pressure sensing line 72 via first port 74a and first groove 76a of three-way valve spool 68, and groove 78 and sensing port 80 of housing 38. Sensing line 72 conveys the higher pressure one of the first and second output pressures to pump output regulating sub-assembly 12.

With particular reference now to FIG. 1B, the higher pressure one of the first and second output pressures is conveyed from pressure sensing line 72 to control chamber 82 of pump output regulating sub-assembly 12 via sensing port 84 and groove 86 of banjo fitting 88, port 90, passage 91, port 92 and thread relief groove 93 of pump output fitting 94, and passage 96 of pump control housing 98. In this case, the higher pressure one of the first and second output pressures acts upon control end 100 of valve spool 102 along with compression spring 104. In a known manner, excess pump delivery flow is bypassed toward a pump input port (not shown) via bypass port 105 which causes pump delivery pressure in pump output port 106 to be equal in value to the higher pressure one of the first and second output pressures plus a supplemental pressure value substantially equal to the force provided by compression spring 104 divided by the axially projected area of control end 100. The supplemental pressure becomes nominal pressure drop applied between pump output port 108 of pump output fitting 94, and sensing port 80 of control valve 14. By symmetry, an additional supplemental pressure drop substantially equal in value thereto is also applied between the lower pressure one of the pressures present in output grooves 58a and 58b and return line 54. The supplemental pressure's typical value is about 25 psi and it is termed ΔP herein. Since, by symmetry, two such nominal pressure drops occur, total parasitic pressure drop through control valve 14 is about 2ΔP.

Pump delivery volumetric flow through output port 108 and delivery line 34 is, of course, limited to flow values accepted by control valve 14. This is enabled by virtue of outer end 110 of valve spool 102 forming bypass orifice 111 from a portion of bypass port 105 and bypassing excess pumped fluid back to the pump's input port (not shown) via bypass port 105 and supercharging passage 112.

With reference again to FIG. 1A, it has been found necessary to utilize a pilot flow pressure dividing network 115 comprising substantially equal valued pilot flow orifices 114 and 116. Pilot flow orifice 114 couples input port 36 and groove 78, and pilot flow orifice 116 couples groove 78 and control valve cavity 118 which is directly coupled to return port 52. Combining pilot flow orifices 114 and 116 in series enables substantially balanced operation of the pressure control function described above for zero valued valve position because the pilot flow dominates commonly encountered leakage flows and obviates an otherwise critical need to balance leakage flows between input slots 26 and output slots 46a and 46b, and output slots 46a and 46b and return slots 28. However, the pilot flow through pilot flow pressure dividing network 115 is undesirable because it is subject to substantially full system pressure when high differential load pressures are encountered. Thus, it places a parasitic load on the bootstrap hydraulic system which can be significant at such high differential load pressures.

Generally however, bootstrap hydraulic system 10 is more effective than a system operated in an equivalent manner to an industrial constant pressure hydraulic system employing a closed-center four-way control valve because it has considerably higher efficiency and because its control characteristics are "stiffer" in the face of differential load pressures. Bootstrap hydraulic system 10 is more efficient in operation because pressure related energy losses are limited to pressure drop values of only about 25 psi across each of the input orifices 44a or 44b and return orifices 46b or 46a, respectively, instead of values in the order of 50 times that amount normally present in industrial constant pressure hydraulic systems. It is "stiffer" in the face of differential load pressures because the pressure drop values of about 25 psi across each of the open ones of input orifices 44a or 44b and return orifices 46b or 46a, respectively, are constant instead of decreasing with increasing values of differential load pressure in the manner of an industrial constant pressure hydraulic system. The "stiffness" characteristic is responsible for the bootstrap name because of its functional similarity to a method of increasing "stiffness" of an electronic amplifier also known by the appellation "bootstrap". (In bootstrapping an amplifier small amounts of positive feedback are utilized to render such an amplifier "stiff" with respect to heavy load current.)

A preferred embodiment of the invention is shown in FIGS. 3A and 3B, wherein a partially schematic view of a bootstrap hydraulic system 120 of a preferred embodiment of the invention comprising a sectional view of a closed-center control valve 122 utilized therein, and a sectional view of a modified pump output regulating sub-assembly 121 also utilized therein are shown, respectively. Pump output regulating sub-assembly 121 and control valve 122 include most of the components of pump output regulating sub-assembly 12 and control valve 14, respectively. As such, like reference numerals are used in FIGS. 1A and 1B, and FIGS. 3A and 3B to identify like components. With reference first to FIG. 3B and then to FIG. 3A, there is shown a pilot flow orifice 124 which conveys pilot flow from output port 108 to passage 91 and port 90. From there the pilot flow is conveyed to sensing port 80 of housing 38 via groove 86, port 84 and sensing line 72. First and second inner edges 126a and 126b, respectively, of three-way valve spool 68 are formed with a slightly smaller axial inter-edge dimension (which is depicted in exaggerated form in FIG. 3B in order to be visible) than the width of groove 78 in order to pass pilot flow therebetween whenever three-way valve spool 68 is in a centered position. The pilot flow is conveyed to first and second output slots 32a and 32b via first and second ports 74a and 74b, respectively, first and second sampling ports 70a and 70b, respectively, output grooves 58a and 58b, respectively, and first and second output ports 60a and 60b, respectively. Finally, pilot flow is conveyed through first and second notches 130a and 130b, respectively, of input shaft 131 to return slots 28, return slot ports 48, shaft relief ports 50, return port 52 and return line 54 to improved pump output regulating sub-assembly 121. Pilot flow orifice 124 and second and first notches 130b and 130a, respectively, are configured such that their respective flow resistances are approximately equal in order to effect an improved pilot flow pressure dividing network 132.

When valve position and differential load pressure are zero valued, improved pilot flow pressure dividing network 132 functions in a substantially identical manner as pilot flow pressure dividing network 115. However, as valve position and differential load pressure become non-zero valued, pilot flow coming from three-way valve spool 68 to the one of first and second output slots 32a and 32b having higher output pressure progressively becomes coupled to return slots via parasitic slots 30 and the other of first and second output slots 32a and 32b. This is because higher differential output pressures denote valve positions which serve to close the other of first and second notches 130a and 130b, respectively, thereby terminating the above noted portion of pilot flow subjected to high differential load pressures.

Figure 4A:
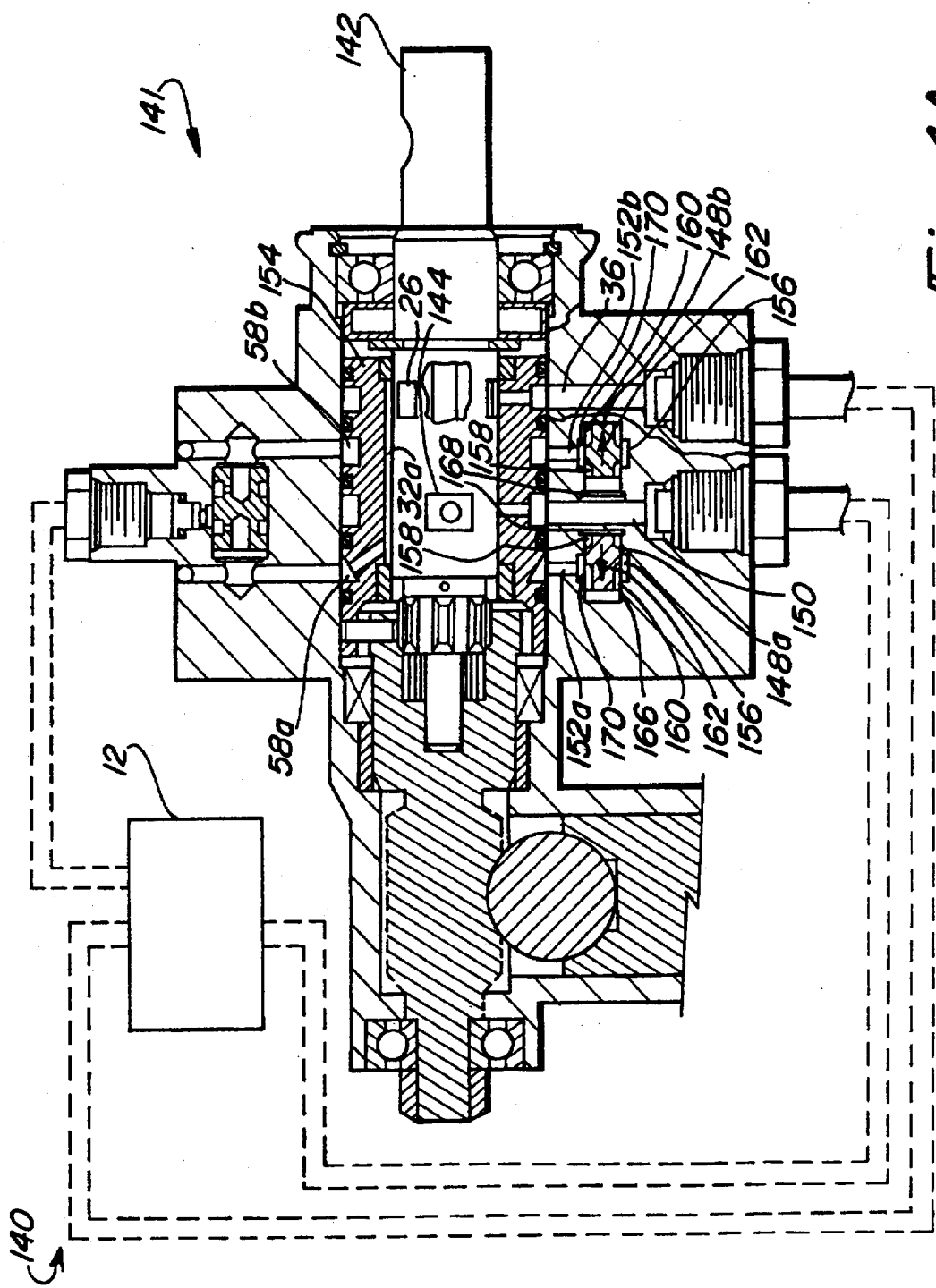
FIG. 4A is a partially schematic view of a bootstrap hydraulic system of a first alternative preferred embodiment of the invention comprising a sectional view of a closed-center four-way control valve utilized therein.
Figure 4B:
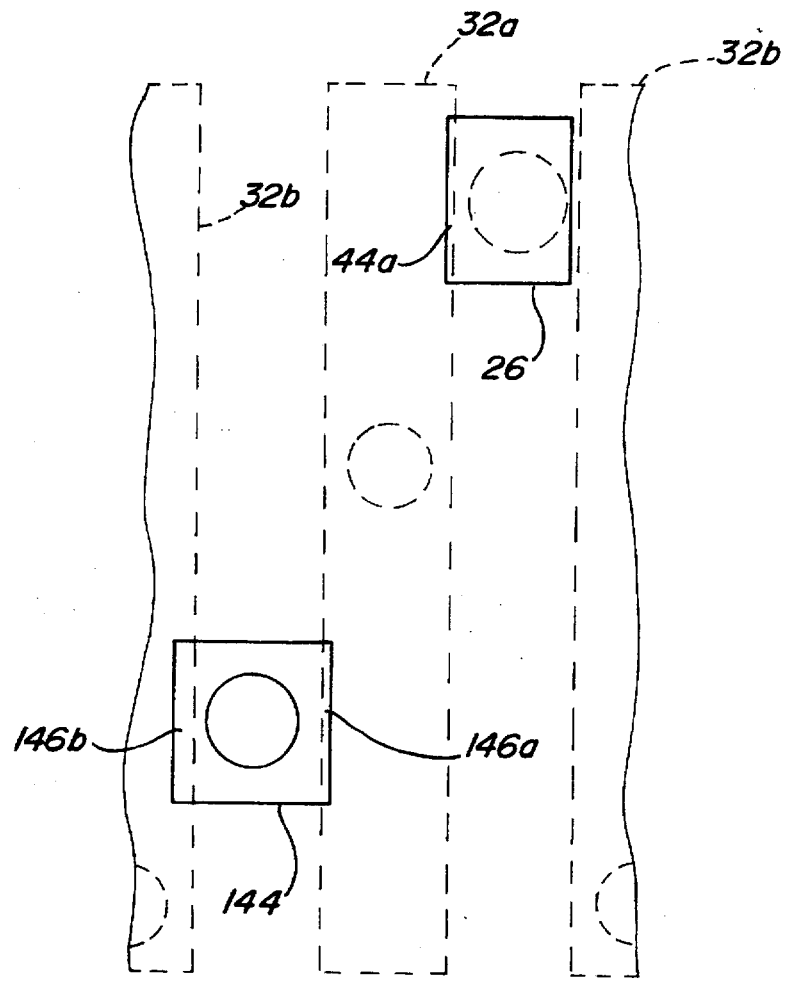
FIG. 4B is a descriptive plan view of flow control slots of the closed-center four-way control valve as shown in FIG. 4A of the invention.

A first alternative preferred embodiment of the invention is shown in FIGS. 4A and 4B, wherein a partially schematic view of a bootstrap hydraulic system 140 comprising a sectional view of a control valve 141 utilized therein and a descriptive plan view depicting flow control and parasitic slots of control valve 141 are shown, respectively. Control valve 141 includes many of the components of control valve 14. As such, like reference numerals are used in FIGS. 1A and 4A to identify like components. However, input shaft 142 comprises return slots 144 which are configured in an open-center manner. As described above, pump delivery fluid flows in through first input orifices 44a (or second input orifices 44b for oppositely directed valve positions) and out through second and/or first return orifices 146b and 146a, respectively, in an amount proportional to valve position. A comparison of plan area sizes of second return orifices 146b and first input orifices 44a shown in FIG. 4B clearly indicates a concomitant minimal pressure drop across second return orifices 146b due to pump delivery fluid flow. This means that first and second return orifices 146a and 146b, respectively, additionally perform the above described parasitic flow function and enable control valve 141 to effect pressure-effort curve shapes similar to those shown in FIG. 2A.

In addition, because first and second return orifices 146a and 146b, respectively, are configured in an open-center manner, the supplemental pressure value is substantially applied across the first or second input orifice 44a or 44b, respectively, having minimum pressure drop. Thus, no pressure dividing network is required and as a result pump output regulating sub-assembly 12 can be directly utilized in conjunction with control valve 141. Since only a single supplemental pressure sourced pressure drop is used, total parasitic pressure drop through control valve 141 only has a value of $\Delta P$ or about 25 psi. Thus, utilizing a combination of input orifices configured in a closed-center manner and return orifices configured in an open-center manner is comprised in a method of simultaneously eliminating pilot flow function and eliminating a second parasitic pressure drop in a host control valve.

However, because return slots 144 are substantially at atmospheric pressure by virtue of nominally direct connection to a reservoir 145 of pump output regulating sub-assembly 12, negatively directed parasitic flow therethrough could result in negative pressure values being present in the ones of output slots 32a and 32b, and output grooves 58a and 58b having lower pressure. This could result in cavitation which is deemed to be unacceptable. For this reason first and second check valves 148a and 148b, respectively, are disposed directly between a centrally located return port 150, and respective ones of first and second output ports 152a and 152b, respectively. This, in turn, results in use of a modified valve sleeve 154, and repositioning of input port 36 and input slots 26. First and second check valves 148a and 148b, respectively, must each be able to pass full load flow with minimal pressure drop thereacross. They must activate and deactivate smoothly.

Figure 5:
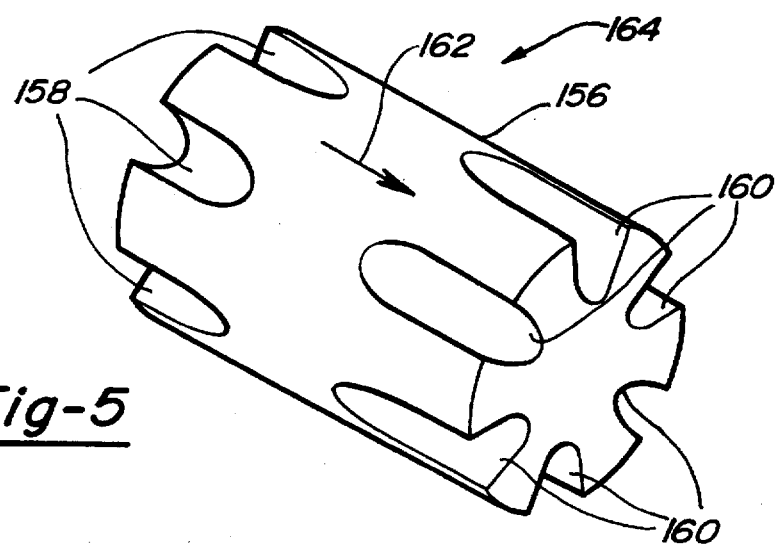
FIG. 5 is an isometric view of an improved valve spool of the closed-center four-way control valve as shown in FIG. 4A of the invention.

With reference now to FIG. 5, improved valve spool 156 comprised within first and second check valves 148a and 148b, respectively, as the moving element thereof is shown. Input end slots 158 and output end slots 160 are formed as short and long truncated spur gear shapes, respectively. A flow direction arrow 162 is imprinted in center section 164.

With reference again to FIG. 4A, first and second check valves 148a and 148b, respectively, additionally comprise bore 166 within which two improved valve spools 156 are installed as indicated by their respective flow direction arrows 162. Other than selected blockage provided by either or both improved valve spools 156, bore 166 interconnects return port 150 and first and second output ports 152a and 152b, respectively. Axial motion of improved valve spools 156 is limited by respective ones of retaining rings 168. First and second check valves 148a and 148b, respectively, are shown in blocking and open positions, respectively, as caused by positive and negative output pressure values (i.e., with respect to return pressure present in return port 150), respectively, in first and second output ports 152a and 152b, respectively. As can be seen, internal grooves 170 provide for bypassed fluid passage via input and output end slots 158 and 160, respectively, when either of first and second check valves 148a and 148b, respectively, are in their open position as is shown with respect to second check valve 148b. With reference to FIGS. 4A and 5, input end slots 158 are formed in a shortened manner to enable the blocking position depicted by first check valve 148a while output end slots 160 are formed in a lengthened manner to enable the open position depicted by second check valve 148b.

Figure 6A:
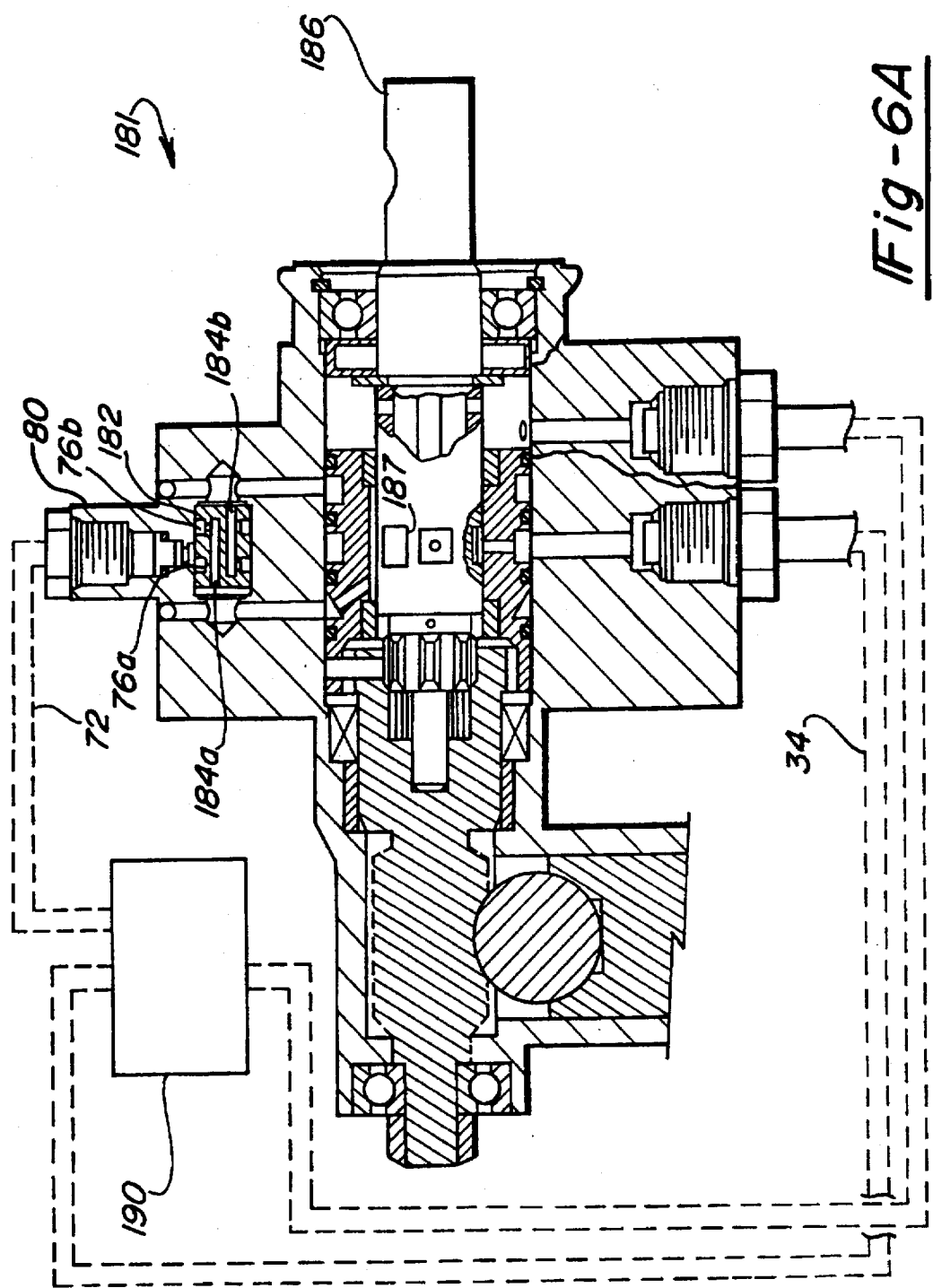
FIG. 6A is a partially schematic view of a bootstrap hydraulic system of a second alternative preferred embodiment of the invention comprising a sectional view of a closed-center four-way control valve utilized therein.
Figure 6B:
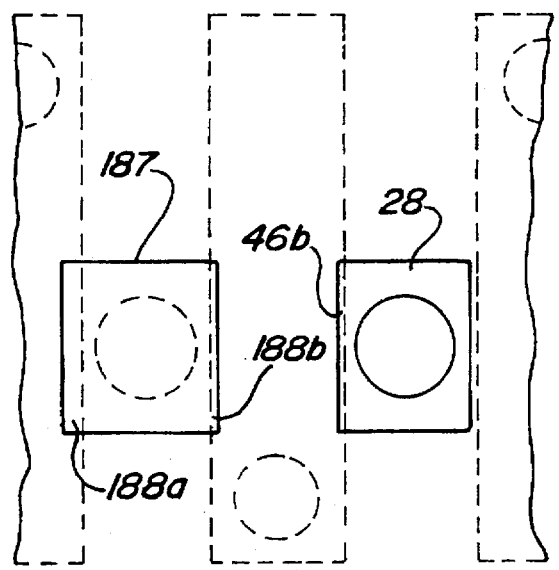
FIG. 6B is a descriptive plan view of flow control slots of the closed-center four-way control valve shown in FIG. 6A of the invention.

A second alternative preferred embodiment of the invention is shown in FIGS. 6A and 6B, wherein a partially schematic view of a bootstrap hydraulic system 180 of a preferred embodiment of the invention comprising a sectional view of a control valve 181 utilized therein and a descriptive plan view depicting flow control slots of control valve 181 are shown, respectively. Control valve 181 includes many of the components of control valve 14. As such, like reference numerals are used in FIGS. 1A and 6A to identify like components. However, three-way valve spool 182 is configured with first and second ports 184a and 184b, respectively, conveying first and second output pressures, respectively, to second and first grooves 76b and 76a, respectively, thereof. Thus, the lower pressure one of the first and second output pressures is conveyed to sensing port 80 and sensing line 72.

In addition, input shaft 186 comprises input slots 187 which are configured in an open-center manner. Pump delivery fluid flows in through first and second input orifices 188a and 188b, respectively, and out through second return orifices 46b (or first return orifices 46a for oppositely directed valve positions) in an amount proportional to valve position. A comparison of plan area sizes of first input orifices 188a and second return orifices 46b shown in FIG. 6B clearly indicates a concomitant minimal pressure drop across first input orifices 188a due to pump delivery fluid flow. This means that first and second input orifices 188a and 188b, respectively, additionally perform the above described parasitic flow function and enable control valve 181 to effect pressure-effort curve shapes similar to those shown in FIG. 2A.

Because first and second input orifices 188a and 188b, respectively, are configured in an open-center manner, the supplemental pressure value is substantially applied across the first or second return orifice 46a or 46b, respectively, having minimum pressure drop. Thus, no pressure dividing network is required. Since only a single supplemental pressure sourced pressure drop is used, total parasitic pressure drop through control valve 181 only has a value of $\Delta P$. Thus, utilizing a combination of input orifices configured in an open-center manner and return orifices configured in a closed-center manner is comprised in a method of simultaneously eliminating pilot flow function and eliminating a second parasitic pressure drop in a host control valve. Also, because the lower pressure one of the first and second output pressures has a positive value, no negative output pressure values are possible. Thus, check valves are not required in order to avoid cavitation as described above with respect to control valve 141.

Figure 7B:
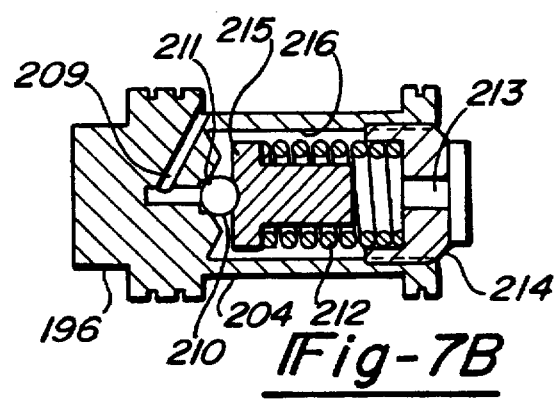
FIG. 7B is a sectional view of a pressure relief valve used in the pump output regulating sub-assembly of FIG. 7A of the invention.
Figure 7A:
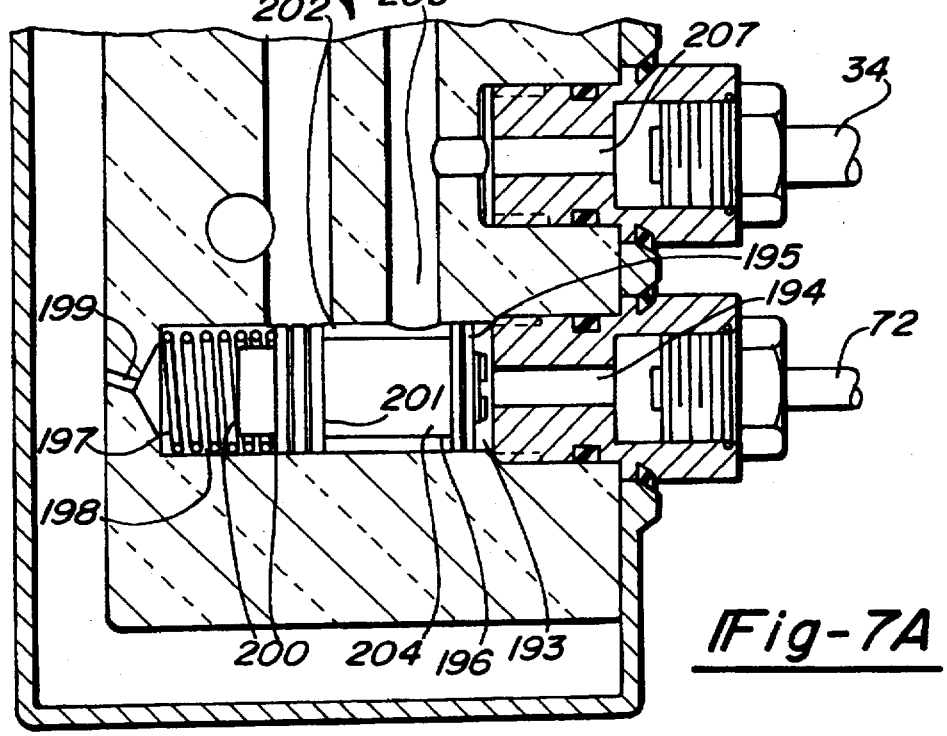
FIG. 7A is a sectional view of a pump output regulating sub-assembly also comprised in the second alternative preferred embodiment of the invention.

With reference to FIGS. 7A and 7B, sectional views depicting pump output regulating sub-assembly 190 and an inverted relief valve 208 thereof are shown, respectively. Pump output regulating sub-assembly 190 and inverted relief valve 208 are used in conjunction with control valve 181 in bootstrap hydraulic system 180. Pump output regulating sub-assembly 190 comprises pressure regulating sub-assembly 192 which is utilized to selectively bypass a portion of pump output flow such that net pump delivery flow conveyed to control valve 181 via pump delivery line 34 is sufficient to maintain the lower pressure one of the first and second output pressures at a value of $\Delta P$. As shown in FIG. 7A, the lower pressure one of the first and second output pressures is conveyed from pressure sensing line 72 to control chamber 193 via sensing port 194. The lower pressure one of the first and second output pressures acts upon control end 195 of valve spool 196. Compression spring 197 located in biasing chamber 198, which is vented to reservoir (i.e. atmospheric) pressure via port 199, acts in opposition (to the lower pressure one of the first and second output pressures) upon biasing end 200 of valve spool 196 in such a manner that differential pressure between control chamber 193 and biasing chamber 198 is equal to $\Delta P$. This causes valve spool 196 to move toward control chamber 193 whereby land 201 progressively covers bypass port 202. Excess pump delivery flow is conveyed to the annular volume surrounding valve spool groove 204 via port 205. As described above, excess pump delivery flow is bypassed back toward a pump input port (not shown) via bypass port 202 and net pump delivery flow is conveyed to pump delivery line 34 via pump output port 207. This results in the lower pressure one of the first and second output pressures being maintained at a value of $\Delta P$ as desired.

With particular reference to FIG. 7B, an inverted pressure relief valve 208 formed within valve spool 196 is shown. Inverted pressure relief valve 208 is provided for avoiding excessive output pressure should a driver strike a curb or hold the steering system against a travel limit. In inverted pressure relief valve 208 passage 209 conveys pump output pressure from the annular volume surrounding valve spool groove 204 to ball 210. If pump output pressure exceeds a selected maximum value, ball 210 is lifted from seat 211 against axially directed thrust provided by compression spring 212. In such a case, fluid is conveyed through bore 213 formed in internal adjusting nut 214 to control chamber 193 wherein it flows back through sensing line 72 and tends to overpower pressure in the sensing fluid. This selectively raises control pressure such that valve spool 196 moves against compression spring 197 and progressively uncovers bypass port 202. This reduces the volumetric flow of fluid conveyed through pump delivery line 34 to control valve 181 to a value whereat the excessive output pressure value is reduced to the maximum value.

During assembly of inverted relief valve 208, ball 210 is positioned on seat 211 and compression spring 212 is positioned upon spring mount 215. Then spring mount 215 and compression spring 212 are inserted into threaded bore 216 along with internal adjusting nut 214 such that spring mount 215 bears against ball 210. According to a known test procedure, internal adjusting nut 214 is first coated with adhesive material and then rotationally, and therefore axially, positioned such that ball 210 remains sealingly seated upon seat 211 until the selected value of output pressure is reached. Then the adhesive material is allowed to cure and assembly of inverted pressure relief valve 208 is complete.

A third alternative preferred embodiment of the invention is shown in FIG. 8, wherein a partially schematic view of a bootstrap hydraulic system 220 of a preferred embodiment of the invention comprising a sectional view of a control valve 221 utilized therein is shown. Control valve 221 operates in substantially the same manner as control valve 181 and includes most of the components thereof. As such, like reference numerals are used in FIGS. 6A and 8 to identify like components. In this case however, pump delivery pressure is set by a pressure regulating sub-assembly 222 which functions in substantially the same manner as pressure regulating sub-assembly 192 of pump output regulating sub-assembly 190 and includes many of the components thereof. As such, like reference numerals are used in FIGS. 7A and 8 to identify like components. However, pressure regulating sub-assembly 222 is located externally with reference to a nominally constant output flow system pump assembly (i.e., in this case it is mounted within control valve 221) and is utilized to remotely set required pump delivery pressure values. In pressure regulating sub-assembly 222, input port 224 conveys nominally constant pump delivery flow to the annular space surrounding valve spool groove 204, bypass port 216 conveys bypass flow to return port 52, and net pump delivery flow is conveyed to input groove 40 via port 226.

Figure 9:
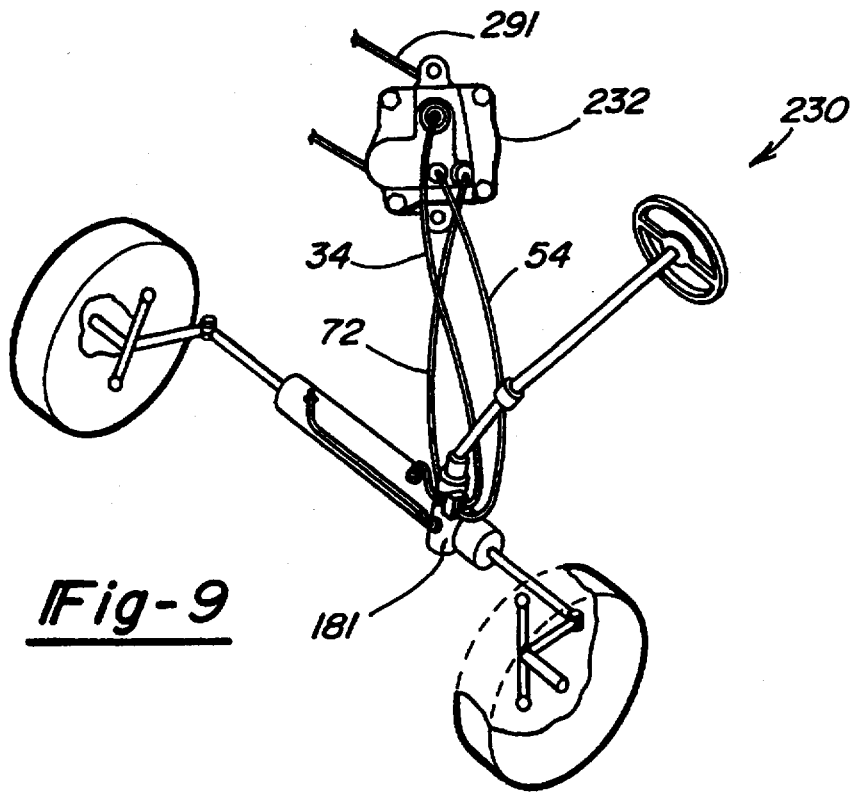
FIG. 9 is a schematic drawing of a fourth alternative preferred embodiment of the invention showing a bootstrap HMPS system comprising a variable displacement pump.

A fourth alternative preferred embodiment of the invention is shown in FIG. 9, wherein a maximally efficient bootstrap HMPS system 230 comprising a variable displacement pump 232 is shown. In this case variable displacement pump 232 provides fluid to control valve 181 without internal bypass flow. Thus, other than leakage flow, all pumped fluid is delivered to control valve 181. In bootstrap HMPS system 230, pump delivery line 34, return line 54 and sensing line 72 are used to convey fluid respectively in the same manner as described above with respect to bootstrap hydraulic system 180 comprising control valve 181 and pump output regulating sub-assembly 190.

With reference to FIGS. 10A, 10B, 10C and 10D, first, second, third and fourth sectional views, respectively, of variable displacement pump 232 are shown. Variable displacement pump 232 operates in a pressure unbalanced manner and utilizes an odd number of rollers 233 as radial sealing members between a like number of pumping chambers 234 within circular cam ring 235. Volumetric displacement of variable displacement pump 232 is varied by altering volumes of pumping chambers 234 as they are rotationally driven within cam ring 235 by rotor 236. This is achieved by changing the eccentric position of cam ring 235 relative to rotor 236 in an orthogonal direction with respect to inlet and delivery ports 237 and 238, respectively. Lateral positioning of cam ring 235 is effected by differential force generated by the product of the difference between control pressure in control chamber 239 and any bias pressure in biasing chamber 240, and laterally projected end area of outer periphery 242 of cam ring 235. In operation, this force is balanced against bias force generated by compression spring 243 and reaction surface 244 as applied via free roller 245.

Figures 10A, 10E:
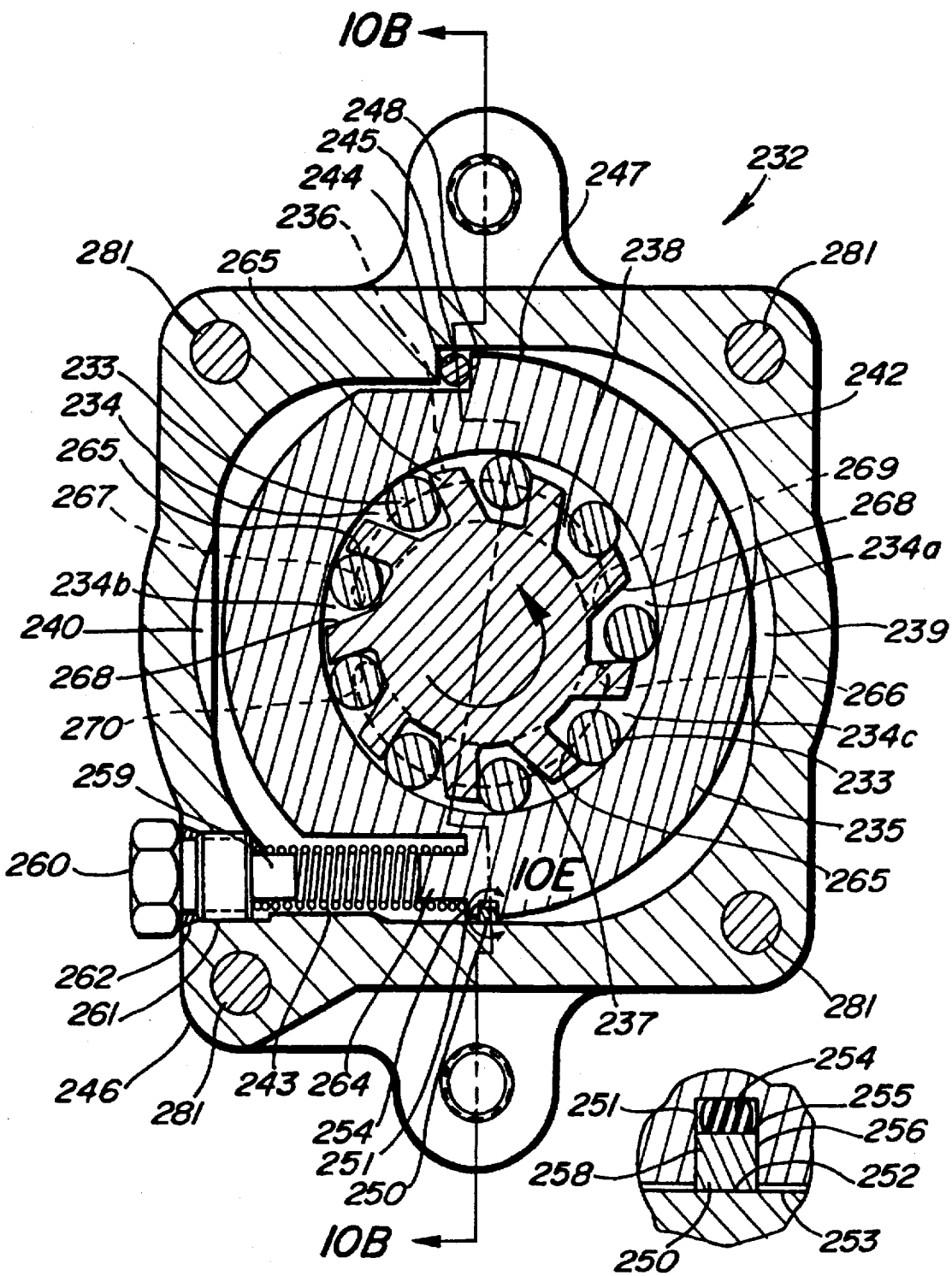
FIGS. 10A, 10B, 10C and 10D are first, second, third and fourth sectional views, respectively, of the variable displacement pump as shown in FIG. 9 of the invention.
FIG. 10E is an enlarged view of seal and cycloidal surface from FIG. 10A.
Figure 10B:
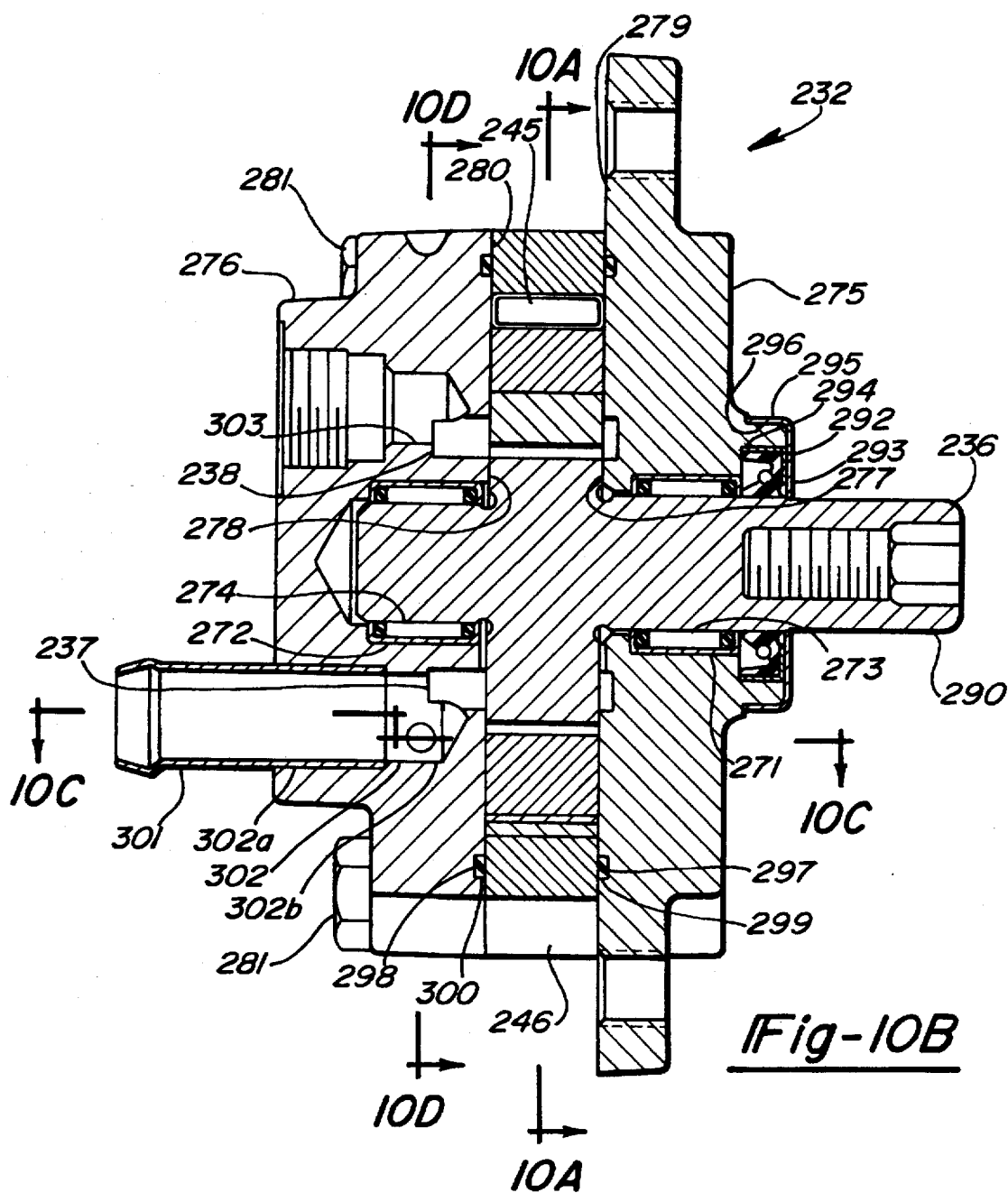

Pressure imbalance between inlet and delivery ports 237 and 238, respectively, urges cam ring 235 sealingly into rolling engagement with center housing body 246 at contact point 247 in the manner of a cam follower bearing. As depicted in FIG. 10A, rotor 236 rotates in a counterclockwise direction in order to pump fluid from inlet port 237 to delivery port 238. Reaction surface 248 of cam ring 235 is rotationally positioned with respect to reaction surface 244 of center housing body 246 against free roller 245 by superposition of approximately half of the above mentioned differential force and any frictionally generated counterclockwise rotational torque imposed upon cam ring 235 by rollers 233.

Seal 250 is located in slot 251. Surface 252 of seal 250 is urged into sealing engagement with nominally cycloidal surface segment 253 of center housing body 246 by compliant cylindrical member 254 formed of elastomeric material. In addition, control pressure acting on surfaces 255 and 256 of seal 250 further urges seal 250 sealingly toward nominally cycloidal surface segment 253 and edge 258 of slot 251, respectively.

During assembly, compression spring 243 is mounted upon boss 259 of plug 260. Plug 260 is then threadingly inserted into threaded portion of bore 261 of center housing body 246 until O-ring 262 sealingly engages tapered portion of bore 261. As plug 260 is inserted, compression spring 243 is located upon boss 264 of cam ring 235. Bosses 259 and 264 guide compression spring 243 during assembly as well as during functional operation of cam ring 235 as described above.

Rollers 233 are constrained to move in a radially disposed plane with respect to rotor 236 by driving surfaces 265 thereof. Each one of driving surfaces 265 is formed as a planar surface displaced from the desired radial plane of motion of its respective roller 233 by an amount equal to the radius of rollers 233. During each revolution of rotor 236 each one of the driving surfaces 265 performs a closing valve-like interface with closing contour 266 of inlet port 237 and closing contour 267 of delivery port 238 a half turn later. Concomitant with each closing valve-like interface, a respective one of opposite surfaces 268 performs an opening valve-like interface with one of opening contours 269 or 270 of delivery port 238 or inlet port 237, respectively. One such hydraulic commutation is depicted in FIG. 10A wherein pumping chamber 234a is being switched from inlet pressure to delivery pressure. The next hydraulic commutation to occur will be that of pumping chamber 234b from delivery pressure to inlet pressure. This will be followed by pumping chamber 234c being switched from inlet pressure to delivery pressure and so on.

As a side effect of the pressure unbalanced mode of operation, rotor 236 of variable displacement pump 232 must support heavy side loads (i.e., in the order of 1,000 lbs). As shown particularly in FIG. 10B, this can be facilitated by forming rotor 236 as one piece rather than as separate rotor and shaft members coupled via spline drive (i.e., as is normal practice for pressure balanced vane pumps utilizing an elliptical cam ring). Rotor 236 must, in turn, be supported by bearing support means able to withstand the heavy side loads. One way this can be accomplished comprises front and rear drawn cup needle bearings 271 and 272, respectively, for supporting front and rear shaft portions 273 and 274, respectively, of rotor 236 in front and rear housing bodies 275 and 276, respectively. Concomitantly, rotor 236 is located and supported in an axial direction by running clearance fit between front shoulder 277 and rear shoulder 278 thereof, and face 279 of front housing body 275 and face 280 of rear housing body 276, respectively. Optimally, the overall running clearance fit is maintained at a value in the range of 0.0004 in. to 0.0006 in. via selective assembly comprising a match between the axial distance between front and rear shoulders 277 and 278, respectively, of each rotor 236 and an appropriate one of center housing bodies 246 selected from a range thereof having selected thickness values. Front, center and rear housing bodies 275, 246 and 276, respectively, are transversely located with respect to one another in a known manner by dowel sleeves surrounding shaft portions (not shown) of bolts 281 and then retained by bolts 281.

In addition, a pulley (not shown) drives variable displacement pump 232 via interference fit upon front shaft extension 290 of rotor 236 via belt 291 (as shown in FIG. 9).

Installation and removal of the pulley is generally accomplished with pulley installation and removal tools such as sold by OTC Co. of Owatanna, Minn.

Fluid is prevented from leaking between front shaft extension 290 and front housing body 275 by shaft seal 292. Shaft seal 292 is also provided with a dust seal lip portion 293. It is retained in bore 294 of front housing body 275 by retainer 295 which is pressed on boss 296 of front housing body 275. Fluid leakage is also prevented by O-ring seals 297 and 298 located in grooves 299 and 300 formed in faces 279 and 280, respectively.

Fluid enters variable displacement pump 232 from a reservoir via a tubing (neither shown) clamped on input tube 301 which is sealingly retained in a rear portion 302a of bore 302 by adhesive. The fluid then enters inlet port 237 directly as depicted by the confluence of a forward portion 302b of bore 302 and inlet port 237 and is pumped to delivery port 238 as described above. Finally, the fluid is delivered to an output fitting and delivery line (neither shown) via an output port 303 formed in a known manner for receiving such output fittings.

Figure 10C:
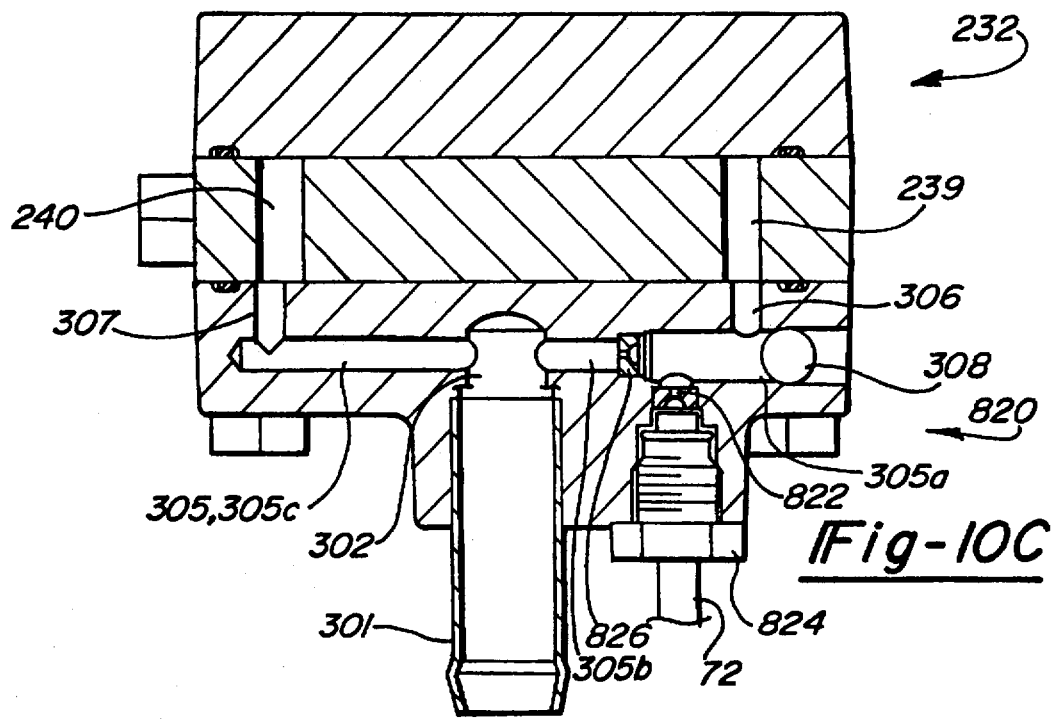

With particular reference now to FIGS. 9 and 10C, a control pressure that is a selected fraction of the lower pressure one of the first and second output pressures is conveyed by sensing fluid flow from pressure sensing line 72 and fitting 824 through sensing impedance circuit 820 to bore 302. The sensing fluid flow is conveyed from pressure sensing line 72 to bore 302 via first orifice 822, passage 305a formed by a first portion of bore 305, second orifice 826 and passage 305b formed by a second portion of bore 305. Fluid flow in, or out of, control chamber 239 via passage 305a and port 306 is selectively restricted by a source impedance $R_s$ of sensing impedance circuit 820 comprising the parallel combination of flow resistances of first and second orifices 822 and 826, respectively, according to the formulas $$R_s = (\rho Q_{sn})/(C_d^2 (A_1^2 + A_2^2)),$$

$$Q_{sn} = C_d A_1 ((2\Delta P_1)/\rho)^{0.5} = C_d A_2 ((2\Delta P_2)/\rho)^{0.5}$$

and $$\Delta P = \Delta P_1 + \Delta P_2$$

where $Q_{sn}$ is the sensing flow rate, $A_1$ is flow area of first orifice 822, $A_2$ is flow area of second orifice 826, $\Delta P$ is the gross sensing, or lower pressure one of the first and second output pressures which is the desired supplemental pressure, $\Delta P_1$ is pressure drop through first orifice 822 and $\Delta P_2$ is pressure drop through second orifice 826 and the net sensing pressure conveyed to control chamber 239. In addition, a third portion of bore 305 forms passage 305c which vents biasing chamber 240 to bore 302 via port 307. Ball 308 is sealingly pressed into an entrance portion of bore 305 to form passage 305a. Compression spring 243 is chosen such that, along with concomitantly applied force from reaction surface 244, it provides a force resulting in the lower valued one of first and second output pressures having a value equal to desired supplemental pressure $\Delta P$ according to the above formulas. Utilizing selected values for sensing impedance circuit 820 is comprised in a method of damping motions of cam ring 235 and providing for stable operation thereof.

Figure 10D:
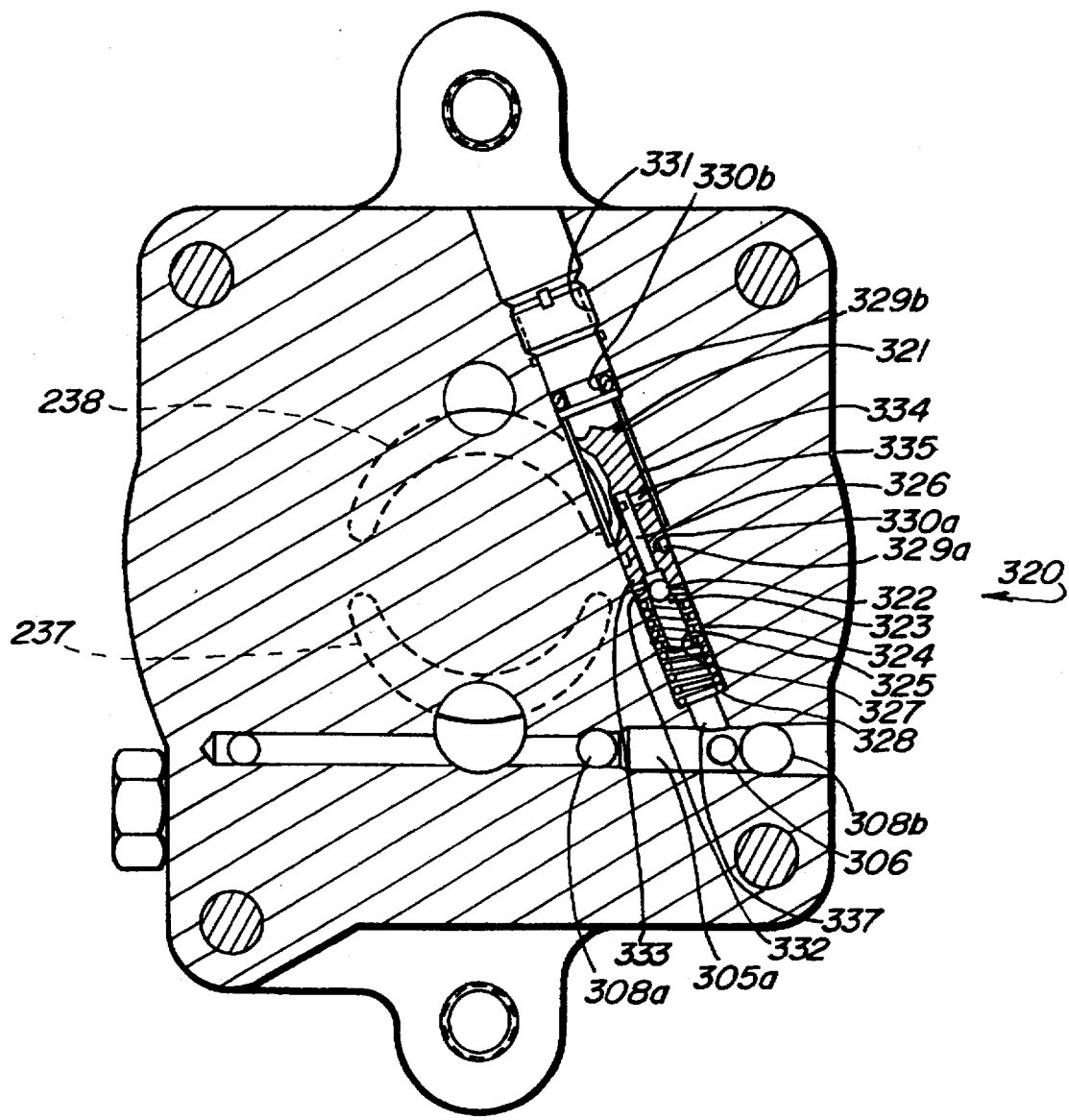

With reference now to FIG. 10D, pressure relief valve sub-assembly 320 allows fluid to flow from delivery port 238 into passage 305a in the event of an excessive pressure value in delivery port 238. This tends to overpower pressure in the sensing fluid from control valve 181 and selectively raises control pressure in control chamber 239 such that cam ring 235 moves against compression spring 243 and reduces pump output until the excessive pressure value is terminated.

Pressure relief valve sub-assembly 320 comprises ball seat fitting 321, ball 322, ball mount 323 and compression spring 324 all mounted in bore 325 formed in rear housing body 276. Bore 325 is formed such that it penetrates delivery port 238 to form entry port 326. During assembly, compression spring 324 is mounted upon boss 327 of ball mount 323 and they are inserted into bore 325 against shoulder 328. O-ring seals 329a and 329b are installed in grooves 330a and 330b, respectively, and adhesive is coated upon threads 331 of ball seat fitting 321. Then ball 322 is dropped into place against pocket 332 formed in ball mount 323 and ball seat fitting 321 is threadingly inserted into bore 325 until compression spring 324 is compressed such that a selected value of pressure is required to force it off seat 333 formed in ball seat fitting 321. Assembly is complete when the adhesive completes its cure period.

In operation whenever excessive pressure (i.e., pressure in excess of a selected maximum value) is present, high pressure fluid enters entry port 326 and flows through annular space 334, ports 335 and passage 326 to force ball 322 off seat 333. The fluid then flows around ball mount 323, and through compression spring 324 and port 337 to passage 205a from whence it raises control pressure in control chamber 239 in a manner similar to that described above with reference to inverted pressure relief valve 208.

Figure 11:
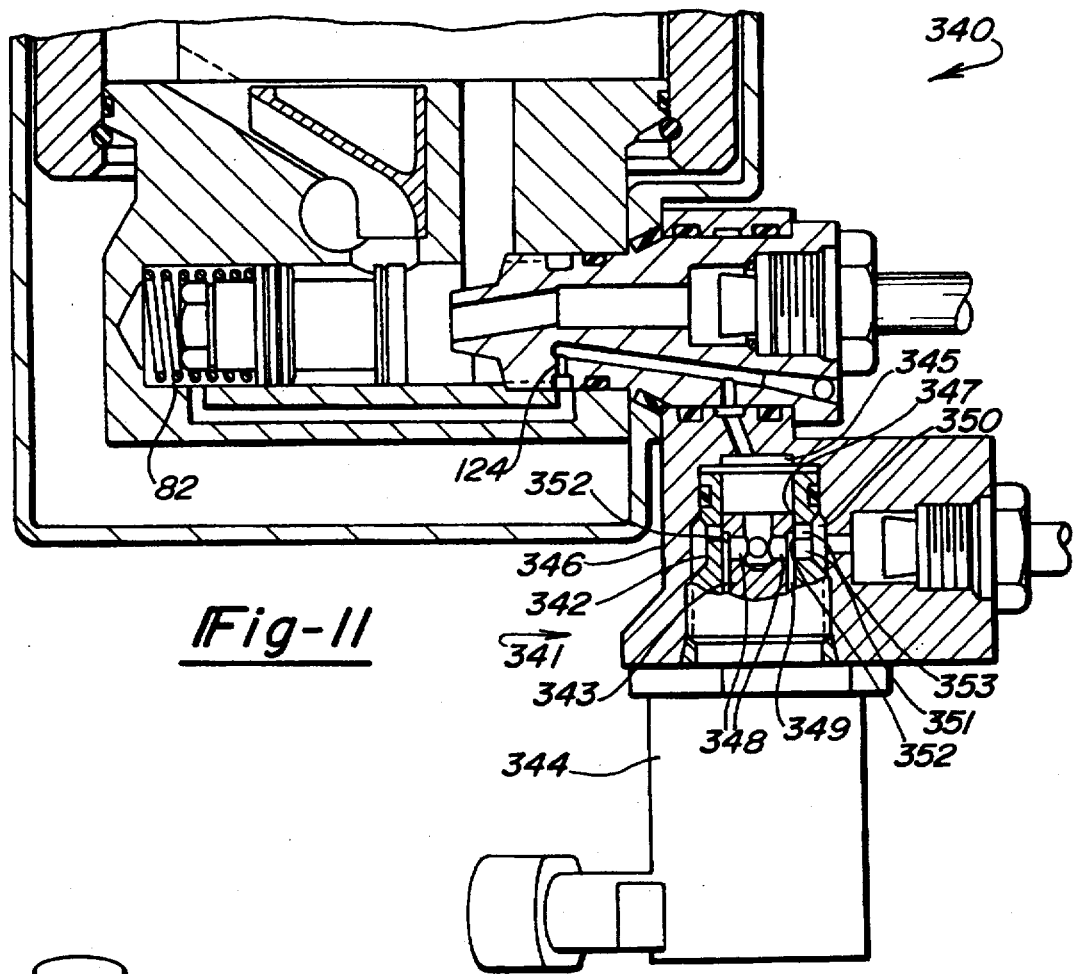
FIG. 11 is sectional view of a pump output regulating sub-assembly comprised in a fifth alternative preferred embodiment of the invention providing speed sensitive control of steering assist.

A fifth alternative preferred embodiment of the invention is shown in FIG. 11, wherein a pump output regulating sub-assembly 340 adapted for providing speed sensitive control of steering assist in systems where the higher pressure one of first and second output pressures is used as a control pressure is shown. Pump output regulating sub-assembly 340 includes most of the components of pump output regulating sub-assembly 121. As such, like reference numerals are used in FIG. 3A and FIG. 11 to identify like components. However, pump output regulating sub-assembly 340 utilizes pilot flow to enable speed sensitive control of steering assist as follows:

After passing through pilot flow orifice 124, pilot flow is restricted by an electronically variable orifice sub-assembly 341 which comprises a stationary valve sleeve 342 and an axially movable valve spool 343 positioned in a known manner by spring-loaded solenoid 344. Because electronically variable orifice sub-assembly 341 is located downstream of control chamber 82, control pressure present in control chamber 82 is elevated by the value $(A_{pfo}/A_{evo})^2 \Delta P$, where $A_{pfo}$ is effective flow area of pilot flow orifice 124, $A_{evo}$ is effective flow area of electronically variable orifice sub-assembly 341, and $\Delta P$ is the supplemental pressure value across pilot flow orifice 124 as defined above. As a result of so increasing control pressure, pressure drop value impressed upon open ones of input orifices 44a or 44b is increased to the value $(1+(A_{pfo}/A_{evo})^2) \Delta P$.

In pump output regulating sub-assembly 340, pilot flow flows into bore 345 formed in banjo fitting 346 and then into bore 347 formed in valve spool 343 of electronically variable sub-assembly 341. The pilot flow then flows radially outward through ports 348 to annular space 349. The pilot flow next flows radially outward to annular space 350 outside of valve sleeve 342. The pilot flow flows in parallel fashion through low speed flow control orifice 351 and high speed flow control orifices 352 where the effective areas of high speed flow control orifices 352 are determined by axial position of valve spool 343 relative to ports 353. The sum of the effective flow areas of low speed flow control orifice 351 and high speed flow control orifices 352 determines effective flow area of electronically variable orifice sub-assembly 41, $A_{evo}$. (In FIG. 11, valve spool 343 is shown in a mid-position whereat high speed flow control orifices 352 are partially open.)

Valve spool 343 is axially positioned by spring-loaded solenoid 344 whereby a relaxed position thereof is in an extended position. Thus, low speed operation corresponds to a maximum value of solenoid current and high speed operation corresponds to a zero value of solenoid current. In normal operation, increased values of pressure assist are achieved at low speed (i.e., during parking) and range down to decreased values of pressure assist at high speed via reducing current applied to spring-loaded solenoid 344 from the maximum value to a zero value, respectively. The size of high speed flow control orifices 352 is chosen such that the resulting value of pressure drop value impressed upon open ones of input orifices 44a or the corresponding orifice when on the opposite side $(1+(A_{pfo}/A_{evo})^2) \Delta P$, is nominally equal to $\Delta P$ for high speed operation where $A_{evo}$ has its largest value. And, since fail-safe control means (not shown) are normally configured to implement a zero value of solenoid current, the corresponding failure mode of speed sensitive control for the pump output regulating sub-assembly 340 is its high speed mode of operation.

Utilizing pilot flow to selectively increase control pressure and therefore pressure drop value impressed upon open ones of flow control orifices is comprised in a method of providing speed sensitive control of steering assist. Furthermore, restricting a failure mode of providing the selectively increased control pressure to reducing it toward its minimum value is comprised in a method of providing a fail-safe provision of speed sensitive control of steering assist.

Figure 12:
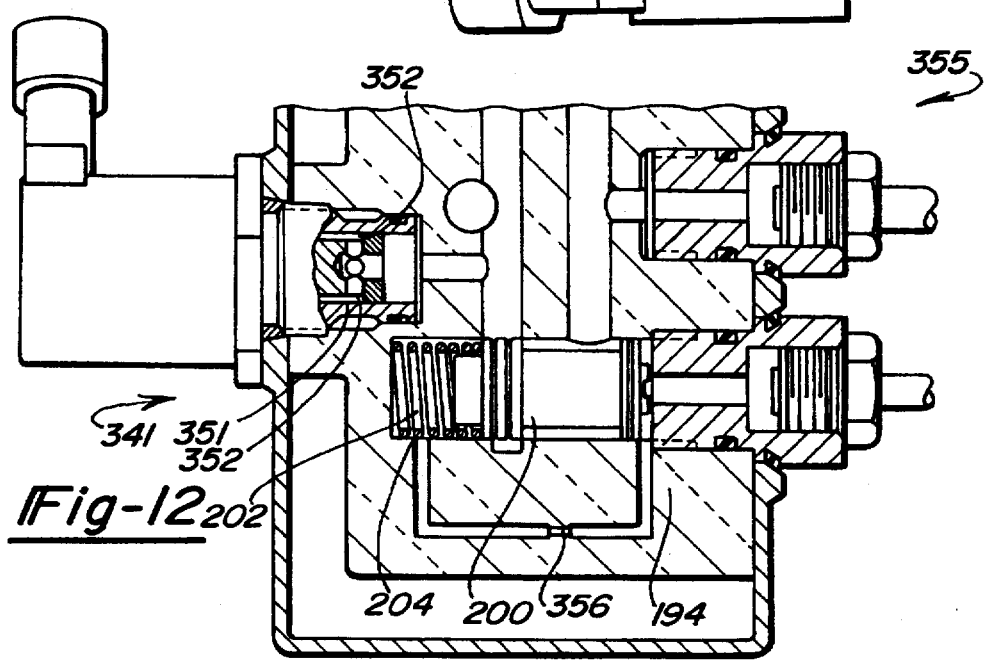
FIG. 12 is sectional view of another pump output regulating sub-assembly comprised in a sixth alternative preferred embodiment of the invention also providing speed sensitive control of steering assist.

A sixth alternative preferred embodiment of the invention is shown in FIG. 12, wherein pump output regulating sub-assembly 355 is adapted for providing speed sensitive control of steering assist where the lower pressure one of first and second output pressures is used as a control pressure is shown. Pump output regulating sub-assembly 355 includes most of the components of pump output regulating sub-assembly 190. In addition, pump output regulating sub-assembly 355 utilizes electronically variable orifice sub-assembly 341. As such, like reference numerals are used in FIG. 7, FIG. 11 and FIG. 12 to identify like components. Pump output regulating sub-assembly 355 utilizes pilot flow to enable speed sensitive control of steering assist as follows:

In pump output regulating sub-assembly 355, a pilot flow path comprising pilot flow orifice 356 and electronically variable orifice sub-assembly 341 conveys control pressure $P_c$ and biasing pressure $P_b$ to control chamber 194 and biasing chamber 204, respectively. As a design choice in pump output regulating sub-assembly 355 however, pilot flow flows radially inward through low speed flow control orifice 351 and high speed flow control orifices 352. As in pump output regulating sub-assembly 190, compression spring 202 acts on valve spool 200 in a manner that sets differential pressure between control and biasing chambers 194 and 204, respectively, equal to $\Delta P$. Because pilot flow orifice 356 and electronically variable orifice sub-assembly 341 are located downstream of control chamber 194 and biasing chamber 204, respectively, control pressure present in control chamber 194 is elevated by the value $(A_{pfo}/A_{evo})^2 \Delta P$, where in this case $A_{pfo}$ is effective flow area of pilot flow orifice 356, $A_{evo}$ is effective flow area of electronically variable orifice sub-assembly 341, and $\Delta P$ is the supplemental pressure value across pilot flow orifice 356. Thus, pressure drop impressed upon open ones of first or second return orifices 46a or 46b, respectively, is increased to $(1+(A_{pfo}/A_{evo})^2) \Delta P$.

Figure 13B:
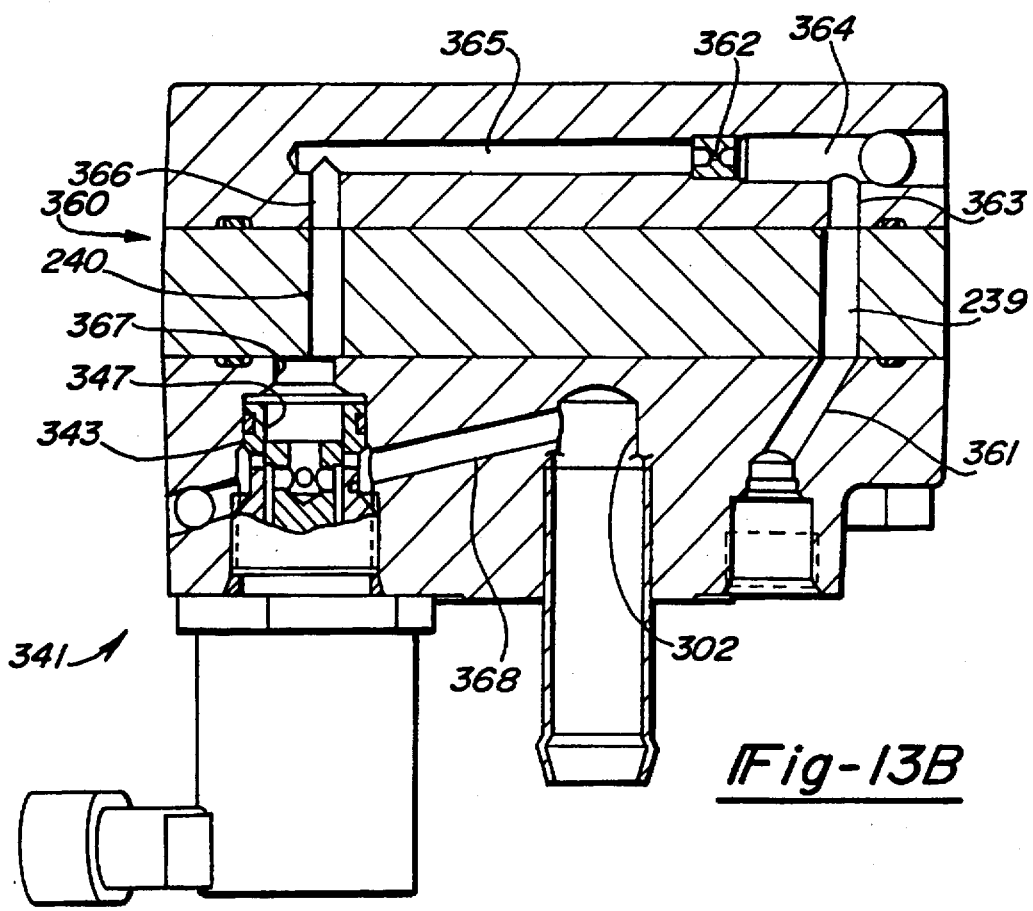
FIGS. 13A and 13B are plan and sectional views, respectively, of a variable displacement pump comprised in a seventh alternative preferred embodiment of the invention also providing speed sensitive control of steering assist.
Figure 13A:
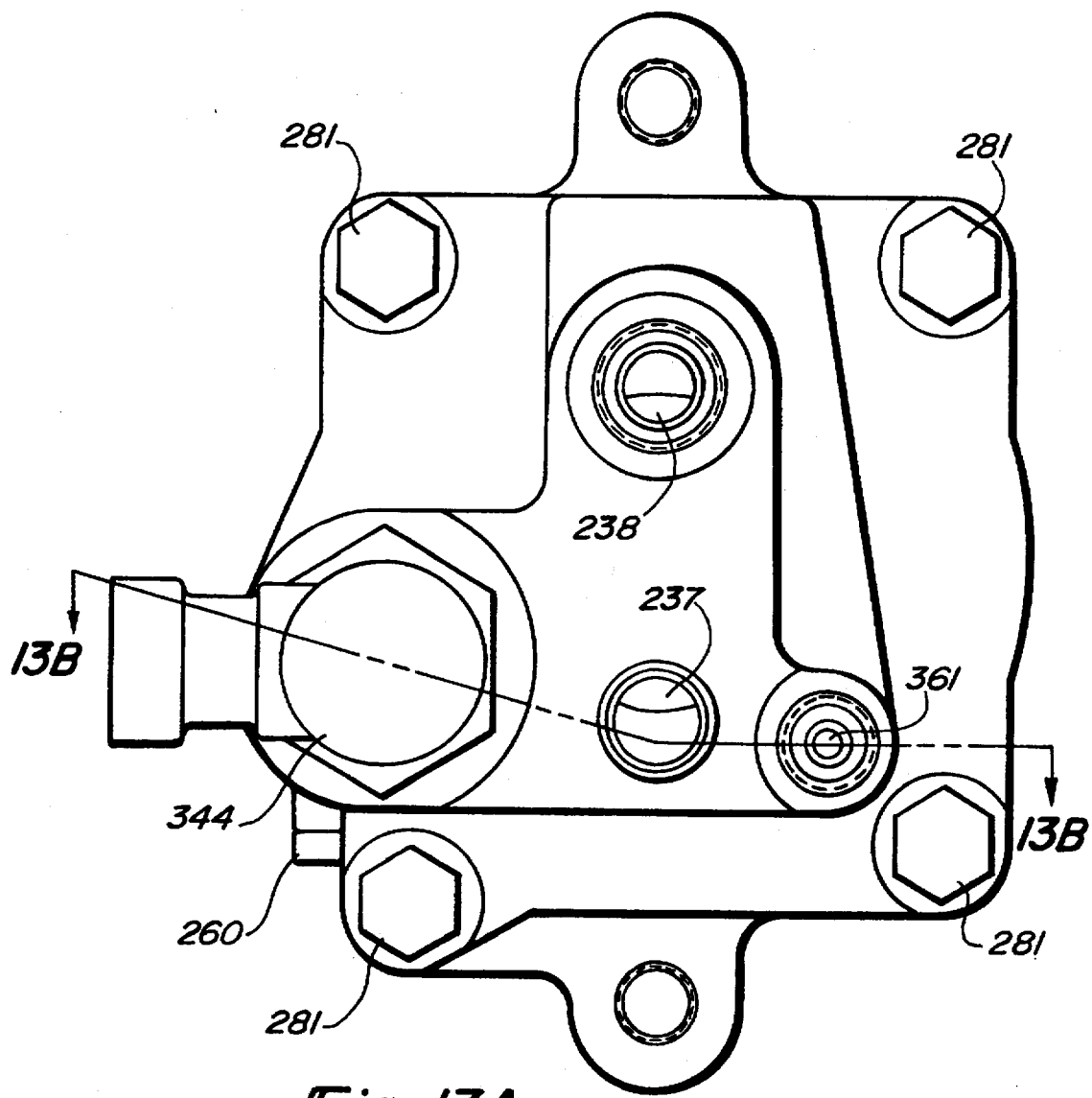

A seventh alternative preferred embodiment of the invention is shown in FIGS. 13A and 13B, wherein a variable displacement pump 360 adapted for providing speed sensitive control of steering assist is shown. Variable displacement pump 360 includes most of the components of variable displacement pump 232. In addition, variable displacement pump 360 utilizes electronically variable orifice sub-assembly 341. As such, like reference numerals are used in FIGS. 10A, 10B 10C and 10D, FIG. 11 and FIGS. 13A and 13B to identify like components. Variable displacement pump 360 also utilizes pilot flow to enable speed sensitive control of steering assist as follows:

In variable displacement pump 360, passage 361 conveys the sensing fluid to control chamber 239 from whence it is conveyed to control orifice 362 via port 363 and passage 364. From there the sensing fluid is conveyed to biasing chamber 240 via passage 365 and port 366 and on to bore 347 of valve spool 343 via port 367. In variable displacement pump 360, differential pressure between control chamber 239 and biasing chamber 240 is regulated at the value $\Delta P$. Thus, pilot flow volumetric flow rate is determined by applying formula (1) above to pilot flow through control orifice 362. Pilot flow through electronically variable orifice sub-assembly 341 then adds supplemental pressure of the value $(A_{co}/A_{evo})^2 \Delta P$, where in this case $A_{co}$ is effective flow area of control orifice 362, $A_{evo}$ is effective flow area of electronically variable orifice 341, and $\Delta P$ is the supplemental pressure value across control orifice 362. Then the pilot flow is conveyed to inlet port 237 (which is substantially at reservoir pressure) via passage 368 and bore 302. Thus, pressure drop concomitantly impressed upon open ones of first or second return orifices 46a or 46b, respectively, is increased to $(1+(A_{co}/A_{evo})^2) \Delta P$.

Figure 14:
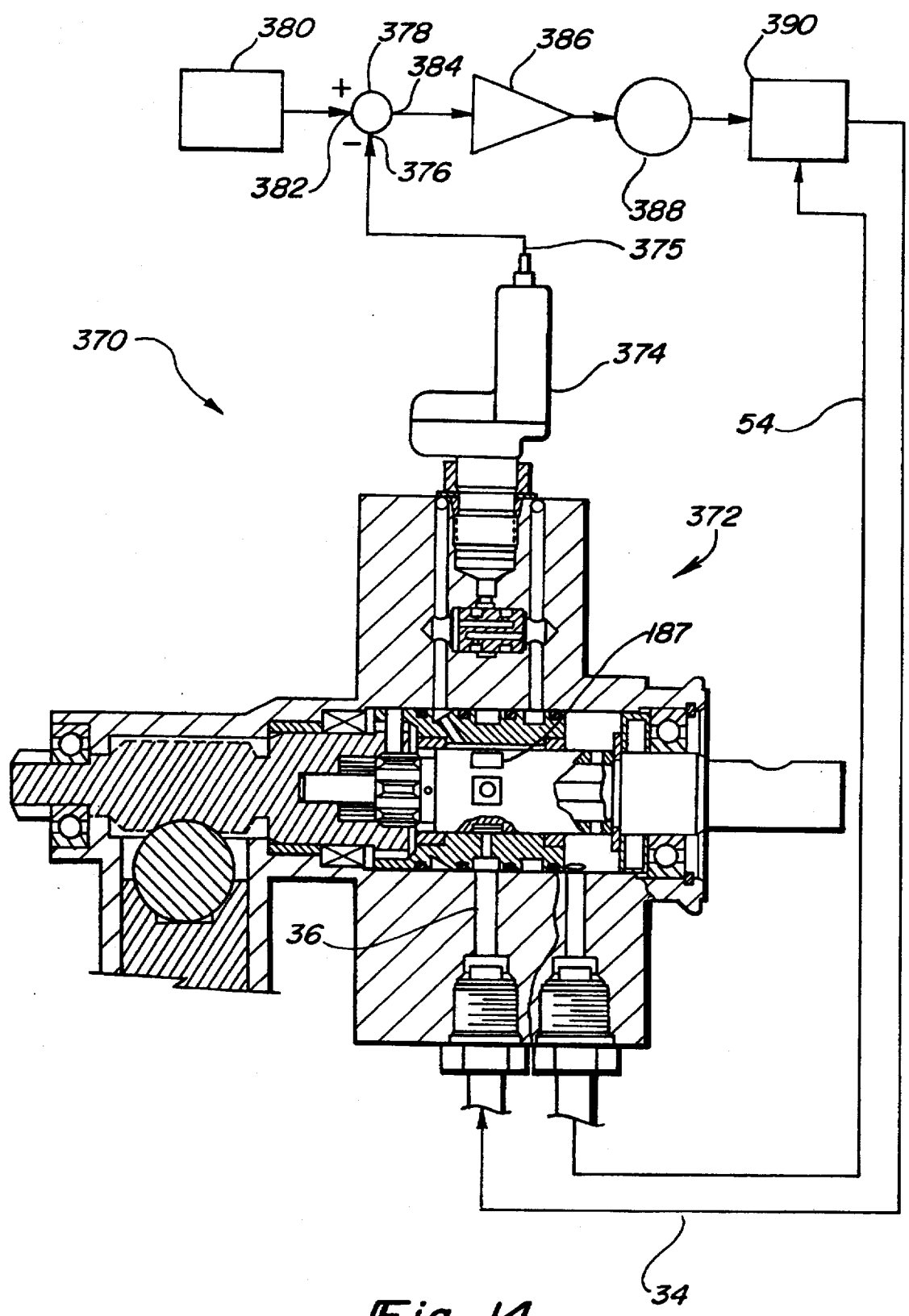
FIG. 14 is a partially schematic drawing of an eighth alternative preferred embodiment of the invention comprising a sectional view of a four-way control valve adapted for use in a servo motor powered bootstrap hydraulic system.

An eighth alternative preferred embodiment of the invention is shown in FIG. 14, wherein a partially schematic view of a servo motor powered bootstrap hydraulic system 370 is shown. Servo motor powered bootstrap hydraulic system 370 comprises control valve 372. Control valve 372 has open-center input slots 187 and, in general, operates in substantially the same manner as control valve 181. It includes many of the components thereof. As such, like reference numerals are used in FIGS. 6A and 14 to identify like components. In this case however, control valve 372 additionally comprises a pressure transducer 374 which issues a control signal indicative of the lower pressure one of the first and second output pressures imposed across first or second return orifices 46a or 46b, respectively. In this case, the control signal is applied to negative input terminal 376 of summing point 378 via signal cable 375. A command signal generator 380 issues a command signal representative of a desired value for $\Delta P$ which is applied to positive input terminal 382 of summing point 378 in order to generate an error signal on output terminal 384 thereof. The error signal is applied to power amplifier 386 which issues a power signal representative of the error signal. The power signal drives a servo motor 388 which, in turn, drives a positive displacement pump 390 for providing suitably pressurized fluid to input port 36 of control valve 372. Gain and slew rate characteristics of power amplifier 386 are configured such that the error signal has an acceptably small value. This results in the lower pressure one of the first and second output pressures being maintained at a value of $\Delta P$ as desired. Further, no pressure dividing pilot flow network such as those used in conjunction with prior art servo motor powered bootstrap hydraulic systems is required.

Figure 15:
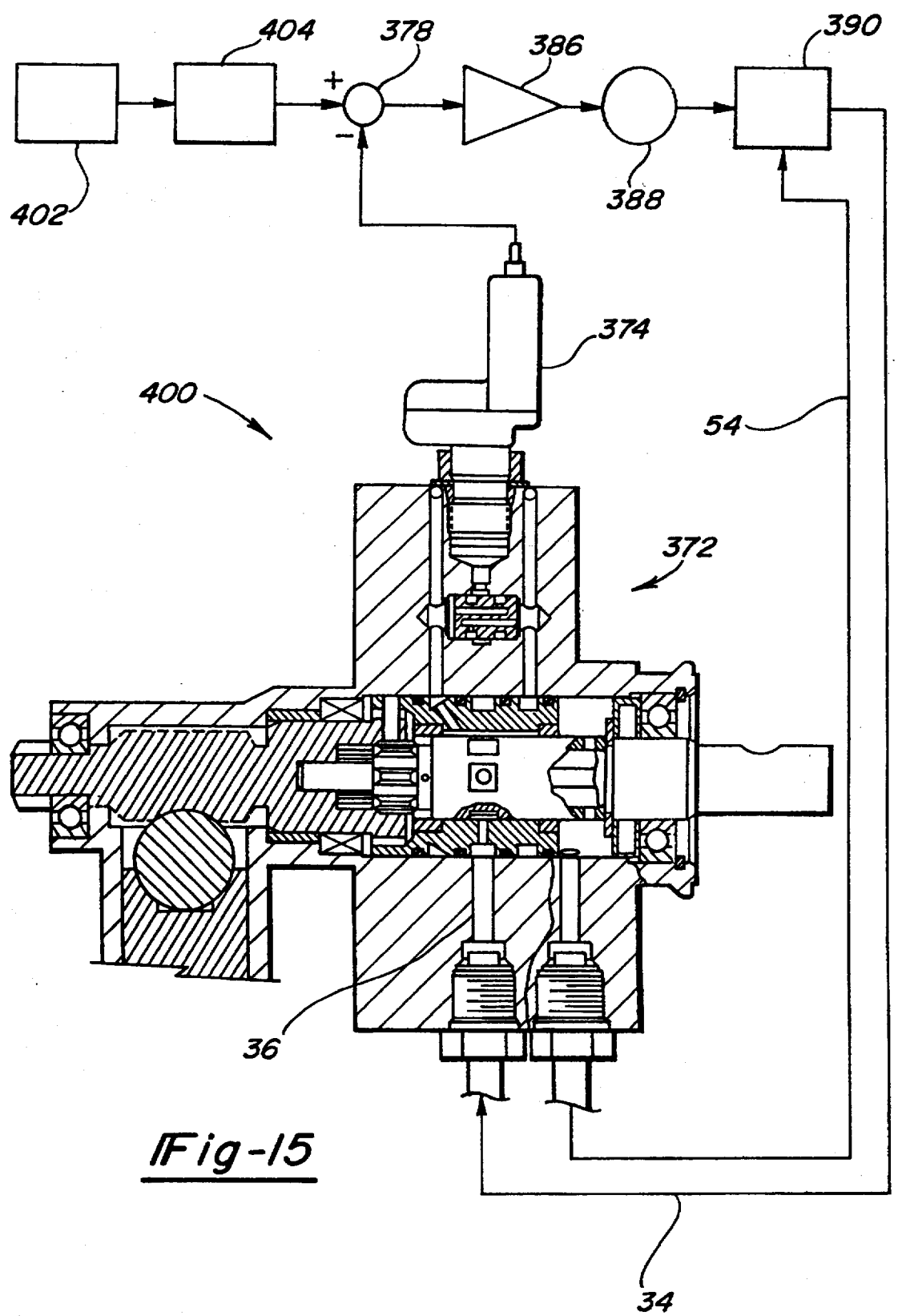
FIG. 15 is a partially schematic drawing of a ninth alternative preferred embodiment of the invention showing a servo motor powered bootstrap hydraulic system additionally adapted for providing speed sensitive control of steering assist.
Figure 18A:
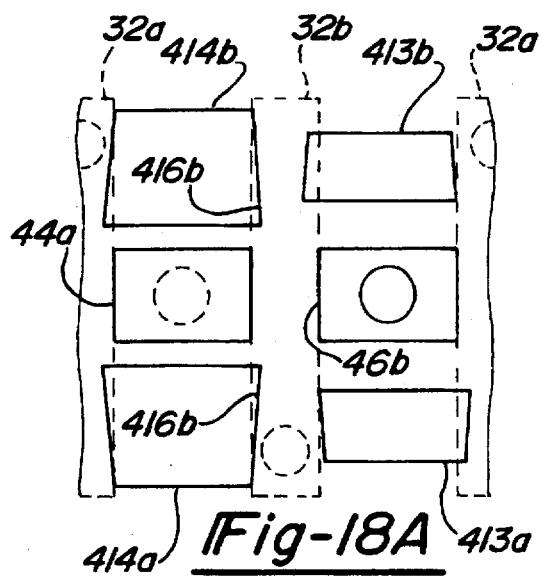
FIGS. 18A, 18B, 18C, 18D, 18E and 18F are enlarged descriptive plan views of the closed-center control valve shown in FIG. 16 of the invention depicting six respective operating zones thereof.
Figure 18B:
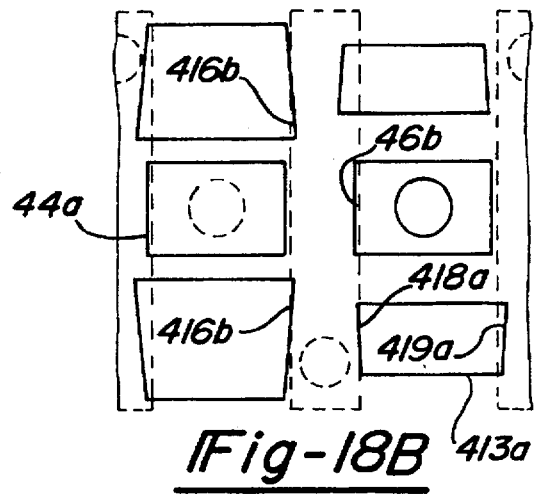
Figure 18C:
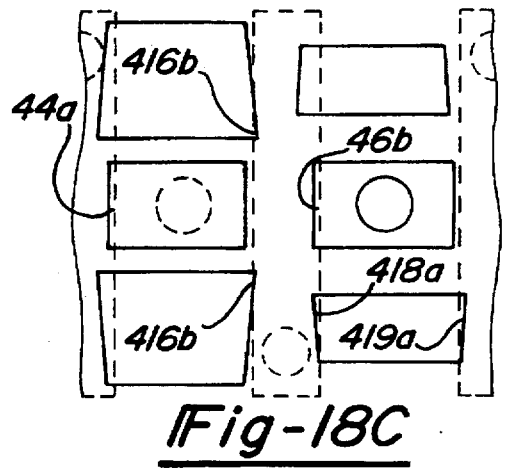
Figure 18D:
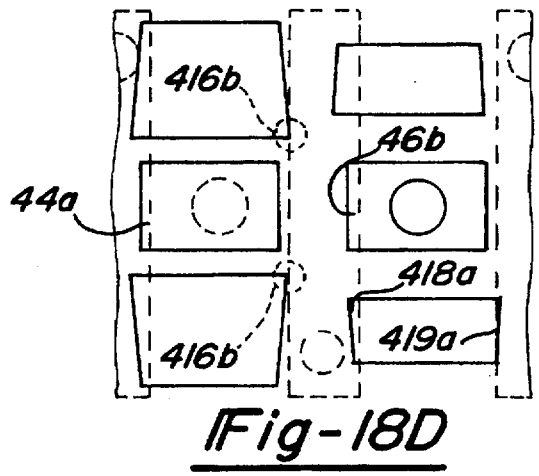
Figure 18E:
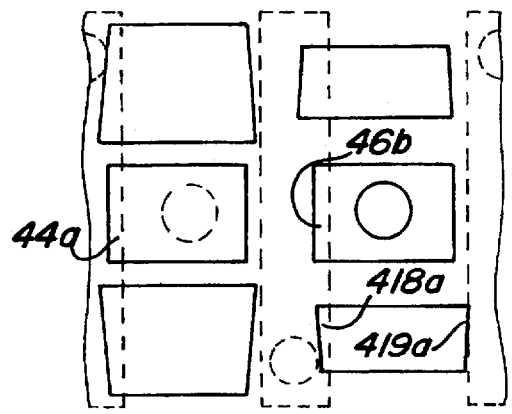
Figure 18F:
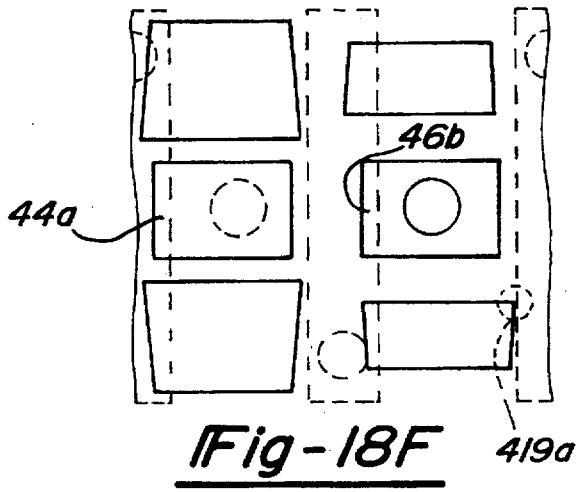

A ninth alternative preferred embodiment of the invention is shown in FIG. 15, wherein a partially schematic view of a servo motor powered bootstrap hydraulic system 400 adapted for providing speed sensitive control of steering assist is shown. Servo motor powered bootstrap hydraulic system 400 comprises most of the components of servo motor powered bootstrap hydraulic system 372. As such, like reference numerals are used in FIGS. 14 and 15 to identify like components. In this case however, vehicular speed transducer 402 issues a velocity signal to command signal generator 404. Command signal generator 404 issues a command signal whose value is a selected function of the velocity signal. Generally, the command signal has a value representative of ΔP at high vehicular speeds and a larger value at low vehicular speeds. Using a velocity signal to enable increased values of pressure drop across open flow control orifices in servo motor powered bootstrap hydraulic systems is comprised in a method of providing speed sensitive control of steering assist.

A tenth alternative preferred embodiment of the invention is shown in FIGS. 16A, 16B, 17A and 17B, wherein a partially schematic view of a bootstrap hydraulic system 410 comprising a sectional view of a closed-center control valve 411 utilized therein including an input shaft 412 and pump apparatus 415, a second sectional view of control valve 411, and first and second side views of input shaft 412 are shown, respectively. Input shaft 412 embodies improved primary and secondary parasitic slots whereby control valve 411 enables improved pressure-effort characteristics for bootstrap hydraulic system 410. Control valve 411 comprises some of the features of control valve 122 shown in FIG. 3B. As such, like reference numerals are used in FIGS. 3B, 16A, 16B, 17A and 17B to identify like features. Input shaft 412 is depicted in FIGS. 17A and 17B as having two sets of input slots 26, first and second secondary parasitic slots 413a and 413b, respectively, return slots 28, first and second notches 130a and 130b, respectively, and primary parasitic slots 414. Primary parasitic slots 414 are depicted in bifurcated form with mirror imaged first and second portions 414a and 414b located axially on either side of input slots 26. This has been done as a design choice only to enable location of input slots 26 under input ports 42. In any case, each of the individual types of slots is formed on opposite sides of input shaft 412 wherein the various sets of slots are either nominally parallel or orthogonal to one another. Thus, nominal plan view configuration and outline contours of each of the slots are depicted in FIGS. 17A and 17B. In the case of two sets of slots, the various slots are generally formed in a transverse manner and have straight sides. Input shaft 412 has been presented in this manner for convenience only as an exemplary depiction and is not intended to limit the scope of the invention. Any integral number of slot sets could have been chosen. For instance, in depicting control valve 121, FIG. 3B shows three sets of slots.

Primary parasitic slots 414a and 414b and first and second secondary parasitic slots 413a and 413b, respectively, are formed with trapezoidal plan view configurations wherein first and second secondary parasitic slots 413a and 413b, respectively, are oriented in an oppositely staggered manner with respect to the parallel or orthogonal relationship of the other slots. With reference now to FIGS. 18A, 18B, 18C, 18D, 18E and 18F, descriptive plan views depicting six respective operating zones A, B, C, D, E and F of the various slots of input shaft 412 and valve sleeve 18 are shown for valve positions in a first direction. (I.e., for oppositely directed valve positions the various designated orifices are inverted as mentioned with respect to other examples herein.) In zone A shown in FIG. 18A, first input and second return orifices 44a and 46b, respectively, are slightly open with reference to first and second output slots 32a and 32b, respectively, primary parasitic orifices 416b are decreasing slightly in area, and first and second secondary parasitic slots 413a and 413b, respectively, are both closed off. In zone B shown in FIG. 18B, first input and second return orifices 44a and 46b, respectively, are continuing to open, primary parasitic orifices 416b are continuing to decrease in area, first secondary parasitic orifice 418a of first secondary parasitic slot 413a has begun to open, and second secondary parasitic orifice 419a thereof is open. In zone C shown in FIG. 18C, first input and second return orifices 44a and 46b, respectively, are continuing to open, primary parasitic orifices 416b are continuing to decrease in area, first secondary parasitic orifice 418a is open to its parallel sided region, and second secondary parasitic orifice 419a is somewhat smaller but still larger than first secondary parasitic orifice 418a. In zone D shown in FIG. 18D, first input and second return orifices 44a and 46b are continuing to open, primary parasitic orifices 416b have closed, first secondary parasitic orifice 418a is still open in its parallel sided region but second secondary parasitic orifice 419a is smaller than first secondary parasitic orifice 418a. In zone E shown in FIG. 18E first input and second return orifices 44a and 46b, respectively, are continuing to open, and second secondary parasitic orifice 419a is closing. Finally, in zone F shown in FIG. 18F, first input and second return orifices 44a and 46b, respectively, are continuing to open, but all parasitic slots are closed.

It should be noted that the overall flow resistance characteristics of primary parasitic slots 414a and 414b and first and second secondary parasitic slots 413a and 413b are similar to that called for hereinabove with reference to a non-feasible parasitic orifice having an area inversely proportional to the square root of applied torque over a significant range of valve positions. This is primarily due to the opening action of first parasitic orifice 418a of first parasitic slot 413a (or first parasitic orifice 418b of second parasitic slot 413b for oppositely directed valve positions) while second parasitic orifice 419a of first parasitic slot 413a (or second parasitic orifice 419b of second parasitic slot 413b for oppositely directed valve positions) is still open to a greater extent. In such a case, flow resistance of either of the sets of first parasitic orifices is decreasing at a faster rate than flow resistance of the corresponding set of the second parasitic orifices is increasing. Thus, for a selected portion of the host control valve's operating range, overall flow resistance of the respective parasitic slots decreases even though they are nominally closing. Utilizing such secondary parasitic slots (i.e., featuring counter-direction opening first orifices whose flow resistance is being reduced at a faster rate than flow resistance of in-direction closing second orifices thereof is being increased whereby overall flow resistance of the respective parasitic slots is being reduced over a meaningful portion of nominally closing motion of a host control valve) is comprised in a method for enabling a nominally closing flow metering device to have an overall flow resistance that is made to decrease over a meaningful portion of its host control valve's nominally closing motion.

The unique overall flow resistance characteristics of primary parasitic slots 414a and 414b and first secondary parasitic slots 413a (or second secondary parasitic slots 413b for oppositely directed valve positions) are responsible for linear behavior of control valve 411 over a selected range of valve positions. With reference to FIG. 19, operation of control valve 411 is shown in curves 420a, 420b, 420c, 420d and 420e which depict pressure-effort curves for differential output flow values of 0.0 in³/sec, 3.0 in³/sec, 6.0 in³/sec, −3.0 in³/sec and −6.0 in³/sec, respectively. Linear zone 421 of curve 420a illustrates outstanding linearity in the static performance characteristic of control valve 411. This is in strong contrast with "knee" 63 in curve 62a of FIG. 2A.

Figure 20:
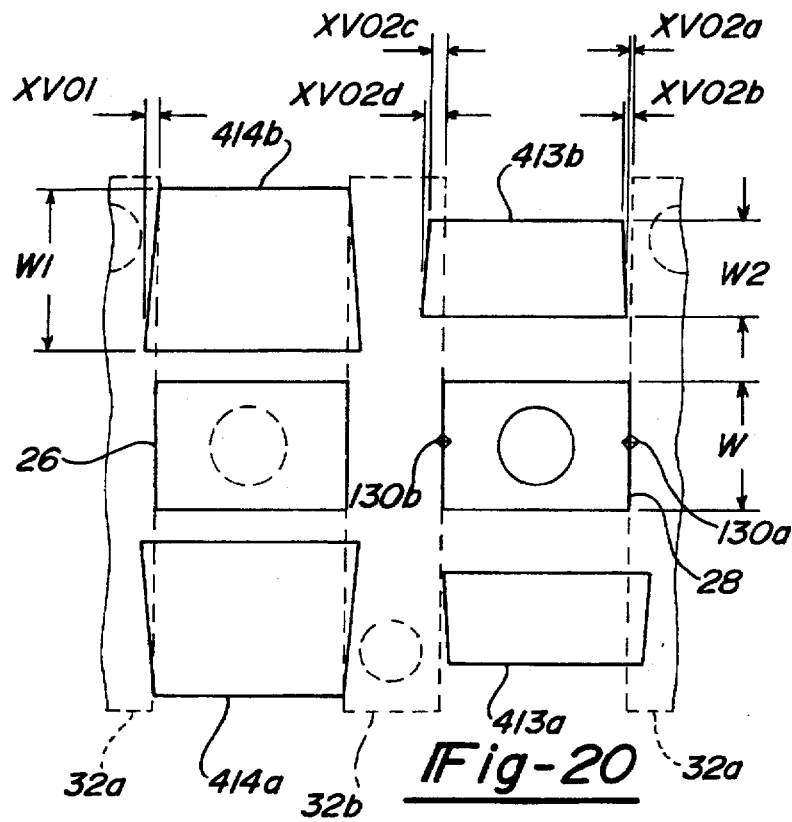
FIG. 20 is an enlarged descriptive plan view of the closed-center control valve shown in FIG. 16 of the invention.

With reference now to FIG. 20, an enlarged descriptive plan view of one set of input slot 26, return slot 28, primary parasitic slots 414a and 414b, and first and second secondary parasitic slots 413a and 413b, respectively, superposed in a centered fashion on first and second output slots 32a and 32b, respectively. Dimensional designators relating to the various slots are also shown in FIG. 20 (where such dimensional designators are applicable to identically dimensioned slots therein as well). As an example of the teachings of the tenth alternative preferred embodiment of the invention, Table 1 enumerates these dimensions and torsion bar stiffness to input shaft diameter ratio for the particular design whose performance characteristics are depicted in FIG. 19. With reference to Table 1, n is number of slot sets utilized, $K_t$ is torsion bar stiffness, d is input shaft diameter and the other dimension designators are as indicated in FIG. 20.

TABLE 1

| Dimensions or Ratios | Values [in] or [in · lb/in] |
|---|---|
| w | 0.500/n |
| w1 | 0.625/n |
| w2 | 0.378/n |
| xvo1 | 0.020 |
| xvo2a | 0.005 |
| xvo2b | 0.013 |
| xvo2c | 0.026 |
| xvo2d | 0.034 |
| $K_t/d$ | 588 |

Figure 21A:
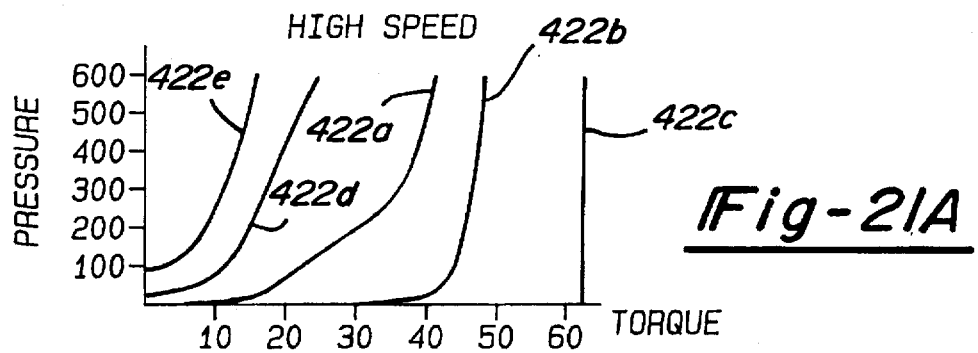
FIGS. 21A and 21B are graphical illustrations depicting pressure-effort curves for the closed-center control valve shown in FIG. 16 showing high and low speed operation, respectively, in a speed sensitive bootstrap hydraulic system.
Figure 21B:
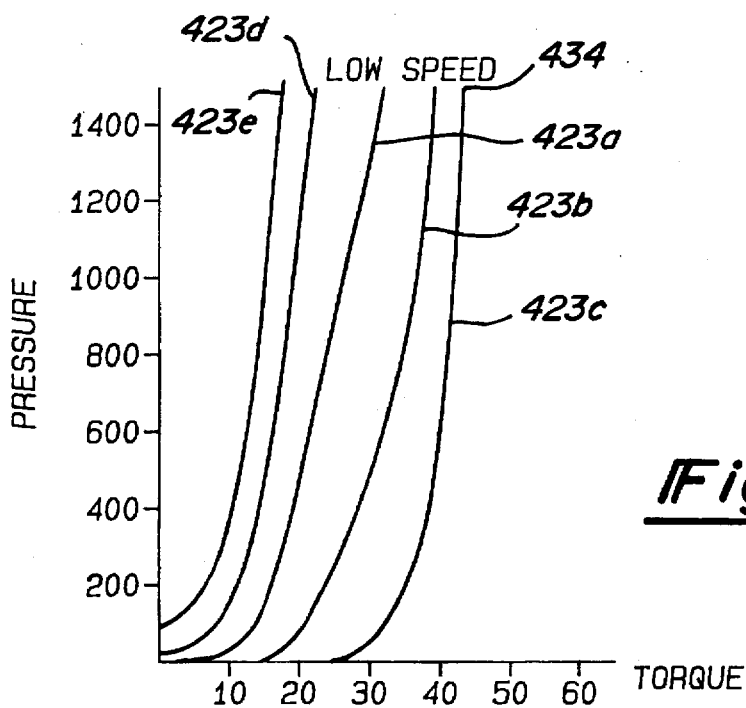

Bootstrap hydraulic system 410 can be used in speed sensitive bootstrap HMPS or EHPS systems enabled by utilizing apparatus and methods described above with respect to any of the fifth, sixth seventh or ninth alternative preferred embodiments of the invention with respect to implementing pump apparatus 415. With reference to FIGS. 21A and 21B, operation of control valve 411 is depicted for high and low speed pump delivery flow rates, respectively, wherein a stiffer torsion bar resulting in a value of the ratio $K_t/d$ of 862 in.lb/in is used. In FIG. 21A curves 422a, 422b, 422c, 422d and 422e depict pressure-effort curves for high speed differential output flow values of 0.0 in³/sec, 3.0 in³/sec, 6.0 in³/sec, −3.0 in³/sec and −6.0 in³/sec, respectively, for differential output pressure values to 600 psi. In FIG. 21B curves 423a, 423b, 423c, 423d and 423e depict low speed pressure-effort curves for differential output flow values of 0.0 in³/sec, 3.0 in³/sec, 6.0 in³/sec, −3.0 in³/sec and −6.0 in³/sec, respectively, for differential output pressure values to 1,500 psi.

Figure 21C:
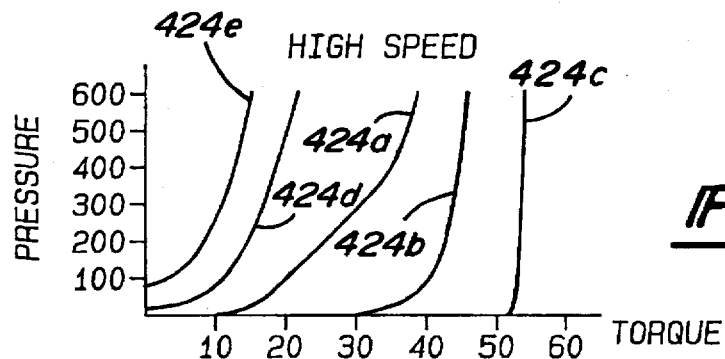
FIGS. 21C and 21D are graphical illustrations depicting pressure-effort curves for the closed-center control valve shown in FIG. 16 showing first and second alternate driver selectable settings for high speed operation, respectively, in a speed sensitive bootstrap hydraulic system.
Figure 21D:
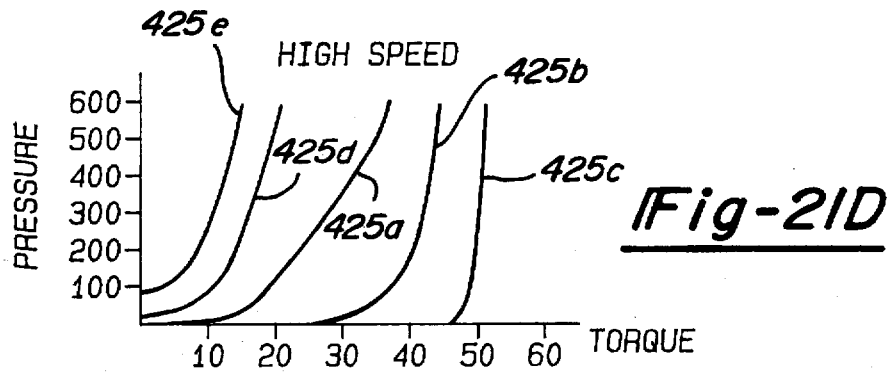
Figure 22A:
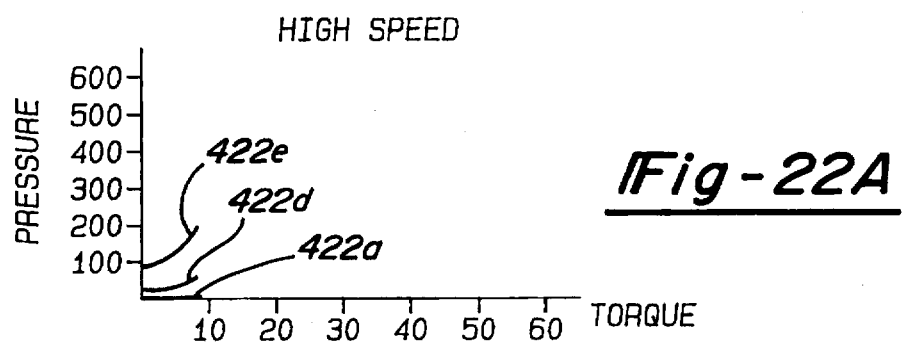
Figure 22B:
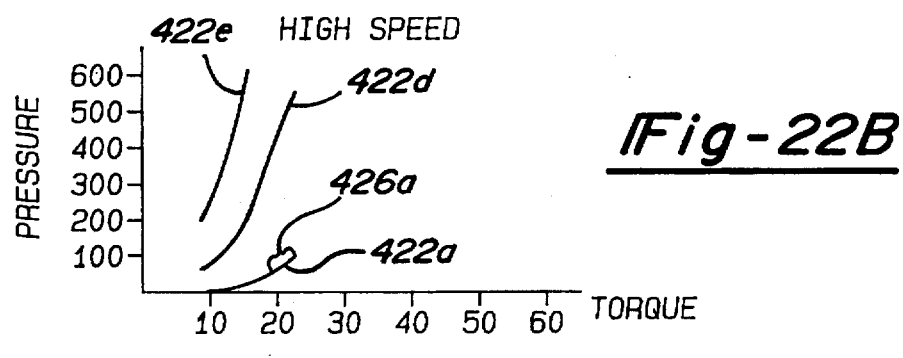
Figure 22C:
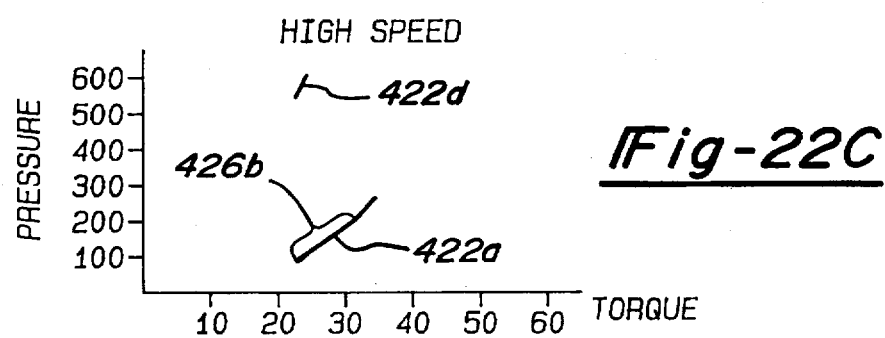

With reference to FIGS. 21C and 21D, operation of control valve 411 is depicted for intermediate values of pump delivery flow rates, respectively. In FIG. 21C curves 424a, 424b, 424c, 424d and 424e depict pressure-effort curves for a first intermediate pump delivery flow rate for differential output flow values of 0.0 in³/sec, 3.0 in³/sec, 6.0 in³/sec, −3.0 in³/sec and −6.0 in³/sec, respectively, for differential output pressure values to 600 psi. In FIG. 21D curves 425a, 425b, 425c, 425d and 425e depict pressure-effort curves for a second intermediate pump delivery flow rate larger in value than the first pump delivery flow rate for differential output flow values of 0.0 in³/sec, 3.0 in³/sec, 6.0 in³/sec, −3.0 in³/sec and −6.0 in³/sec, respectively, for differential output pressure values to 600 psi. Such intermediate pump delivery flow rates may optionally be selectable via dashboard control (not shown) for individualizing high speed bootstrap power steering system characteristics.

With reference now to FIGS. 22A, 22B, 22C, 22D, 22E and 22F, selected portions of curves 422a, 422b, 422c, 422d and 422e corresponding to respective operation in each of the six operating zones A, B, C, D, E and F of input shaft 412 and valve sleeve 18 are reproduced. One of first and second secondary parasitic slots 413a and 413b, respectively, is open from zone B through zone E. Consistent with the above description of the method for enabling a nominally closing flow metering device to have an overall flow resistance that is made to decrease over a meaningful portion of its host control valve's motion, it can be seen that linear portions 426a and 426b of curve 422a are confined to zones B and C, respectively, wherein flow resistance of first secondary parasitic orifice 418a of first secondary parasitic slot 413a (or a first secondary parasitic orifice 418b of second secondary parasitic slot 413b for oppositely directed valve positions) is being reduced at a faster rate than flow resistance of second secondary parasitic orifice 419a of first secondary parasitic slot 413a (or a second secondary parasitic orifice 419b of second secondary parasitic slot 413b for oppositely directed valve positions) is being increased.

With reference now to FIG. 23, curves 430 and 432 depict required pump delivery volumetric flow for high and low speed operation, respectively, of control valve 411. For any particular effort value, curve 432 has a value proportionately larger than the corresponding value of curve 430 by the square root of the ratio of respective supplemental pressure values utilized for high and low speed operation. Curve 432 is terminated at peak value 433 at an effort value corresponding to peak differential output pressure and load flow as depicted by peak value 434 of curve 423c shown in FIG. 21B. The resulting peak pump delivery volumetric flow rate for this particular example is about 10.8 in³/sec.

Figure 24:
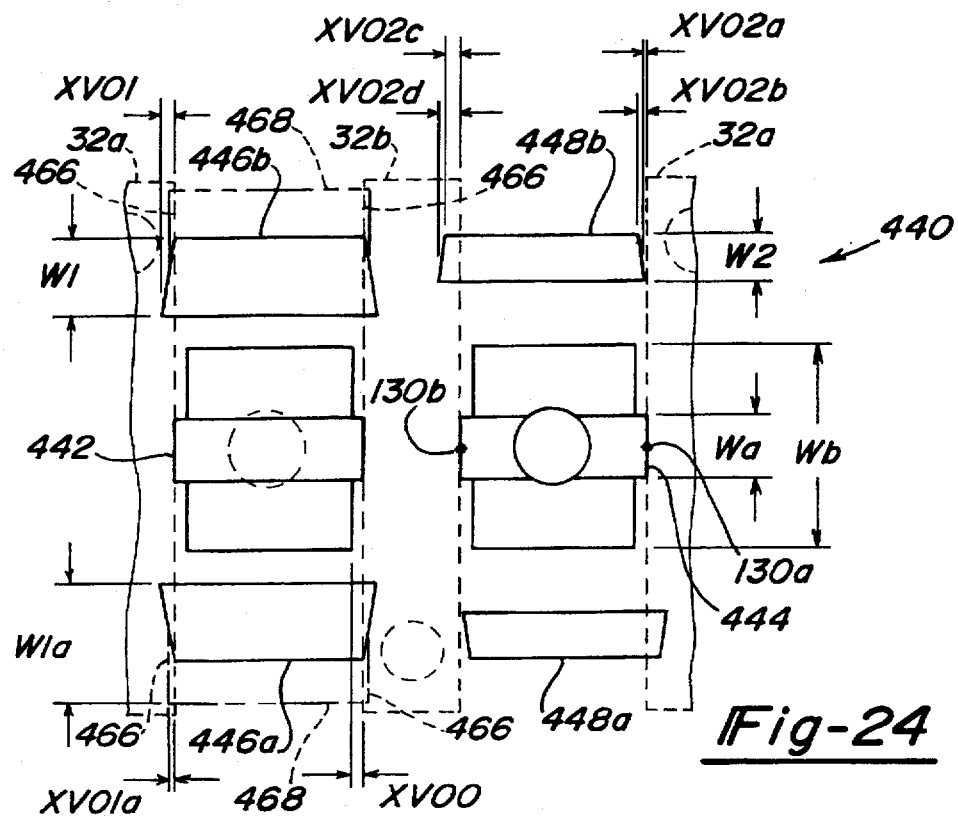
FIG. 24 is an enlarged descriptive plan view of a closed-center control valve comprised in an eleventh alternative preferred embodiment of the invention.

An eleventh alternative preferred embodiment of the invention is shown in FIG. 24, wherein an enlarged descriptive plan view of one set of various slots of a control valve 440 is shown. Control valve 440 can be substituted for control valve 411, for instance, in bootstrap hydraulic systems wherein it is desirable to decrease pump delivery volumetric flow rates. In control valve 440, input slots 442, return slots 444, primary parasitic slots 446a and 446b, and offset first and second secondary parasitic slots 448a and 448b, respectively, are superposed in a centered fashion on first and second output slots 32a and 32b, respectively. Dimensional designators relating to the various slots are also shown in FIG. 24. Table 2 enumerates dimensions and torsion bar stiffness to input shaft diameter ratio for a particular design whose performance characteristics are depicted in FIGS. 25A, 25B and 25C. With reference to Table 2, n is number of slot sets utilized, $K_t$ is torsion bar stiffness, d is input shaft diameter and the other dimensions are as indicated in FIG. 24.

TABLE 2

| Dimensions or Ratios | Values [in] or [in · lb/in] |
|---|---|
| wa | 0.250/n |
| wb | 0.800/n |
| w1 | 0.312/n |

TABLE 2-continued

| Dimensions or Ratios | Values [in] or [in · lb/in] |
| --- | --- |
| w2 | 0.189/n |
| xvo0 | 0.020 |
| xvo1 | 0.020 |
| xvo2a | 0.005 |
| xvo2b | 0.013 |
| xvo2c | 0.026 |
| xvo2d | 0.034 |
| $K_t/d$ | 862 |

In FIG. 25A curves 450a, 450b, 450c, 450d and 450e depict pressure-effort curves for high speed differential output flow values of 0.0 in$^3$/sec, 3.0 in$^3$/sec, 6.0 in$^3$/sec, −3.0 in$^3$/sec and −6.0 in$^3$/sec, respectively, for differential output pressure values to 600 psi. In FIG. 25B curves 452a, 452b, 452c, 452d and 452e depict low speed pressure-effort curves for differential output flow values of 0.0 in$^3$/sec, 3.0 in$^3$/sec, 6.0 in$^3$/sec, −3.0 in$^3$/sec and −6.0 in$^3$/sec, respectively, for differential output pressure values to 1,500 psi. In FIG. 25C curves 454 and 456 depict required pump delivery volumetric flow for high and low speed operation, respectively, of control valve 440. Pump delivery volumetric flow values depicted by curves 454 and 456 are generally less than corresponding values depicted by curves 430 and 432, respectively, and feature a significantly reduced peak pump delivery volumetric flow rate at peak value 457 of about 8.0 in$^3$/sec. As an example of the teachings of the eleventh alternative preferred embodiment of the invention, Table 2 enumerates these dimensions and torsion bar stiffness to input shaft diameter ratio for the particular design whose performance characteristics are depicted in FIGS. 25A, 25B and 25C.

The reduced pump delivery volumetric flow rates depicted in FIG. 25C occur because of a reduced value for wa in Table 2 as compared with the value of w shown in Table 1. Substantially identical static performance, as depicted by portion 451 of curve 450a is obtained through a valve position equal to xvo0 via proportionately reduced values of w1 and w2. Accelerated pump delivery volumetric flow rates for valve positions larger than xvo0 are achieved as a result of an increased value for wb in Table 2 as compared with the value of w shown in Table 1. This, in turn, results in maximum load flow values occurring at substantially identical effort values of about 63 in.lb and 44 in.lb, for high and low speed operation, respectively, as shown by numerical indicators 458 and 460, respectively.

As a side effect of decreasing the various slot widths, load pressure values concomitantly achieved for negative load flow rates are significantly increased for zero effort values therealong. This is indicated particularly by numerical indicators 462a and 462b on zero crossing values of curves 450d and 450e, respectively, and numerical indicators 464a and 464b on zero crossing values of curves 452d and 452e, respectively, in FIGS. 25A and 25B, respectively. If such higher load pressure values concomitantly achieved for negative load flow rates are not appropriate for a given application then primary parasitic slots 446a and 446b may be selectively enlarged as indicated by dot-dashed lines 466 and 468 in FIG. 24. The tangentially directed dimension xvo1a relating to dot-dashed lines 466 should be limited to a value about half way through zone B or in this case about 0.009 in. Dimension w1a may be chosen to enable load pressure values achieved concomitantly with negative load flow rates as desired.

Figure 26:
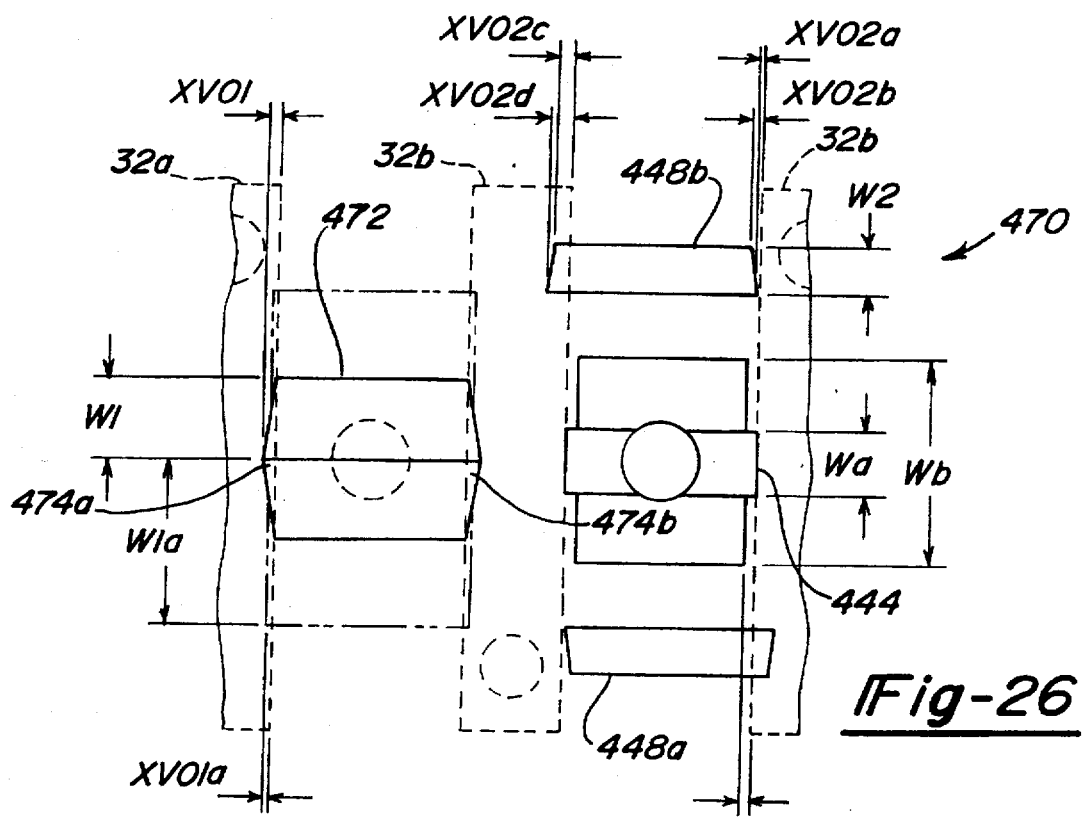
FIG. 26 is an enlarged descriptive plan view of a control valve comprised in an twelfth alternative preferred embodiment of the invention.

A twelfth alternative preferred embodiment of the invention is shown in FIG. 26, wherein an enlarged descriptive plan view of one set of various slots comprised in a control valve 470 is shown. Control valve 470 comprises some of the features of control valve 440 shown in FIG. 24 and can also be substituted for control valve 411. As such, like reference numerals are used in FIGS. 24 and 26 to identify like features. The various slots comprise input slot 472 which is formed in an open-center manner, return slot 444 (this time without notches 130a and 130b, however), and offset first and second secondary parasitic slots 448a and 448b, respectively, which are superposed in a centered fashion on first and second output slots 32a and 32b, respectively. Dimensional designators relating to the various slots are also shown in FIG. 26. Control valve 470 utilizes first and second open-center input orifices 474a and 474b, respectively. Thus, it will be appreciated that teachings of the eleventh alternative preferred embodiment have been applied to structure disclosed in the second and sixth alternative preferred embodiments in implementing the twelfth alternative preferred embodiment.

Alternately, control valve 470 could have been depicted with open-center return orifices and thus so relate to structure disclosed in the first and fifth alternative preferred embodiments. Or, the twelfth alternative preferred embodiment could be implemented with reference to any of third, fourth eighth or ninth alternative preferred embodiments as well. Selection of a particular combination of the teachings presented herein for implementation of control valve 470 is exemplary in nature and is not intended to limit the scope of the present invention.

In any case, control valve 470 can, for instance, be used instead of for control valve 181 in order to improve pressure-effort characteristics as well as reduce pump delivery volumetric flow rates for low speed operation in speed sensitive systems generally. As an example of the teachings of the twelfth alternative preferred embodiment of the invention, Table 3 enumerates these dimensions and torsion bar stiffness to input shaft diameter ratio for a particular design whose performance characteristics are also depicted in FIGS. 25A, 25B and 25C. With reference to Table 3, n is number of slot sets utilized, $K_t$ is torsion bar stiffness, d is input shaft diameter and the other dimensions are as indicated in FIG. 26. Dimensions xvo1a and w1a should be chosen according to procedures discussed above with reference to the eleventh alternative preferred embodiment.

TABLE 3

| Dimensions or Ratios | Values [in] or [in · lb/in] |
| --- | --- |
| wa | 0.250/n |
| wb | 0.800/n |
| w1 | 0.625/n |
| w2 | 0.189/n |
| xvo0 | 0.020 |
| xvo1 | 0.020 |
| xvo2a | 0.005 |
| xvo2b | 0.013 |
| xvo2c | 0.026 |
| xvo2d | 0.034 |
| $K_t/d$ | 862 |

A thirteenth alternative preferred embodiment of the invention is shown in FIGS. 27A, 27B, 27C, 27D and 27E, wherein a partially schematic view of a bootstrap hydraulic system 478 comprising a sectional view of a control valve 480 utilized therein including an input shaft 481, valve sleeve 490 and pump apparatus 479, second and third sectional views of input shaft and valve sleeve 490 as a set, and first and second side views of input shaft 481 are shown, respectively. The thirteenth alternative preferred embodiment is directed to method and apparatus for implementing speed sensitive control of steering assist without the necessity of increasing values of the respective one of the higher or lower valued output port pressures during parking maneuvers. Although control valve 480 operates in the bootstrap mode, it is of fundamentally differing architecture than control valve 14 or any of the others described hereinabove. However, control valve 480 includes many of the components of control valve 14. It also comprises an electronically variable orifice sub-assembly 482 which includes many of the components of electronically variable orifice sub-assembly 341. As such, like reference numerals are used in FIG. 1A, FIG. 11 and FIG. 27A to identify like components. Internal flow patterns in control valve 480 differ dramatically from those of prior art rotary valves. For that reason FIGS. 28, 30A, 30B, 30C and 30D comprising descriptive drawings which depict flow patterns attained during low and high speed static modes of operation, respectively, of control valve 480 are also presented and described hereinbelow.

Figure 27B:
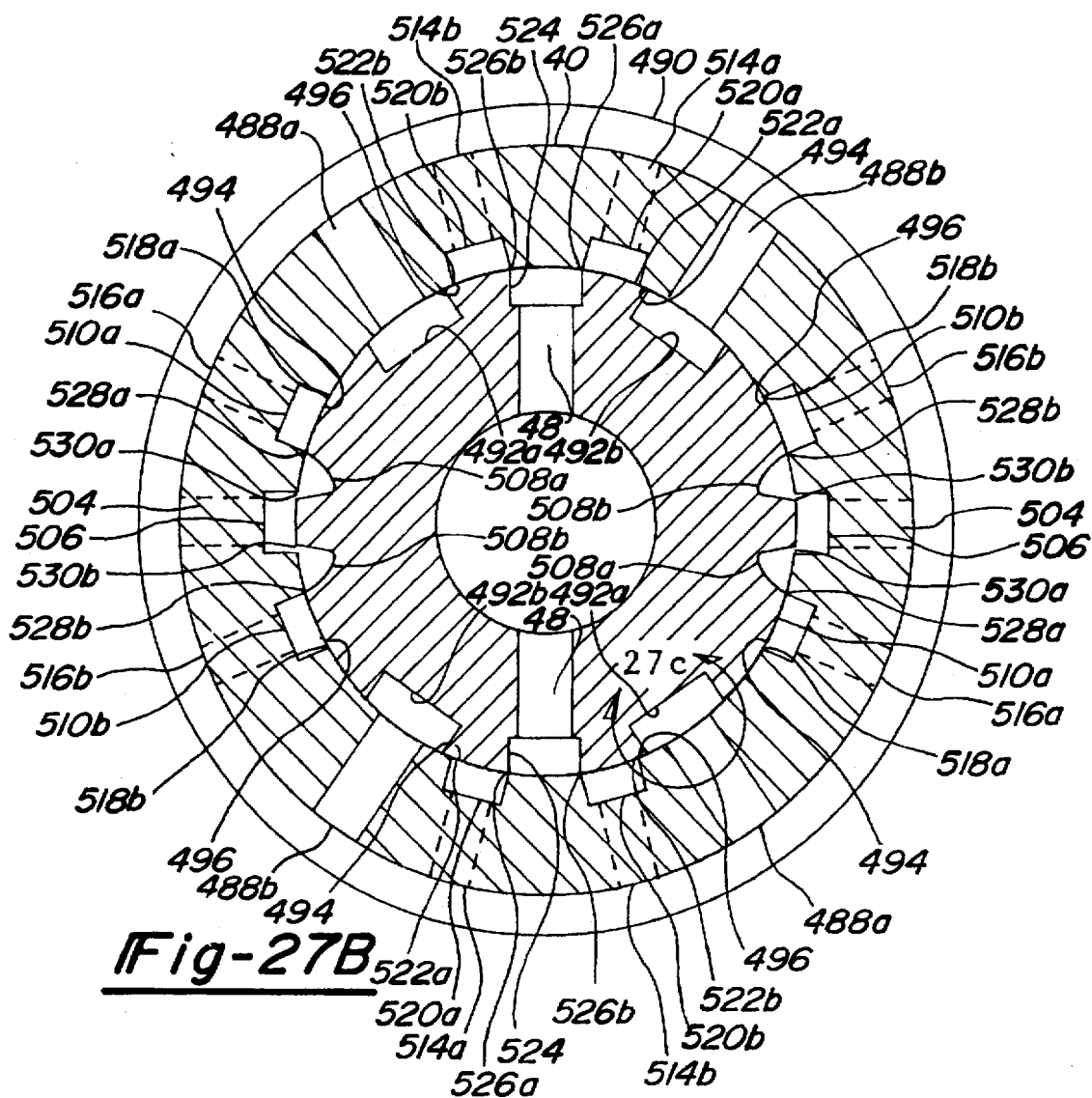
FIGS. 27B and 27C are second and third sectional views, respectively, of the control valve depicted in FIG. 27A.
Figure 27C:
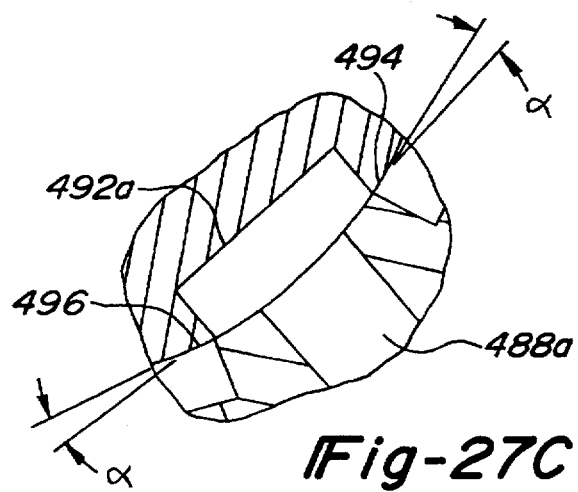

With particular reference now to FIG. 27A, control valve 480 is shown multi-sectioned in a manner which depicts a selection of its features. A full time input flow circuit 484 comprises input port 36 of housing 486, input groove 40, and first and second input ports 488a and 488b, respectively, of valve sleeve 490, and first and second input slots 492a and 492b, respectively (which are each configured in an open-center manner and comprise first formed edges 494 and second formed edges 496 disposed in first and second turning directions, respectively, as shown in FIGS. 27B and 27C) of input shaft 481. In addition, control valve 480 is normally configured as a speed sensitive control valve by utilizing electronically variable orifice sub-assembly 482 to selectively enable a high speed input flow circuit 498. High speed input flow circuit 498 comprises high speed input port 500 of housing 486, and high speed input groove 502, high speed input ports 504 and high speed input slots 506 of valve sleeve 490. Unless electronically variable orifice sub-assembly 482 is activated, high speed input flow circuit 498 is hydraulically disposed in parallel with full time input flow circuit 484. However, as shown in FIGS. 27B, 30B and 30C, high speed pump delivery flow through high speed input flow circuit 494 occurs only when either of first and second bypass slots 508a and 508b, respectively, of input shaft 481 are open to both of high speed input slots 506 and the respective one of first and second supplemental output slots 510a and 510b of valve sleeve 490 as a function of valve position.

Control valve 480 could of course be configured in a non-speed selective manner by simply eliminating electronically variable orifice sub-assembly 482, high speed input port 500 and high speed input groove 502, and connecting high speed input ports 504 directly to input groove 40. In this case operation is confined to that described below as the high speed mode of operation. Selection of speed sensitive operation herein for implementation of control valve 480 is exemplary in nature and is not intended to limit the scope of the present invention.

Figure 28:
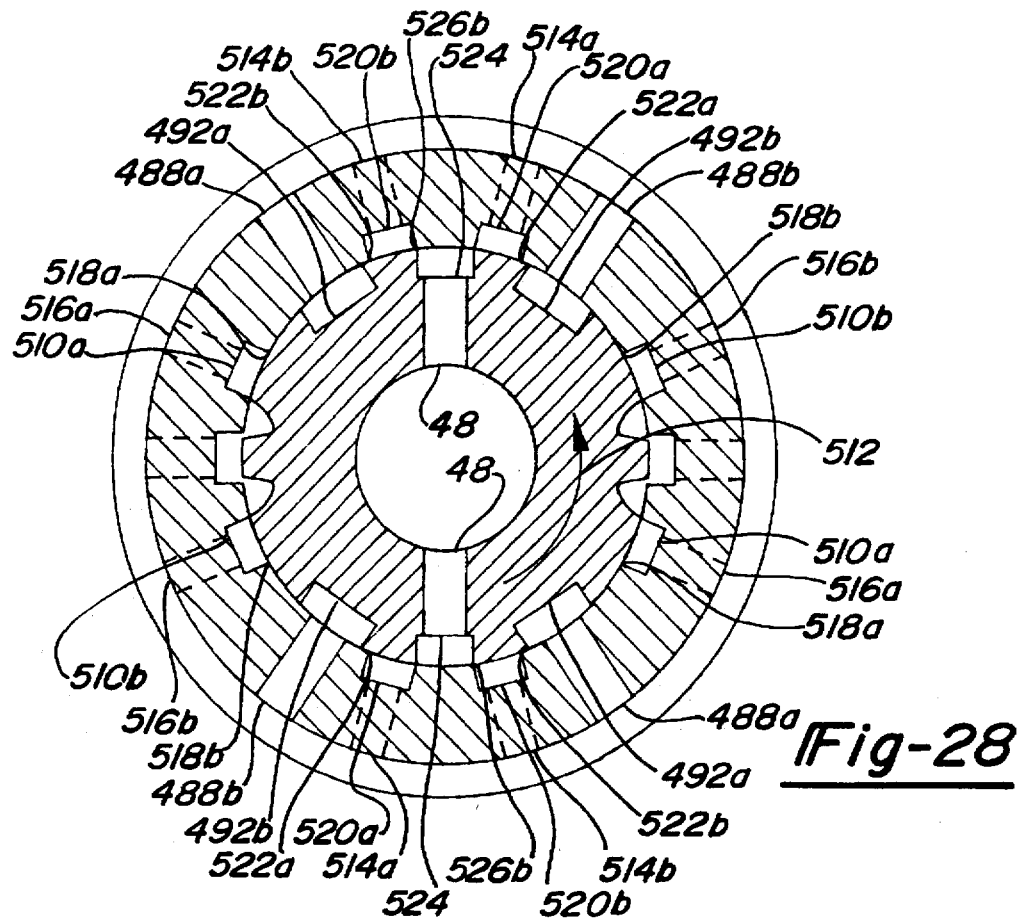
FIG. 28 is a sectional view of the control valve shown in Fig. 27A of the invention depicting flow patterns therein in a low speed mode of operation.

With reference now to FIG. 28, flow patterns attained in a static low speed mode of operation of control valve 480 will now be described. Valve positions in a first direction (i.e., relative rotational displacement of input shaft 481 in a first direction with respect to valve sleeve 490) is indicated by arrow 512. Flow of input fluid through full time input flow circuit 484 is conveyed to first and second input slots 492a and 492b via first and second input ports 488a and 488b, respectively. Because static operation is assumed, no fluid flows in either direction in either of first primary output ports 514a or first secondary output ports 516a. A portion of the fluid is conveyed to second secondary output slots 510b via second secondary input orifices 518b, out second secondary output ports 516b to second output groove 528b and in second primary output ports 514b to second primary output slots 520b. The remaining portion of the fluid is conveyed directly to second primary output slots 520b from first input ports 488a via first input slots 492a and second primary input orifices 522b. All of the fluid is conveyed to return slot ports 48 via second return orifices 526b and return slots 524. From there the fluid returns to a reservoir (not shown) as described above with respect to control valve 14. As with any bootstrap hydraulic system having open-center input slots, volumetric flow rate is determined by the product of return orifice area of the open return orifices and $\Delta P$. In this case, second return orifices 526b are the open ones whereby it is understood that pressure in second primary output slots 520b is nominally equal in value to $\Delta P$. And since static operation is assumed, pressure in first primary and first secondary output slots 520a and 510a, respectively, is substantially equal in value to supply pressure $P_S$. Thus, differential output pressure is nominally equal to $P_S - \Delta P$ and that value is also imposed upon second primary and second secondary orifices 522b and 518b, respectively.

Differential output flow is superposed upon the above described flow patterns in a dynamic low speed mode of operation of control valve 480. Positive output flow for valve positions in the first direction is conveyed outwardly to first primary and first secondary output ports 514a and 516a, respectively, via first primary and first secondary input orifices 522a and 518a, respectively, and first primary and first secondary output slots 520a and 510a, respectively. Positive output flow is returned to return slots 524 via second primary output ports 514b, second primary output slots 520b, second return orifices 526b and return slots 524. Negative output flow (i.e., such as obtained when exiting a turn) is in a reverse direction with reference to positive output flow as described above. Flow patterns attained in a low speed mode of operation for valve positions in the second or opposite direction (i.e., opposite to that indicated by arrow 512) are inverted with respect to flow patterns attained in a low speed mode of operation for valve positions in the first direction.

With reference now to FIGS. 29A, 29B, 29C and 29D, descriptive plan views depicting four respective operating zones A, B, C and D of input shaft 490 and valve sleeve 486 are shown for high speed operation for valve positions in the first direction. (For high speed operation for valve positions in the second direction the various designated orifices would be inverted as before.) In zone A shown in FIG. 29A, first and second primary input orifices 522a and 522b, respectively, and first and second secondary input orifices 518a and 518b, respectively, are open and second return orifices 526b are slightly open, while first and second secondary bypass orifices 528a and 528b, respectively, are closed and first and second primary bypass orifices 530a and 530b, respectively, are open. In zone B shown in FIG. 29B, first primary and first secondary input orifices 522a and 518a, respectively, are opening further but second primary and second secondary input orifices 522b and 518b, respectively, are closing, second return orifices 526b are continuing to open, first secondary bypass orifices 528a are closing further but second secondary bypass orifices 528b are now slightly open while second primary bypass orifices 530*b* are beginning to close but are still larger than second secondary bypass orifices 528*b*. In zone C shown in FIG. 29C, first primary and first secondary input orifices 522*a* and 518*a*, respectively, are opening still further but second primary and second secondary input orifices 522*b* and 518*b*, respectively, are now closed, second return orifices 526*b* are opening still further, and second secondary bypass orifices 528*b* have opened to the point that they are now larger than second primary bypass orifices 530*b* which are now closing. In zone D shown in FIG. 29D first primary and first secondary input orifices 522*a* and 518*a*, respectively, and second return orifices 526*b* are continuing to open, but second primary bypass orifices 530*b* are closed.

(With reference to FIGS. 27B, 29A, 29B, 29C and 29D above, and others to follow, orifices that are closed are depicted with encircling dashed lines for easy identification.)

Figure 30A:
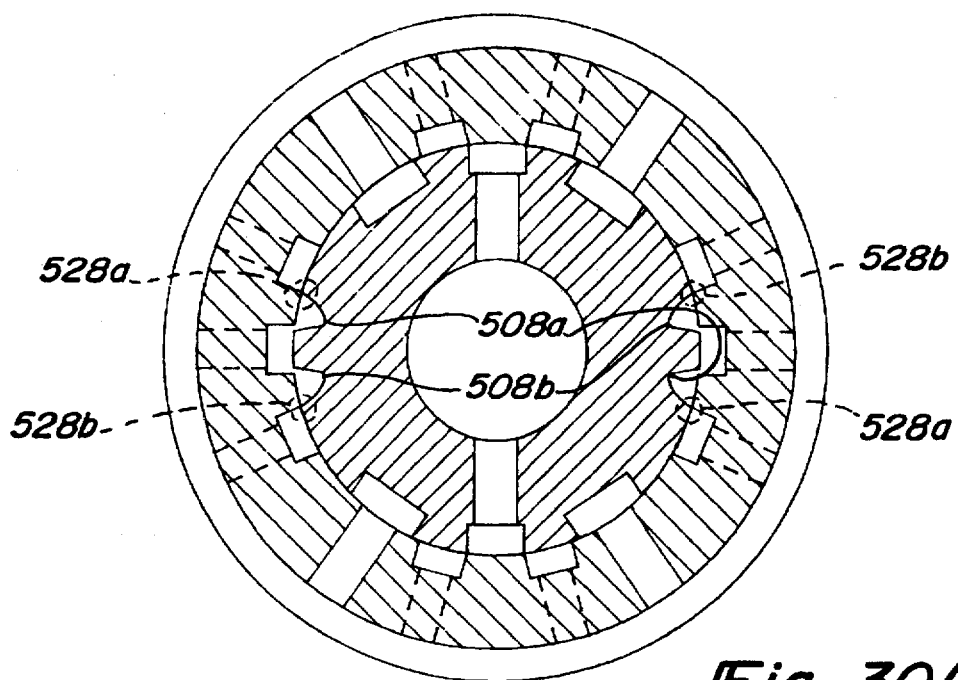
Figure 29A:
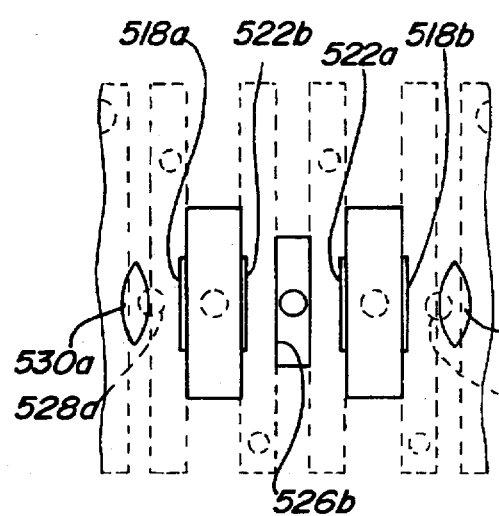
FIGS. 29A, 29B, 29C and 29D are enlarged descriptive plan views of the control valve shown in FIG. 27A of the invention depicting four respective operating zones thereof.
Figure 29B:
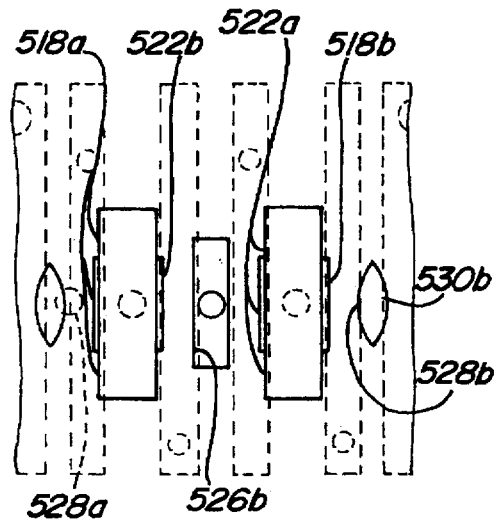
Figure 29C:
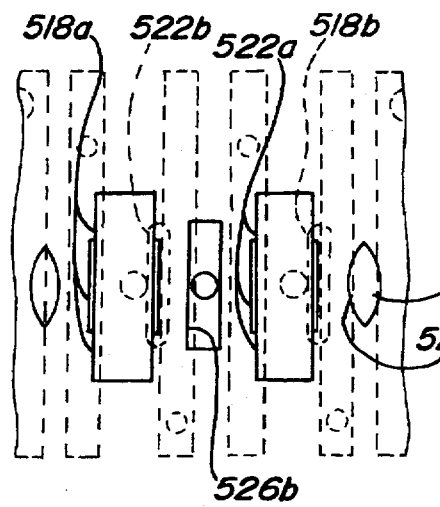
Figure 29D:
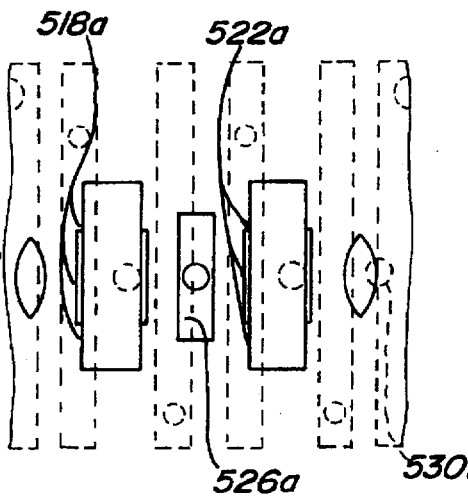
Figure 30B:
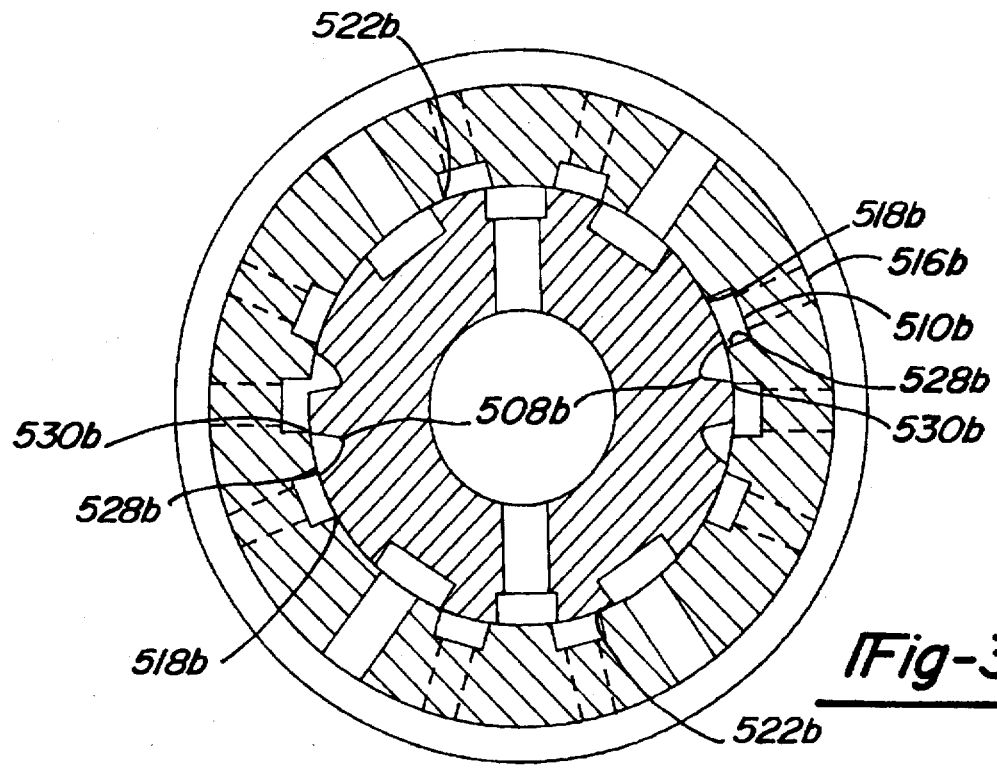
Figure 30C:
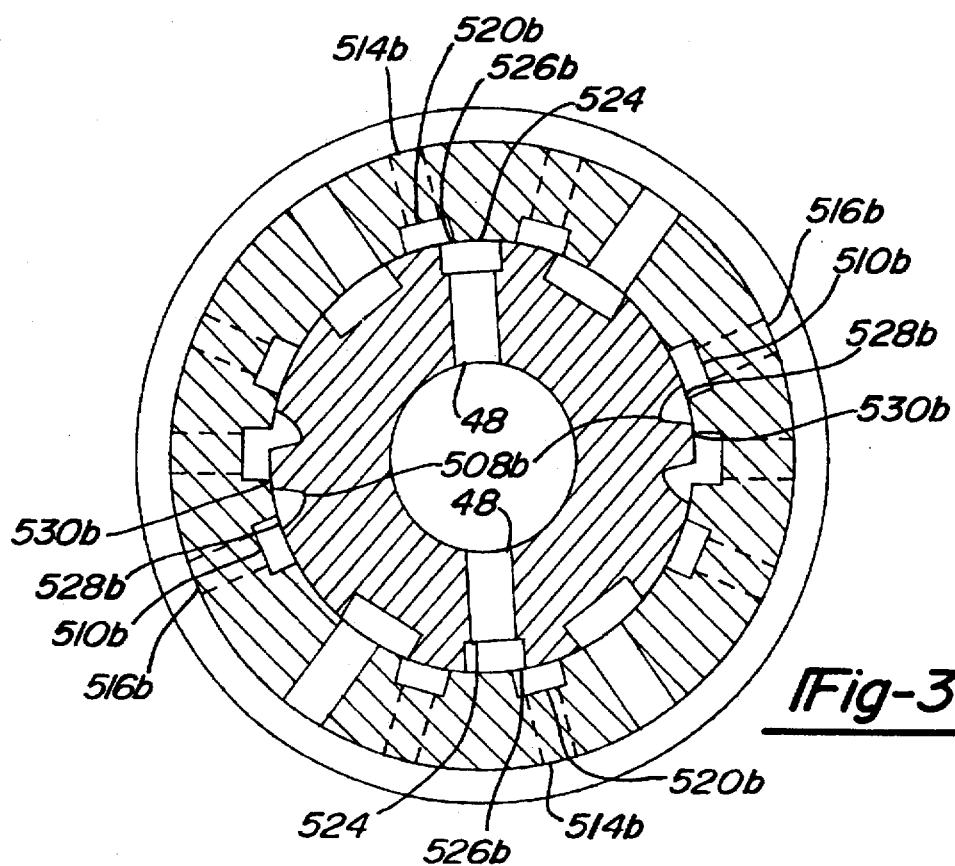

In zone A high speed flow patterns for control valve 480 are substantially the same as the low speed flow patterns therefor as shown in FIG. 30A. This is because high speed input flow circuit 498 remains inactive because both of first and second secondary bypass orifices 528*a* and 528*b*, respectively, are closed and flow through neither of first and second bypass slots 508*a* and 508*b*, respectively, is possible.

With reference now to FIG. 30B, flow patterns attained in a static zone B high speed mode of operation for valve positions in the first direction will now be described. High speed input flow circuit 498 is active because second secondary bypass orifices 528*b* have opened. In this case a portion of the flow of input fluid flows through second primary bypass orifices 530*b*, second bypass slots 508*b* and second secondary bypass orifices 528*b*. This flow path is outwardly directed through second secondary output slots 510*b* and second secondary output ports 516*b*, and is hydraulically disposed in parallel with the remaining portions of the flow of input fluid flowing through second primary and second secondary input orifices 522*b* and 518*b*, respectively. This serves to selectively reduce differential output pressure values for any valve position value within zone B. In fact, because opening second secondary bypass orifice 528*b* is smaller in area than closing second primary bypass orifice 530*b*, differential output pressure can become a nominally linear function of valve position over a significant range in static zone B operation.

With reference now to FIG. 30C, flow patterns attained in a static zone C high speed mode of operation for valve positions in the first direction will now be described. High speed input flow circuit 498 is still active because second primary bypass orifices 530*b* are still open and qualitatively that portion of the flow pattern remains the same as that described above with respect to static zone B operation. In this case, however, second primary and second secondary input orifices have closed and high speed input flow circuit 498 carries all input flow in static zone C operation. This flow path is outwardly directed through second secondary output slots 510*b* and second secondary output ports 516*b*, flows through second output groove 528*b*, and in through second output ports 514*b*, second primary output slots 520*b*, second return orifices 526*b* and return slots 524 to return slot ports 48. This enables finite differential output pressure values for static zone C operation. However, because opening second secondary bypass orifice 528*b* is now larger in area than closing second primary bypass orifice 530*b*, differential output pressure increases non-linearly (as shown, for instance, in FIGS. 32A and 33C below).

Because second primary bypass orifice 530*b* is closed along with second primary and second secondary input orifices 522*b* and 518*b*, respectively, zone D operation, as shown in FIG. 30D, is limited to dynamic operation with input flow rates equal to differential output flow rates. As with the dynamic low speed mode of operation of control valve 480 described above, differential output flow is superposed upon the above described flow patterns in Zones A, B and C. And as described before, positive output flow for valve positions in the first direction is conveyed outwardly to first primary and first secondary output ports 514*a* and 516*a*, respectively, via first primary and first secondary input orifices 522*a* and 518*a*, respectively, and first primary and first secondary output slots 520*a* and 510*a*, respectively, for high speed operation in any of the zones. Positive output flow is returned to return slots 524 via second output ports 514*b*, second output slots 520*b*, second return orifices 526*b* and return slots 524. Negative output flow (i.e., such as obtained when exiting a turn) is in a reverse direction with reference to positive output flow as described above. And finally, flow patterns attained in a high speed mode of operation for valve positions in the second or opposite direction (i.e., opposite to that indicated by arrow 512) are inverted with respect to flow patterns attained in a high speed mode of operation for valve positions in the first direction.

It should be noted that overall flow resistance characteristics of second primary and second secondary input orifices 522*b* and 518*b*, and second primary bypass orifices 530*b*, second bypass slots 508*b* and second secondary bypass orifices 528*b* are similar to that called for hereinabove with reference to primary parasitic slots 414*a* and 414*b* and first and second secondary parasitic slots 413*a* and 413*b*. This is primarily due to the opening action of first secondary bypass orifice 528*b* (or first secondary bypass orifice 528*a* for oppositely directed valve positions) while second primary bypass orifice 530*b* (or second primary bypass orifice 516*a* for oppositely directed valve positions) is still open to a greater extent. In either valve position direction, flow resistance of either of the sets of secondary bypass orifices is decreasing at a faster rate than flow resistance of the corresponding sets of primary bypass orifices is increasing. Thus, for a selected portion of the operating range of control valve 480, overall flow resistance of the respective bypass slots decreases even though they are nominally closing. It should further be noted that first and second bypass slots 508*a* and 508*b*, respectively, serve to convey bypass fluid from high speed input slots 506 to the respective one of first and second secondary output slots 510*a* and 510*b*, respectively, formed in the same valve member (i.e., valve sleeve 490). Utilizing such bypass slots (i.e., featuring counter-direction opening first orifices whose flow resistance is being reduced at a faster rate than flow resistance of in-direction closing second orifices thereof is being increased whereby overall flow resistance of the bypass slot is being reduced over a meaningful portion of nominally closing motion of a host control valve as it selectively conveys bypass fluid between two slots formed in the same valve member) is comprised in a method for enabling a nominally closing flow metering device to have an overall flow resistance that is made to decrease over a meaningful portion of its host control valve's nominally closing motion.

Figure 31:
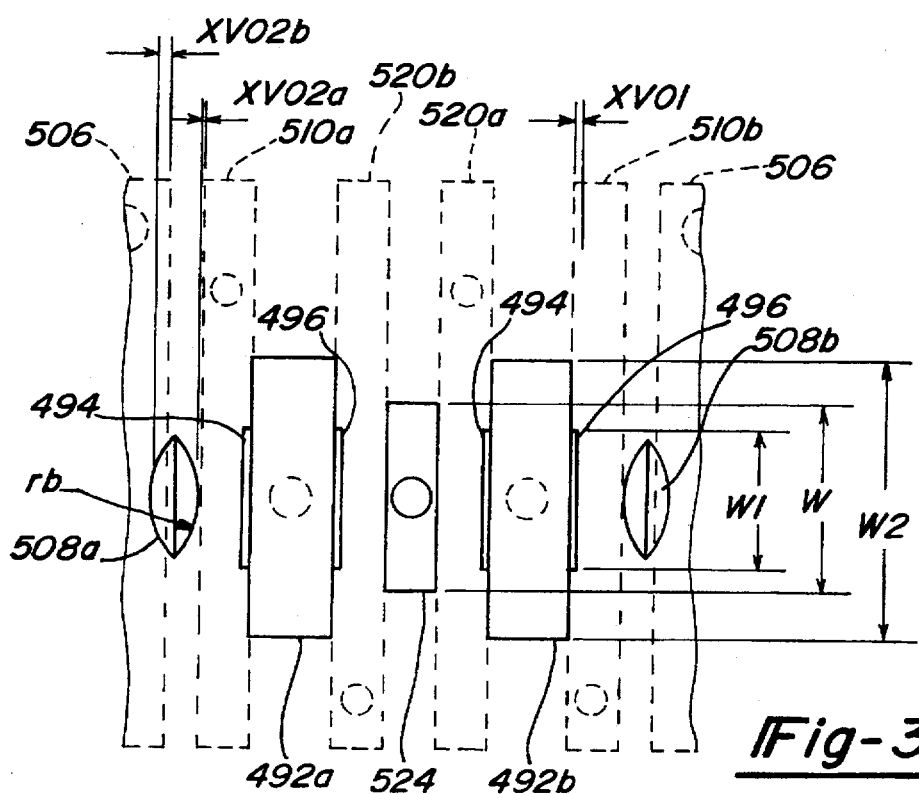
FIG. 31 is an enlarged descriptive plan view of the control valve shown in FIG. 27A of the invention.

With reference now to FIG. 31, an enlarged descriptive plan view of one set of first and second input slots 492*a* and 492*b*, respectively, return slot 524, and first and second bypass slots a and 508*b*, respectively, superposed in a centered fashion on first and second primary output slots 520*a* and 520*b*, respectively, first and second secondary output slots 510*a* and 510*b*, respectively, and high speed input slots 506. Dimensional designators are additionally depicted in FIG. 31. In addition, a common angular designator relating to fabrication angles for first formed edges 494 and second formed edges 496 is depicted in FIG. 27C. As an example of the teachings of the thirteenth alternative preferred embodiment of the invention, Table 4 enumerates these dimensions and torsion bar stiffness to input shaft diameter ratio for the particular design whose performance characteristics are depicted in FIGS. 32A, 32B, 32C, 33A, 33B, 33C and 33D. With reference to Table 4, n is number of slot sets utilized, $K_t$ is torsion bar stiffness, d is input shaft diameter and the other dimension designators are as indicated in FIGS. 27C and 31.

TABLE 4

| Dimensions or Ratios | Values [in], [deg] or [in · lb/in] |
|---|---|
| w | 0.746/n |
| w1 | 0.543/n |
| w2 | 1.086/n |
| rb | $0.740/n^2$ |
| xvo1 | 0.0134 |
| xvo2a | 0.0034 |
| xvo2b | 0.0228 |
| α | 10 |
| $K_t/d$ | 1187 |

Figure 32A:
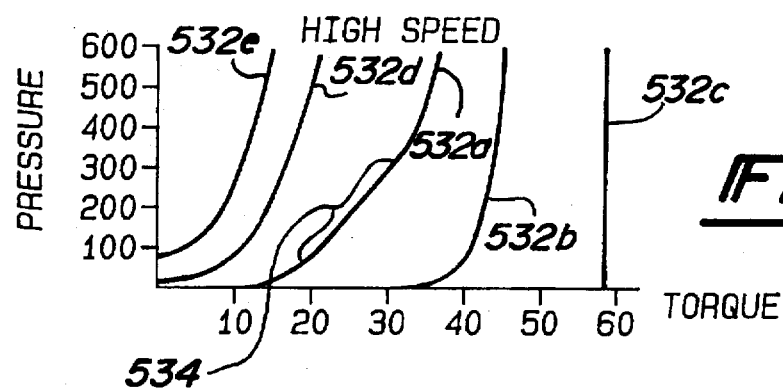
FIGS. 32A, 32B and 32C are graphical illustrations depicting high and low speed performance, and pump delivery volumetric flow rates, respectively, for the control valve shown in FIG. 27A.
Figure 32B:
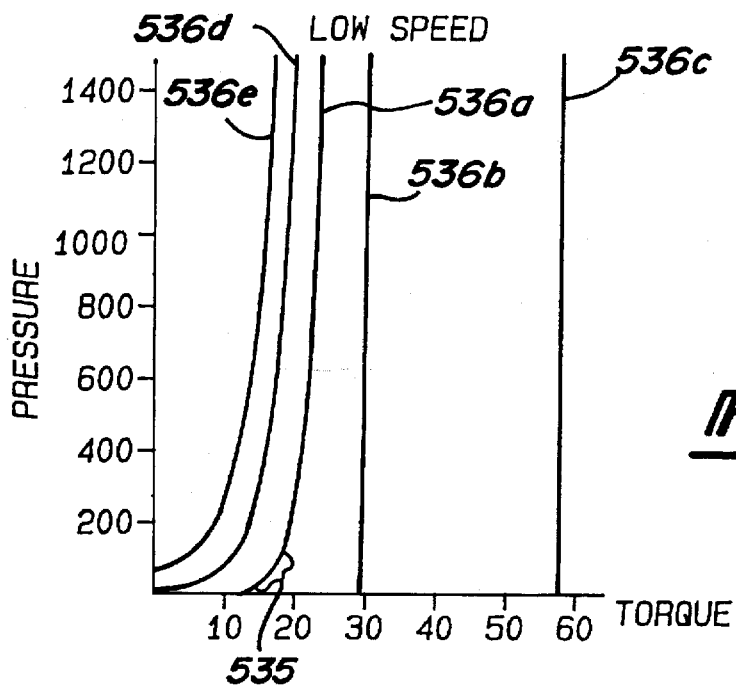
Figure 32C:
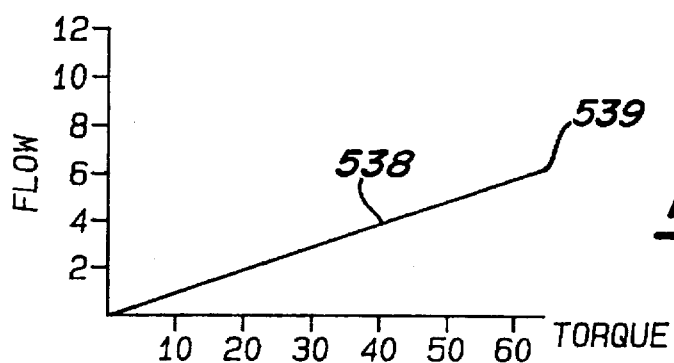
Figure 33A:
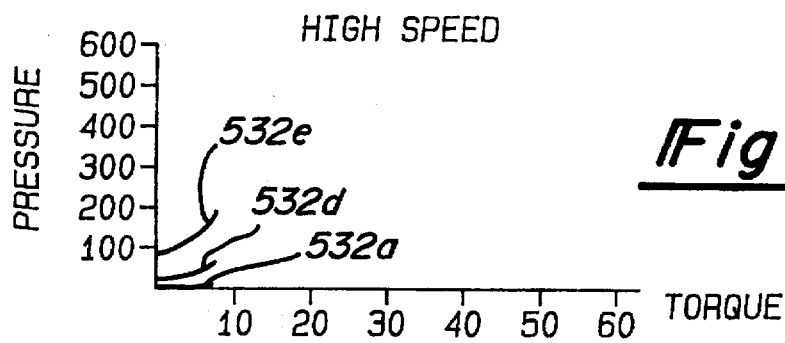
FIGS. 33A, 33B, 33C and 33D are graphical illustrations depicting pressure-effort curves for the control valve shown in FIG. 27A showing operation in each of the four respective operating zones depicted in FIGS. 29A, 29B, 29C and 29D.
Figure 33B:
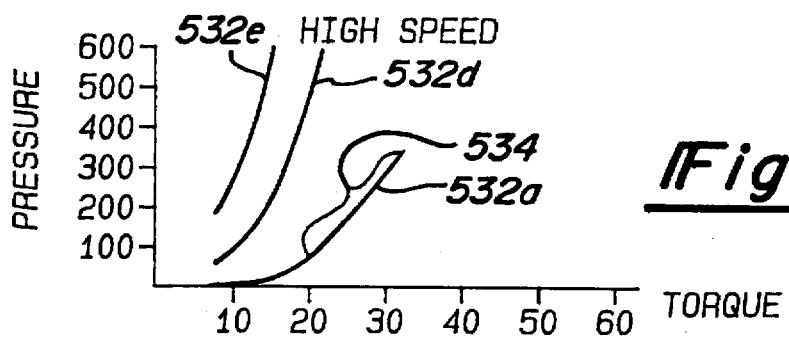
Figure 33C:
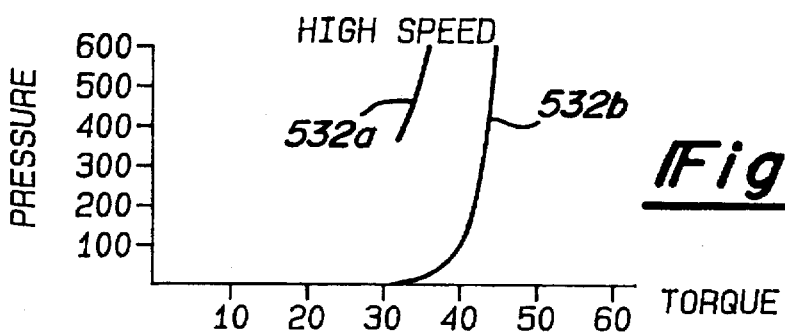
Figure 33D:
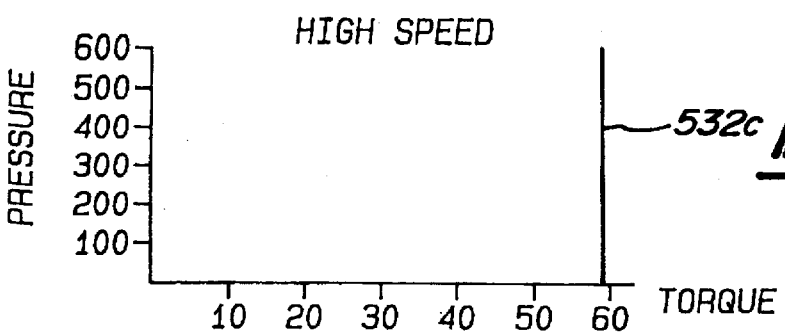

As mentioned above, the unique overall flow resistance characteristics of primary input orifices 522a or 522b, secondary input orifices 518a or 518b, respectively, and primary bypass orifices 530a or 530b, respectively, bypass slots 508a or 508b, respectively, are responsible for linear behavior of control valve 480 over a selected range of valve positions. With reference to FIG. 32A, high speed operation of control valve 480 is shown in curves 532a, 532b, 532c, 532d and 532e which depict pressure-effort curves for differential output flow values of 0.0 in³/sec, 3.0 in³/sec, 6.0 in³/sec, -3.0 in³/sec and -6.0 in³/sec, respectively. Linear zone 534 of curve 532a illustrates outstanding linearity in the static performance characteristic of control valve 480. This is in strong contrast with "knee" 63 in curve 62a of FIG. 2A. In FIG. 32B, low speed operation of control valve 480 is shown in curves 536a, 536b, 536c, 536d and 536e which depict pressure-effort curves for differential output flow values of 0.0 in³/sec, 3.0 in³/sec, 6.0 in³/sec, -3.0 in³/sec and -6.0 in³/sec, respectively. Control valve 480 relies on an altered internal flow path instead of different pump delivery volumetric flow rates for enabling high and low speed operation. Pump delivery volumetric flow values depicted by curve 538 in FIG. 32C are generally less than corresponding values depicted by curve 456 in FIG. 25C and feature a peak pump delivery volumetric flow rate of about 6.0 in³/sec at peak value 539. Furthermore, using a selectable high speed input flow circuit comprising a bypass slot is comprised in a method of providing speed sensitive control of steering assist.

It is worth noting that "knee" portion 535 of curve 536a is similarly non-linear with reference to "knee" portion 63 of curve 62a in FIG. 2A. Again, manipulation of equation (1) above reveals that a pressure drop across a controlling orifice, $\Delta P_{io}$, is nominally proportional to $(Q_{io}/A_{io})^2$ where in this case, the subscript "io" indicates "input orifice". In this case, $Q_{io}$ and $A_{io}$ are linear functions of torque as before. However, if a triangular input orifice similar to first and second primary parasitic orifices 416a and 416b, respectively, had been used, $A_{io}$ would be inversely proportional to the square of torque. And, $\Delta P_{io}$ would be nominally proportional to the sixth power of torque which would increase non-linearity of curve 536a.

With reference now to FIGS. 33A, 33B, 33C and 33D, selected portions of curves 532a, 532b, 532c, 532d and 532e corresponding to respective operation in each of the four operating zones A, B, C and D of input shaft 481 and valve sleeve 490 are reproduced. Consistent with the above description of the method for enabling a nominally closing flow metering device to have an overall flow resistance that is made to decrease over a meaningful portion of its host control valve's motion, it can be seen that linear portion 534 of curve 532a is confined to zone B, wherein flow resistance of secondary bypass orifices 528a or 528b, respectively, is being reduced at a faster rate than flow resistance of respective sets of primary bypass orifices 530a or 530b, respectively, is being increased.

Figure 34:
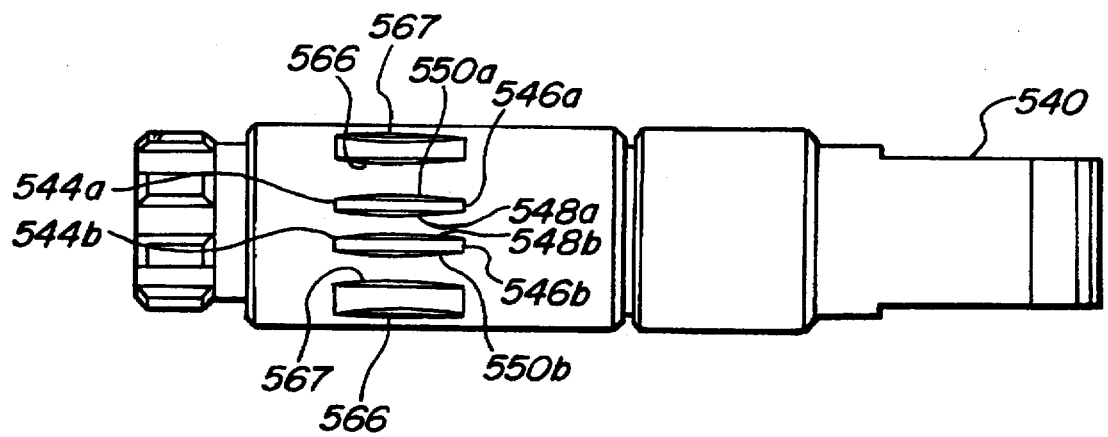
FIG. 34 is a side view of an input shaft comprised in a control valve of a fourteenth alternative preferred embodiment of the invention.

A fourteenth alternative preferred embodiment of the invention is shown in FIGS. 34 and 35, wherein a side view of an input shaft 540, and a sectional view of input shaft 540 and valve sleeve 542 are shown, respectively. Functionally, input shaft 540 and valve sleeve 542 are interchangeable as a set with input shaft 481 and valve sleeve 490 within housing 486 to form a control valve 480a having substantially the same performance characteristics as control valve 480. Input shaft 540 and valve sleeve 542 share many of the features of input shaft 481 and valve sleeve 490. As such, like reference numerals are used in FIG. 27B and FIG. 35 to identify like features. However, input shaft 540 includes first and second bypass slots 544a and 544b, respectively, comprising slots 546a and 546b, respectively, first formed edges 548a and 548b, respectively, and second formed edges 550a and 550b, respectively, in lieu of first and second bypass slots 508a and 508b, respectively. Formed edges such as first formed edges 494, 548a and 548b, and second formed edges 496, 550a and 550b are known to suppress valve noise (i.e., "hiss") when fluid flows thereover under high differential pressure. Thus, control valve 480a is preferred for non-speed sensitive operation wherein high differential pressures are routinely encountered by fluid flow through first and second bypass slots 544a and 544b, respectively, during parking maneuvers.

Formed edges such as first and second formed edges 494 and 496, respectively, are usually formed in a very precise manner as substantially flat planes. However, in the case of first and second formed edges 548a and 548b, and 550a and 550b, respectively, it is desirable to achieve a selected concave curved shape thereof to maintain linearity such as depicted by linear zone 534 of curve 532a. In this case, first and second formed edges 548a and 548b, and 550a and 550b, respectively, are formed with substantially identical lengths in the tangential direction as depicted in FIG. 35 but longer in the axial direction as depicted in FIG. 34 than equivalent portions of first and second bypass slots 508a and 508b, respectively, in order to maintain similar effective flow areas therethrough.

Figure 37:
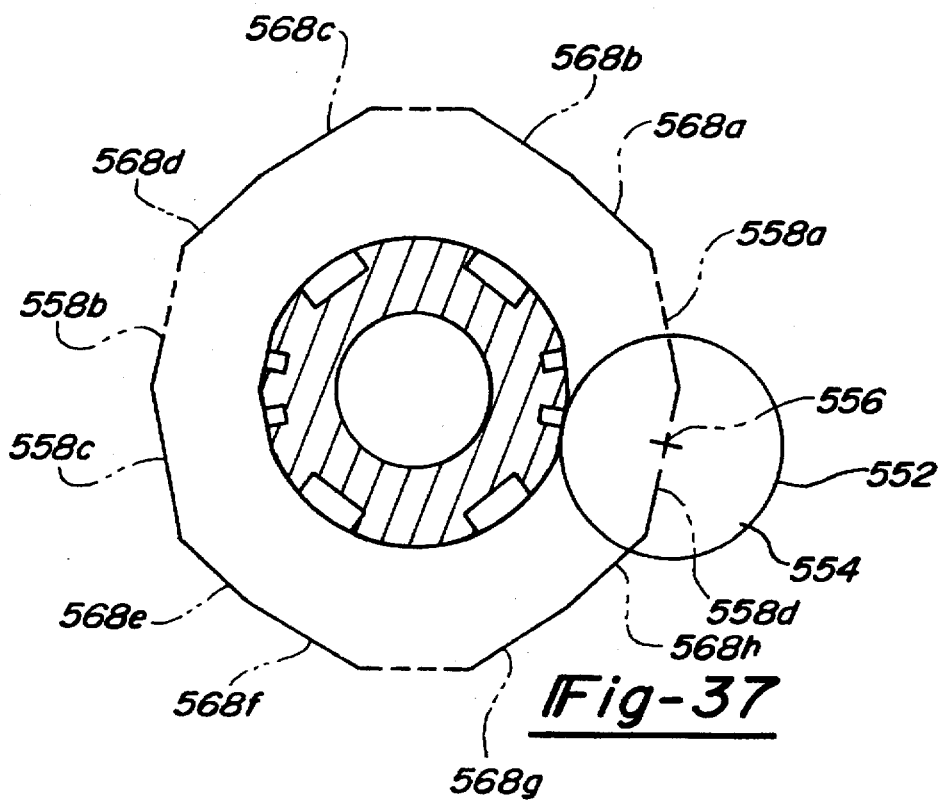
FIG. 37 is a schematic drawing showing a path taken by the grinding wheel depicted in FIG. 36 with reference to the input shaft as shown in FIG. 34 in forming the flow control and fluid bypass edges.

For ease in their forming, it is desirable for respective sets of first and second formed edges 548a and 550a, respectively, and 548b and 550b, respectively, to be formed in a coplanar manner as portions of a chordal plane but curved orthogonally in a concave manner. With reference now to FIG. 36, a sagital view of a peripheral portion 552 of grinding wheel 554 formed with a selected convex surface thereon and used to form the respective sets of first and second formed edges 548a and 550a, respectively, and 548b and 550b, respectively, is shown. In forming the respective sets of first and second formed edges 548a and 550a, respectively, and 548b and 550b, respectively, axis 556 of grinding wheel 554 is caused to move through chordal segments 558a, 558b, 558c and 558d as shown diagramatically in FIG. 37.

In order to effect a more favorable (i.e., larger) angle between first and second formed edges 548a and 548b, and 550a and 550b, respectively, it is desirable to utilize narrow high speed input slots 562 in valve sleeve 542 (in lieu of the high speed input slots 506 used in valve sleeve 490) together with wider first and second bypass slots 544a and 544b, respectively. This is feasible since slots 546a and 546b are still sufficiently separated to avoid burning portions 564 therebetween in an induction hardening operation commonly utilized in fabrication of input shafts such as input shaft 540.

For convenience, first and second curved formed edges 566 and 567, respectively, may be co-formed in a single operation with grinding wheel following a path additionally comprising chordal segments 568a, 568b, 568c, 568d, 568e, 568f, 568g and 568h in lieu of utilizing first and second (planar) formed edges 494 and 496, respectively, as shown in FIG. 27D. In such a case $A_{io}$ is inversely proportional to the 3/2 power of torque. And, $\Delta P_{io}$ is nominally proportional to the fifth power of torque which increases non-linearity of curve 536a slightly.

Figure 38A:
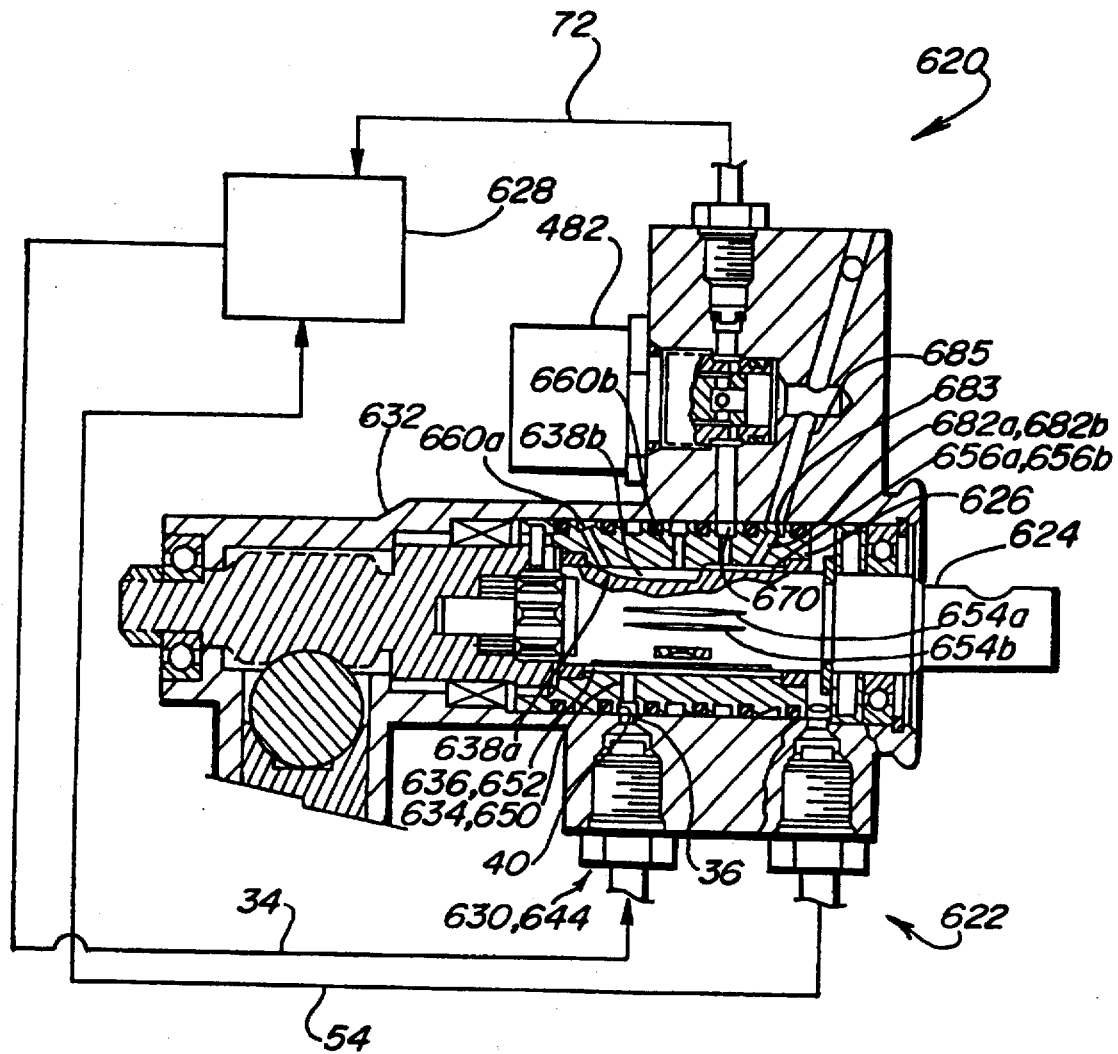
FIG. 38A is a partially schematic view of a HMPS version of a bootstrap hydraulic system of a fifteenth alternative preferred embodiment of the invention comprising a sectional view of a control valve utilized therein.
Figure 38B:
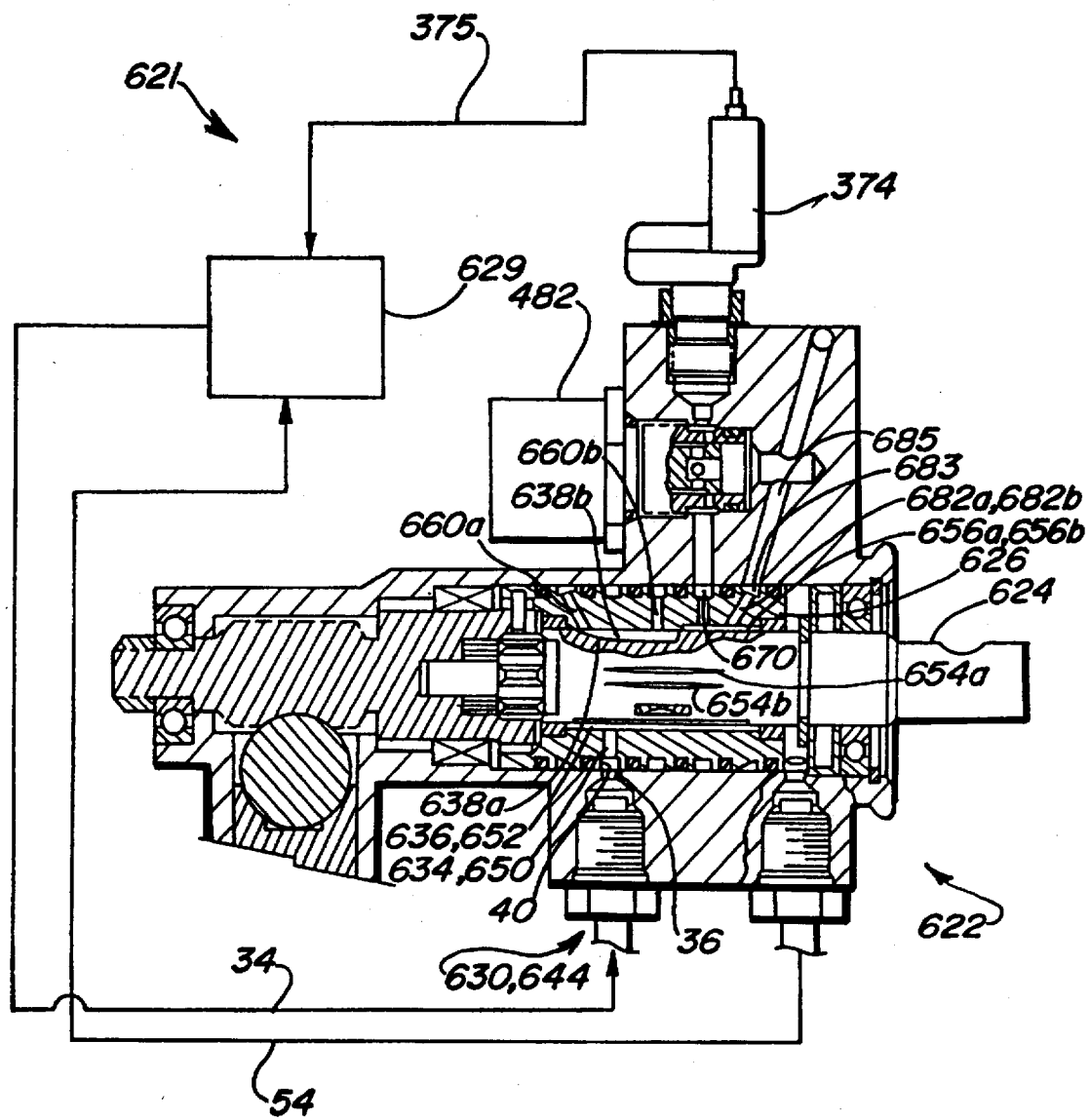
FIG. 38B is a partially schematic view of an EHPS version of a bootstrap hydraulic system of a fifteenth alternative preferred embodiment of the invention comprising a sectional view of the control valve depicted in FIG. 38A.

A fifteenth alternative preferred embodiment of the invention is shown in FIGS. 38A, 38B, 38C, 38D, 38E, 38F, 38G and 38H, wherein FIGS. 38A and 38B are partially schematic views of HMPS and EHPS versions of bootstrap hydraulic systems 620 and 621, respectively, each comprising a sectional view of a control valve 622 utilized therein including an input shaft 624, valve sleeve 626 and mechanical pumping apparatus 628 or electrical pumping apparatus 629, respectively, FIGS. 38C, 38D, 38E and 38F are third, fourth, fifth and sixth sectional views showing input shaft 624 and valve sleeve 626 as a set, and FIGS. 38G and 38H are first and second side views of input shaft 624. The fifteenth alternative preferred embodiment is also directed to method and apparatus for implementing speed sensitive control of steering assist without the necessity of increasing values of the respective one of the higher or lower valued output port pressures during parking maneuvers. It is additionally directed to method and apparatus for enabling bootstrap operation without the use of hydraulic selector devices such as implemented above by three-way valve spools 68 and 182. Control valve 622 is similar in architecture with reference to control valve 480 and includes many of the common components utilized therein. As such, like reference numerals are used in FIGS. 27A and 38A to identify like components. Internal flow patterns in control valve 622 also differ dramatically from those of prior art rotary valves. For that reason FIGS. 39, 41A, 41B, 41C and 41D comprising descriptive drawings which depict flow patterns attained during low and high speed static modes of operation, respectively, of control valve 622 are also presented and described hereinbelow.

With particular reference now to each of FIGS. 38A and 38B, control valve 622 is shown multi-sectioned in a manner which depicts a selection of its features. A full time input flow circuit 630 comprises input port 36 of housing 632, input groove 40, input ports 634 and input slots 636 of valve sleeve 626, and first and second output slots 638a and 638b, respectively (which are each configured in an open-center manner and comprise first formed edges 640 and second formed edges 642 disposed in first and second turning directions, respectively, as shown in FIGS. 38C and 38D of input shaft 624. In addition, control valve 622 is normally configured as a speed sensitive control valve by utilizing electronically variable orifice sub-assembly 482 to selectively enable a high speed input flow circuit 644. High speed input flow circuit 644 is enabled by electronically variable orifice sub-assembly 482 via selective activation of a supplemental intermediate return circuit to be described below. It comprises high speed input ports 650 and high speed input slots 652 of valve sleeve 626. Unless electronically variable orifice sub-assembly 482 is activated, high speed input flow circuit 644 is hydraulically disposed in parallel with full time input flow circuit 630. However, as shown in FIGS. 38C, 41B and 41C, high speed pump delivery flow through high speed input flow circuit 644 occurs only when either of first or second bypass slots 654a and 654b, respectively, of input shaft 624 are open to both of high speed input slots 652 and the respective one of first and second supplemental intermediate return slots 656a and 656b of valve sleeve 626 as a function of valve position.

Control valve 622 could of course be configured in a non-speed selective manner by simply eliminating electronically variable orifice sub-assembly 482. In this case operation is confined to that described below as the high speed mode of operation. Selection of speed sensitive operation herein for implementation of control valve 622 is exemplary in nature and is not intended to limit the scope of the present invention.

Figure 39:
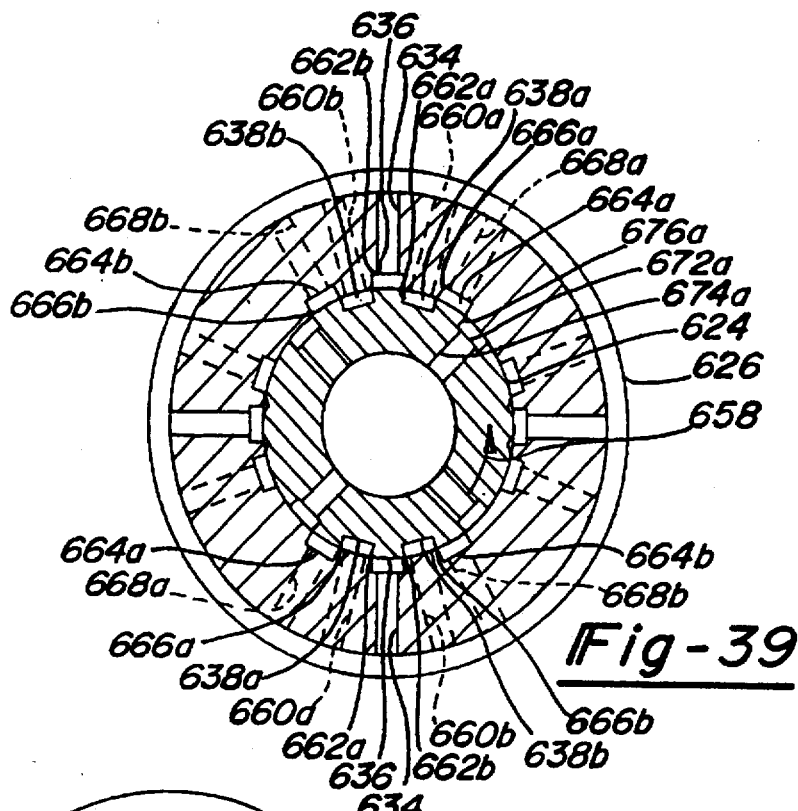
FIG. 39 is a sectional view of the control valve shown in FIGS. 38A and 38B of the invention depicting flow patterns therein in a low speed mode of operation.

With reference now to FIG. 39, flow patterns attained in a static low speed mode of operation of control valve 622 will now be described. Valve positions in a first direction (i.e., relative rotational displacement of input shaft 624 in a first direction with respect to valve sleeve 626) is indicated by arrow 658. Flow of input fluid through full time input flow circuit 630 is conveyed to input slots 636 via input ports 634. Because static operation is assumed, no fluid flows in either direction in either of first or second output ports 660a or 660b. Thus, all fluid flowing through control valve 622 is split in a nominally even manner and conveyed to first and second output slots 638a and 638b, respectively, from input ports 634 via input slots 636, and first and second input orifices 662a and 662b, respectively. The fluid streams are then conveyed to first and second intermediate return slots 664a and 664b, respectively, via respective ones of first and second intermediate return orifices 666a and 666b, respectively. The fluid stream conveyed to second intermediate return slots 664b passes out second intermediate return ports 668b, through intermediate return groove in FIG. 38B 670 and in through first intermediate return ports 668a to join the fluid stream directly conveyed to first intermediate return slots 664a. The fluid then passes through first return slots 672a to first return slot ports 674a via first return orifices 676a. From there the fluid returns to a reservoir (not shown) as described above with respect to control valve 14. Volumetric flow rate is determined by the product of return orifice area of the open return orifices and $\Delta P$. In this case, first return orifices 676a are the open ones whereby it is understood that pressure in the first and second intermediate return slots 664a and 664b, respectively, first and second intermediate return ports 668a and 668b, respectively, and intermediate return groove 670 is nominally equal in value to $\Delta P$. And since static operation is assumed, pressure in first output slots 638a is nominally equal in value to supply pressure $P_S$ while pressure in second output slots 638b is nominally equal in value to that in second intermediate return slots 664b, or $\Delta P$, for significant valve position values. Thus, differential output pressure is nominally equal to $P_S - \Delta P$ and that value is also nominally imposed upon second input and first return orifices 662b and 666a, respectively.

Thus, control valve 622 does not require a three-way valve such as implemented with three-way valve spool 182 in control valve 480. In this case $\Delta P$ is conveyed to pump apparatus 479 via first and second intermediate return ports 668a and 668b, respectively, intermediate return groove 670 and intermediate return port 648. Utilizing such an intermediate pressure circuit (i.e., featuring an intermediate pressure sensing point disposed between closed-center valve elements such as first or second return orifices 676a and 676b, respectively, and open-center flow control valve elements such as first and second input orifices 662a and 662b, respectively, and first and second intermediate return orifices 666a and 666b, respectively, which are all positioned in a series arrangement) is comprised in a method for enabling system pressure control at a value equal to differential load pressure plus a selected minimal supplemental pressure value in order to enable bootstrap system operation without interdicting the load circuit in any way.

Differential output flow is superposed upon the above described flow patterns in a dynamic low speed mode of operation of control valve 622. Positive output flow for valve positions in the first direction is conveyed outwardly to first output ports 660a via first input orifices 662a and first output slots 638a. Positive output flow is returned to first return slots 672a via second output ports 660b, second output slots 638b, second intermediate return orifices 666b, second intermediate return slots 664b, second intermediate return ports 668b, intermediate return groove 670, first intermediate return ports 668a, first intermediate return slots 664a and first return orifices 676a. Negative output flow (i.e., such as obtained when exiting a turn) is in a reverse direction with reference to positive output flow as described above. Flow patterns attained in a low speed mode of operation for valve positions in the second or opposite direction (i.e., opposite to that indicated by arrow 658) are inverted with respect to flow patterns attained in a low speed mode of operation for valve positions in the first direction.

With reference now to FIGS. 40A, 40B, 40C and 40D, descriptive plan views depicting four respective operating zones A, B, C and D of input shaft 624 and valve sleeve 626 are shown for high speed operation for valve positions in the first direction. (For high speed operation for valve positions in the second direction the various designated orifices would be inverted as before.) In zone A shown in FIG. 40A, all input and intermediate return orifices 662a and 662b, and 666a and 666b, respectively, are open while first return orifice 676a is opening. On the other hand, first and second secondary bypass orifices 678a and 678b, respectively, are closed and first and second primary bypass orifices 680a and 680b, respectively, are open. In zone B shown in FIG. 40B, first input orifices 662a and second intermediate return orifices 666b are opening further but second input orifices 662b and first intermediate return orifices 666a are closing, first return orifices 676a are continuing to open, first secondary bypass orifices 678a are closing further but second secondary bypass orifices 678b are now slightly open while second primary bypass orifice 680b are beginning to close but are still larger than second secondary bypass orifice 678b. In zone C shown in FIG. 40C, first input and second intermediate return orifices 662a and 666b, respectively, are opening still further but second input and first intermediate return orifices 662b and 666a, respectively, are now closed, first return orifices 676a are opening still further, and second secondary bypass orifices 678b have opened to the point that they are now larger than second primary bypass orifice 680b which are now closing. In zone D shown in FIG. 40D first input, second intermediate and first return orifices 662a, 666b and 676a, respectively, are continuing to open, but second primary bypass orifice 680b are closed.

(With reference to FIGS. 40A, 40B, 40C and 40D above, and others to follow, orifices that are closed are depicted with encircling dashed lines for easy identification.)

Figure 41A:
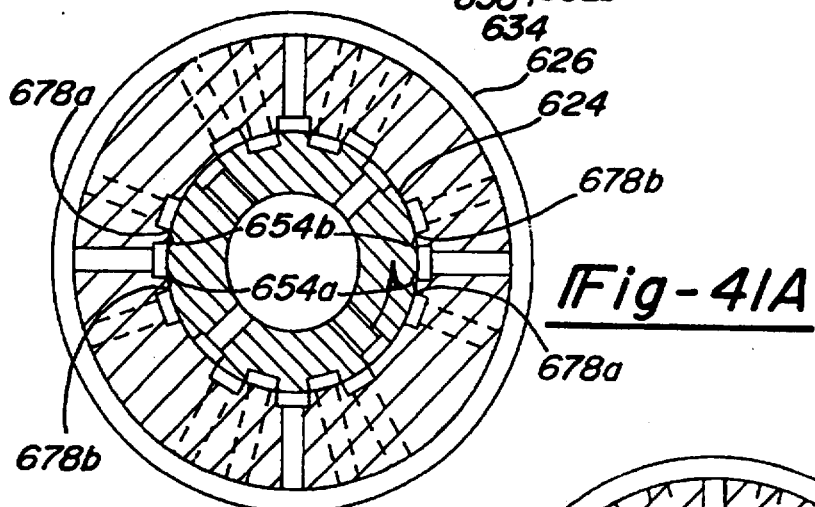
FIGS. 41A, 41B, 41C and 41D are sectional views of the control valve as shown in FIGS. 38A and 38B of the invention depicting flow patterns therein corresponding to the four respective operating zones depicted in FIGS. 40A, 40B, 40C and 40D.
Figure 41B:
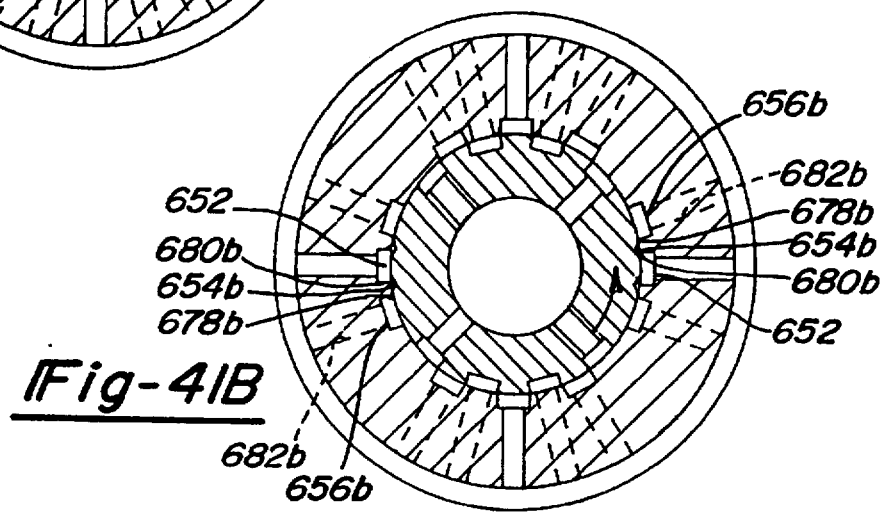
Figure 40A:
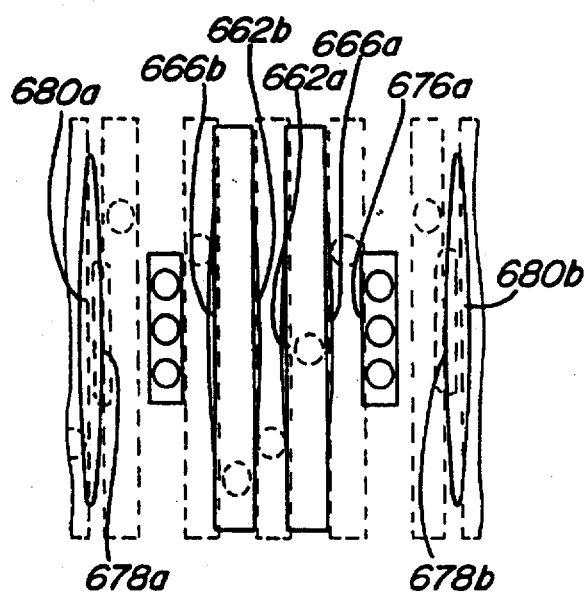
FIGS. 40A, 40B, 40C and 40D are enlarged descriptive plan views of the control valve shown in FIGS. 38A and 38B of the invention depicting four respective operating zones thereof.
Figure 40B:
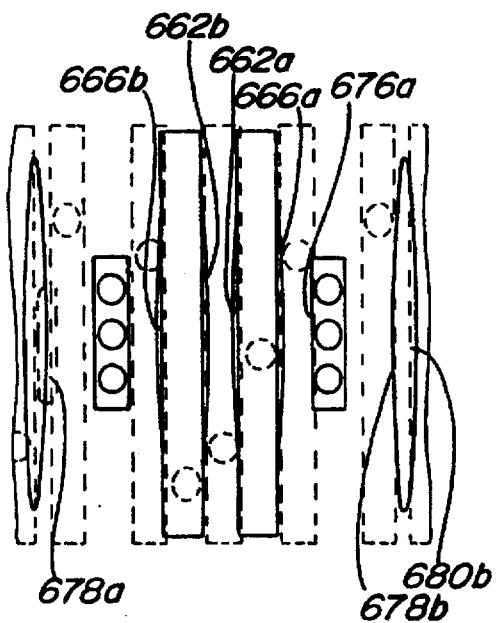
Figure 40C:
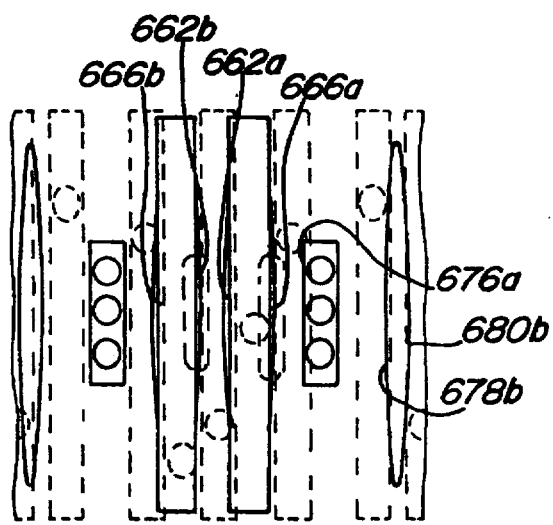
Figure 40D:
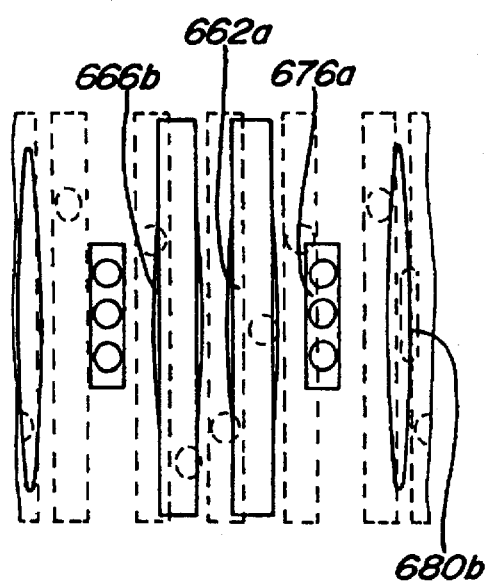
Figure 41C:
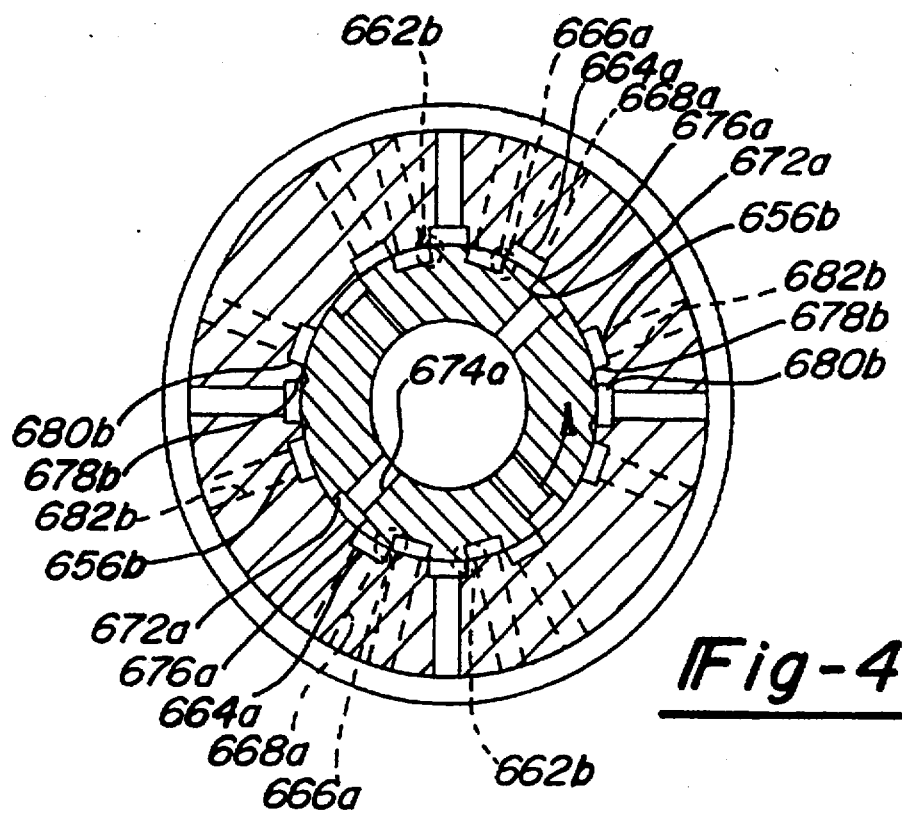

In zone A high speed flow patterns for control valve 622 are substantially the same as the low speed flow patterns therefor as shown in FIG. 41A. This is because high speed input flow circuit 644 remains inactive because both of first and second secondary bypass orifices 678a and 678b, respectively, are closed and flow through neither of first and second bypass slots 654a and 654b, respectively, is possible.

With reference now to FIG. 41B, flow patterns attained in a static zone B high speed mode of operation for valve positions in the first direction will now be described. High speed input flow circuit 644 is active because second secondary bypass orifices 678b have opened. In this case a portion of the flow of input fluid flows through second primary bypass orifices 680b, second bypass slots 654b and second secondary bypass orifices 678b. This flow path is outwardly directed through second supplemental intermediate return slots 656b and second supplemental output ports 682b, and is hydraulically disposed in parallel with the remaining portions of the flow of intermediate return fluid flowing through first and second intermediate return ports 668a and 668b, respectively, via supplemental groove 683, supplemental port 685 and electronically variable orifice sub-assembly 482 (as shown in FIGS. 38A and 38B). This serves to selectively reduce differential output pressure values for any valve position value within zone B. In fact, because opening second secondary bypass orifice 678b is smaller in area than closing second primary bypass orifice 680b, differential output pressure can become a nominally linear function of valve position over a significant range in static zone B operation.

With reference now to FIG. 41C, flow patterns attained in a static zone C high speed mode of operation for valve positions in the first direction will now be described. High speed input flow circuit 644 is still active because second primary bypass orifices 680b are still open and qualitatively that portion of the flow pattern remains the same as that described above with respect to static zone B operation. In this case, however, second input and first intermediate return orifices 662b and 666a, respectively, have closed and high speed input flow circuit 644 carries all input flow in static zone C operation. This flow path is outwardly directed through second supplemental intermediate return slots 656b and second supplemental intermediate return ports 682b, flows through intermediate return groove 670, and in through first intermediate return ports 668a, first intermediate return slots 664a, first return orifices 676a and first return slots 672a to first return slot ports 674a. This enables finite differential output pressure values for static zone C operation. However, because opening second secondary bypass orifice 678b is now larger in area than closing second primary bypass orifice 680b, differential output pressure increases non-linearly (as shown, for instance, in FIGS. 43A and 43C below).

Figure 41D:
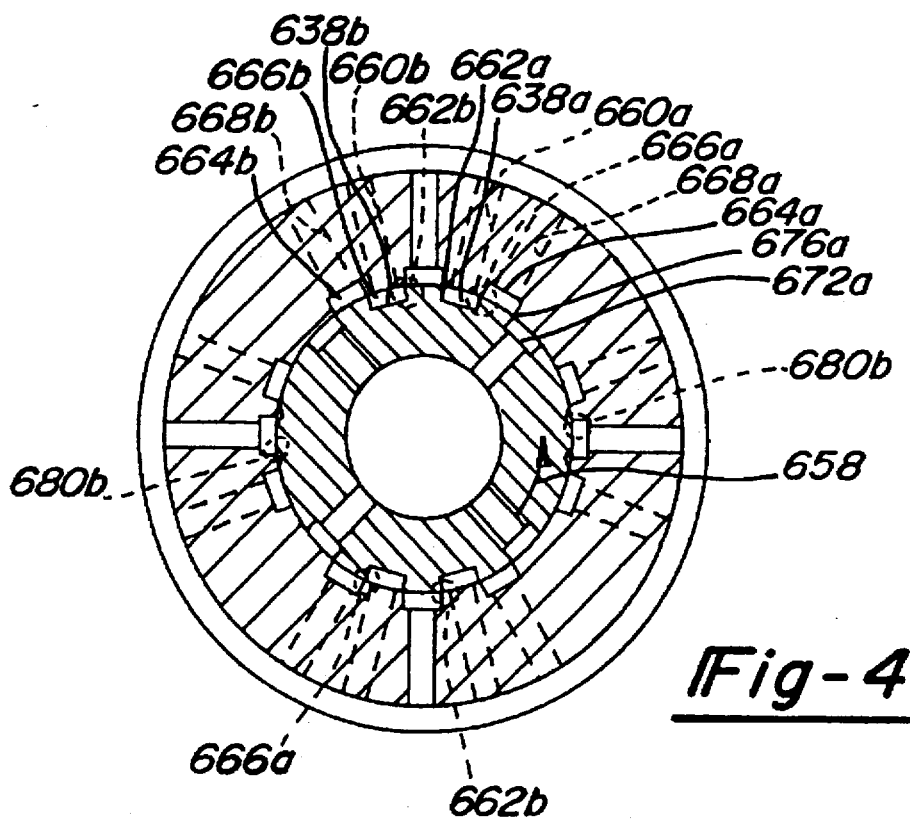

Because second primary bypass orifice 680b is closed along with second input and first intermediate return orifices 662b and 666a, respectively, zone D operation, as shown in FIG. 41D, is limited to dynamic operation with input flow rates equal to differential output flow rates. As with the dynamic low speed mode of operation of control valve 622 described above, differential output flow is superposed upon the above described flow patterns in Zones A, B and C. And as described before, positive output flow for valve positions in the first direction is conveyed outwardly to first output ports 660a via first input orifices 662a and first output slots 638a for high speed operation in any of the zones. Positive output flow is returned to first return slots 672a via second output ports 660b, second output slots 638b, second intermediate return orifices 666b, second intermediate return slots 664b, second intermediate return ports 668b, intermediate return groove 670, first intermediate return ports 668a, first intermediate return slots 664a and first return orifices 676a. Negative output flow (i.e., such as obtained when exiting a turn) is in a reverse direction with reference to positive output flow as described above. And finally, flow patterns attained in a high speed mode of operation for valve positions in the second or opposite direction (i.e., opposite to that indicated by arrow 658) are inverted with respect to flow patterns attained in a high speed mode of operation for valve positions in the first direction.

It should be noted that overall flow resistance characteristics of second input orifices 662b, first intermediate return orifices 666a, and second primary bypass orifices 680b, second bypass slots 654b and second secondary bypass orifices 678b are similar to that called for hereinabove with reference to primary parasitic slots 414b and first and second secondary parasitic slots 413a and 413b, and second primary and second secondary input orifices 522b and 518b, and second primary bypass orifices 530b, second bypass slots 508b and second secondary bypass orifices 528b. This is primarily due to the opening action of second secondary bypass orifice 678b (or first secondary bypass orifice 678a for oppositely directed valve positions) while second primary bypass orifice 680b (or first primary bypass orifice 680a for oppositely directed valve positions) is still open to a greater extent. In either valve position direction, flow resistance of either of the sets of secondary bypass orifices is decreasing at a faster rate than flow resistance of the corresponding sets of primary bypass orifices is increasing. Thus, for a selected portion of the operating range of control valve 622, overall flow resistance of the respective bypass slots decreases even though they are nominally closing. It should further be noted that first and second bypass slots 654a and 654b, respectively, serve to convey bypass fluid from high speed input slots 652 to the respective one of first and second supplemental intermediate return slots 656a and 656b, respectively, formed in the same valve member (i.e., valve sleeve 626). Utilizing such bypass slots (i.e., featuring counter-direction opening first orifices whose flow resistance is being reduced at a faster rate than flow resistance of in-direction closing second orifices thereof is being increased whereby overall flow resistance of the bypass slot is being reduced over a meaningful portion of nominally closing motion of a host control valve as it selectively conveys bypass fluid between two slots formed in the same valve member) is also comprised in the method described above in conjunction with control valve 480 for enabling a nominally closing flow metering device to have an overall flow resistance that is made to decrease over a meaningful portion of its host control valve's nominally closing motion.

Figure 42:
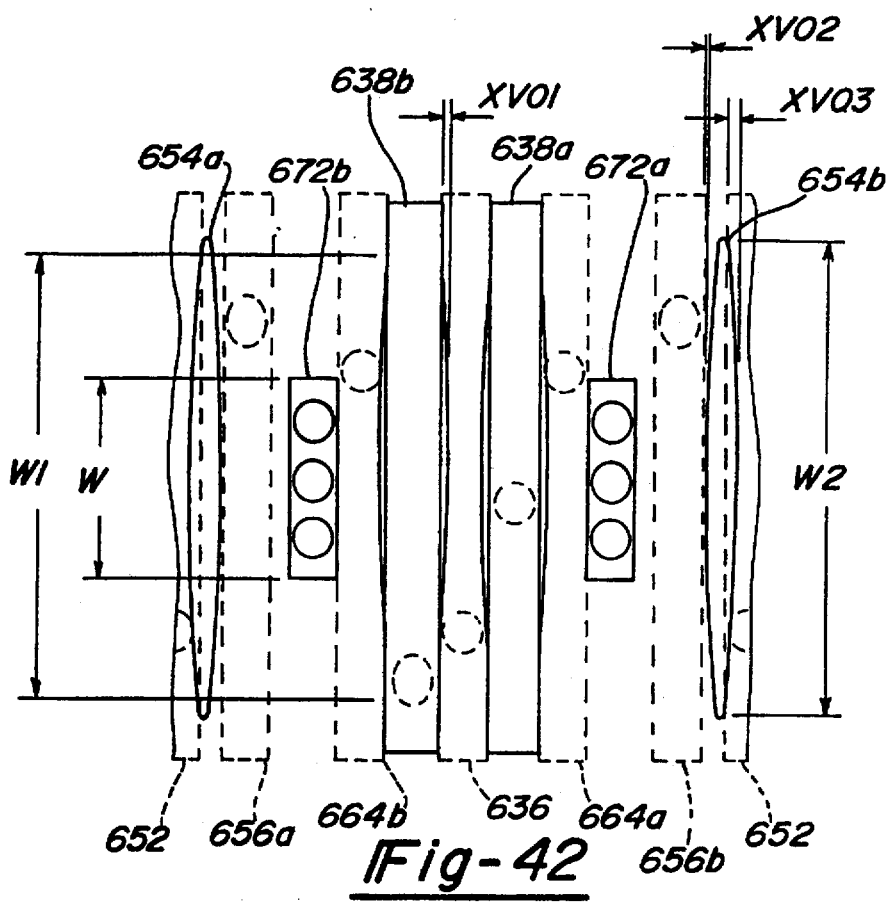
FIG. 42 is an enlarged descriptive plan view of the control valve shown in FIGS. 38A and 38B of the invention.

With reference now to FIG. 42, an enlarged descriptive plan view of one set of first and second output slots 638a and 638b, respectively, first and second return slots 672a and 672b, respectively, and first and second bypass slots 654a and 654b, respectively, superposed in a centered fashion on input slot 636, first and second intermediate return slots 664a and 664b, respectively, first and second supplemental intermediate return slots 656a and 656b, respectively, and high speed input slot 652. Dimensional designators are additionally depicted in FIG. 42. In addition, common angular designator α relating to fabrication angles for first formed edges 640 and second formed edges 642 is depicted in FIG. 38D. (Common angular designator et is valued such that first and second formed edges 640 and 642, respectively, may be fabricated in a coplaner manner. In addition, common angular designator β relating to entry angles for first and second bypass slots 654a and 654b, respectively, is depicted in FIG. 38E.

Alternate slot configuration 655, which may optionally be utilized for first and second bypass slots 654a and 654b, respectively, is shown in FIG. 38F. Slot configuration 655 comprises a parallel sided slot 655a with first and second formed edges 655b and 655c, respectively. Slot configuration 655 is desirable because more accurate placement of first and second formed edges 655b and 655c, respectively, is possible when they are formed as secondary operations independently from the forming of parallel sided slot 655a.

As an example of the teachings of the fifteenth alternative preferred embodiment of the invention, Table 5 enumerates these dimensions and torsion bar stiffness to input shaft diameter ratio for the particular design whose performance characteristics are depicted in FIGS. 43A, 43B, 43C, 44A, 44B, 44C and 44D. With reference to Table 5, n is number of slot sets utilized, $K_t$ is torsion bar stiffness, d is input shaft diameter and the other dimension designators are as indicated in FIGS. 38D, 38E, 38F and 42.

TABLE 5

| Dimensions or Ratios | Values [in], [deg] or [in · lb/in] |
| --- | --- |
| w | 0.770/n |
| w1 | 1.686/n |
| w2 | 1.808/n |
| xvo1 | 0.0133 |
| xvo2 | 0.005 |
| xvo3 | 0.022 |
| α | 10 |
| β | 20 |
| $K_t$/d | 1250 |

Figure 43A:
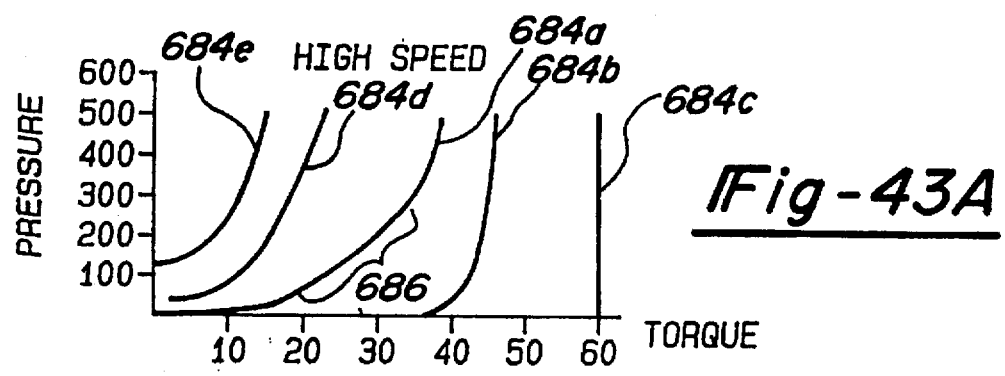
FIGS. 43A, 43B and 43C are graphical illustrations depicting high and low speed performance, and pump delivery volumetric flow rates, respectively, for the control valve shown in FIGS. 38A and 38B.
Figure 43B:
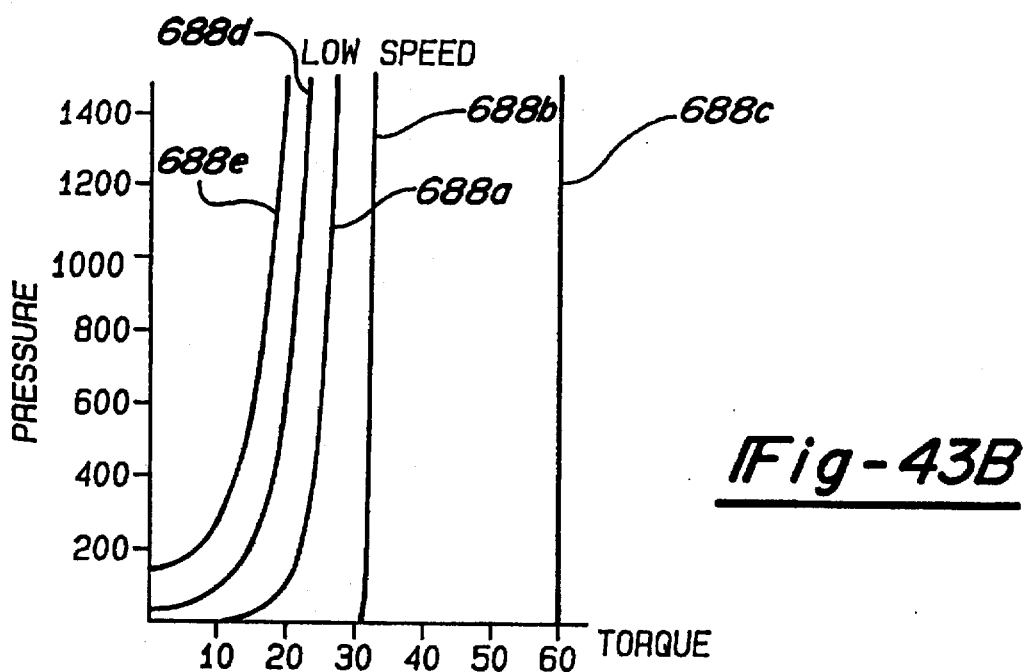
Figure 43C:
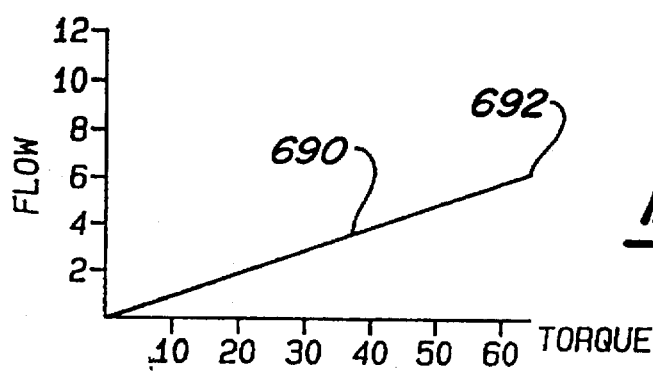
Figure 44A:
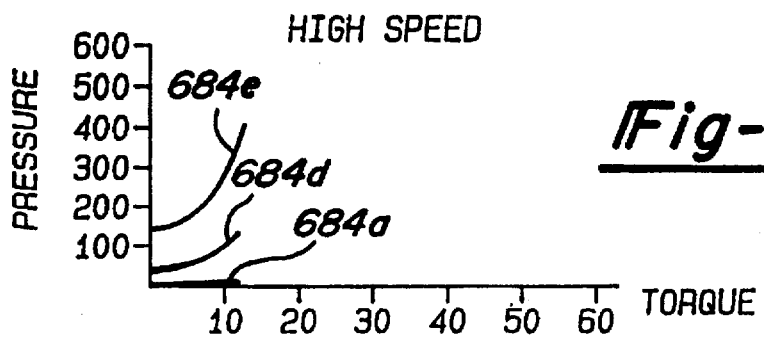
FIGS. 44A, 44B, 44C and 44D are graphical illustrations depicting pressure-effort curves for the control valve shown in FIGS. 38A and 38B showing operation in each of the four respective operating zones depicted in FIGS. 40A, 40B, 40C and 40D.
Figure 44B:
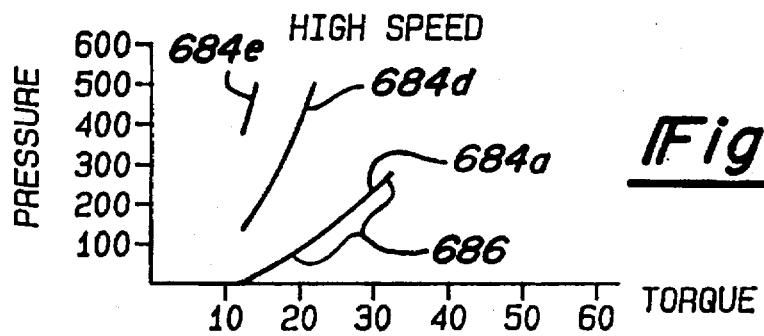
Figure 44C:
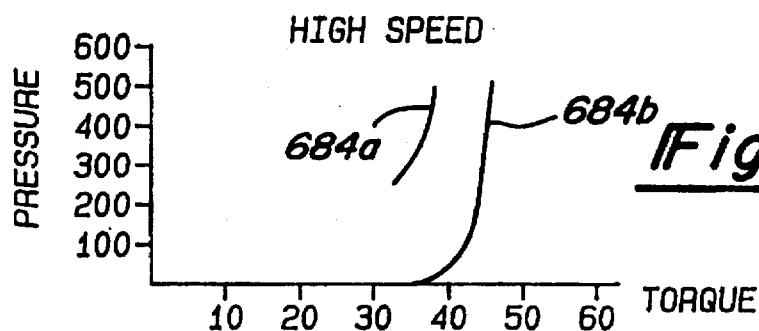
Figure 44D:
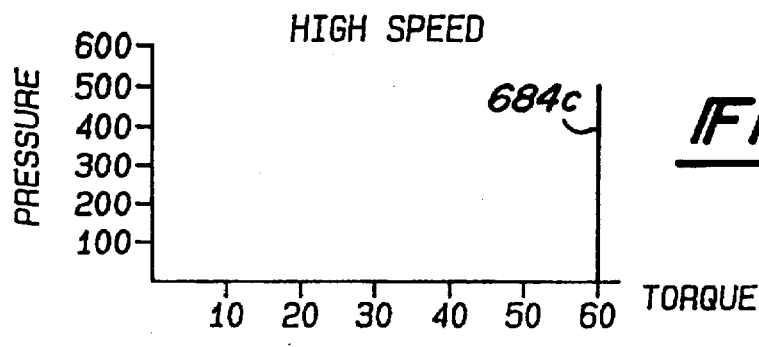

As mentioned above, the unique overall flow resistance characteristics of input orifices 662a or 662b, intermediate return orifices 666b or 666a, respectively, and primary bypass orifices 680b or 680a, respectively, bypass slots 654b or 654a, respectively, and secondary bypass orifices 678b or 678a, respectively, are responsible for linear behavior of control valve over a selected range of valve positions. With reference to FIG. 43A, high speed operation of control valve 622 is shown in curves 684a, 684b, 684c, 684d and 684e which depict pressure-effort curves for differential output flow values of 0.0 in³/sec, 3.0 in³/sec, 6.0 in³/sec, −3.0 in³/sec and −6.0 in³/sec, respectively. Linear zone 686 of curve 684a illustrates outstanding linearity in the static performance characteristic of control valve 622. This is in strong contrast with "knee" 63 in curve 62a of FIG. 2A. In FIG. 43B, low speed operation of control valve 622 is shown in curves 688a, 688b, 688c, 688d and 688e which depict pressure-effort curves for differential output flow values of 0.0 in³/sec, 3.0 in³/sec, 6.0 in³/sec, −3.0 in³/sec and −6.0 in³/sec, respectively. Control valve 622 relies on an altered internal flow path instead of different pump delivery volumetric flow rates for enabling high and low speed operation. Pump delivery volumetric flow values depicted by curve 690 in FIG. 43C are generally less than corresponding values depicted by curve 456 in FIG. 25C and feature a peak pump delivery volumetric flow rate of about 6.0 in³/sec at peak value 692. Using a selectable high speed input flow circuit comprising a bypass slot is comprised in the method of providing speed sensitive control of steering assist as noted above with reference to control valve 480.

With reference now to FIGS. 44A, 44B, 44C and 44D, selected portions of curves 684a, 684b, 684c, 684d and 684e corresponding to respective operation in each of the four operating zones A, B, C and D of input shaft 624 and valve sleeve 626 are reproduced. Consistent with the above description of the method for enabling a nominally closing flow metering device to have an overall flow resistance that is made to decrease over a meaningful portion of its host control valve's motion, it can be seen that linear portion 686 of curve 684a is substantially confined to zone B, wherein flow resistance of sets of secondary bypass orifices 678a or 678b, respectively, is being reduced at a faster rate than flow resistance of respective sets of primary bypass orifices 680a or 680b, respectively, is being increased.

Figure 45:
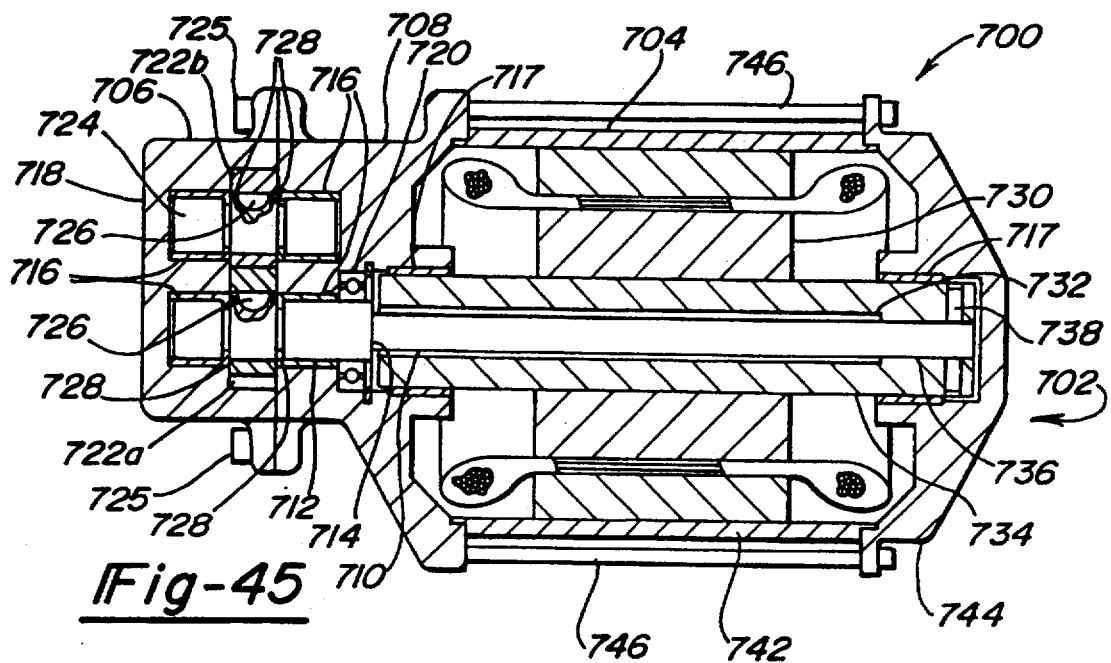
FIG. 45 is a sectional drawing of a sixteenth alternative preferred embodiment of the invention showing a servo motor-positive displacement pump assembly comprising a quill drive.

A sixteenth alternative preferred embodiment of the invention is shown in FIG. 45 wherein a servo motor-positive displacement pump assembly 700 comprising a quill drive 702 is shown. The sixteenth alternative preferred embodiment is directed to providing method and apparatus for enabling simplified construction such an assembly wherein servo motor 704 and positive displacement pump 706 are effectively integrated one to another in forming servo motor-positive displacement pump assembly 700. Positive displacement pump 706 may be of any known type able to operate at very low speeds and output pressures while maintaining substantially sealed pumping chambers. For example, positive displacement pump 706 is depicted as a gear pump in FIG. 45. (Variable displacement pump 232 is, on the other hand, an unlikely example of a suitable positive displacement pump for this purpose. This is because it is doubtful if pumping chambers 234 could always be depended upon to remain effectively sealed at negligible speeds and pressures. In its normal operation variable displacement pump 232 never operates at low speeds and centrifugal force is always available to keep rollers 233 sealingly in contact with circular cam ring 235.)

Servo motor 704 may be of any known type able to operate with nominally constant torque constant over its operating range. For instance, servo motor 704 is depicted in FIG. 45 as a brushless d.c. motor such as described in U.S. Pat. Nos. 4,733,118 and 4,937,485 entitled LOW DAMPING TORQUE BRUSHLESS D.C. MOTOR and COIL/MAGNET STRUCTURE FOR A BRUSHLESS D.C. MOTOR, respectively, by Emil S. Mihalko and issued Mar. 22, 1988 and Jan. 26, 1990, respectively.

Structurally, integration of servo motor 704 and positive displacement pump 706 is accomplished by utilizing a common central housing 708 in place of individual front housings for each. However, before assembly of servo motor-positive displacement pump assembly 700 begins, quill shaft 710 is fixedly attached to main pump shaft 712 to form pump-quill shaft 714. This is usually done in butt welded fashion along their common axes as by a process known as friction welding. Suitable equipment for effecting this welding process is available from NEI Thompson Welding Systems of Ettingshall, Wolverhampton, West Midlands, United Kingdom and sold in this country by NEI Thompson Welding Systems, Inc. of Novi, Mich. Quill shaft 710 is configured of suitable diameter and length such that it will provide adequate drive for positive displacement pump 706 and, at the same time, accommodate such axial and angular misalignments as may occur main pump shaft 712 and shaft 734 of servo motor 704 during assembly or operation of servo motor-positive displacement pump assembly 700.

In assembling servo motor-positive displacement pump assembly 700, two of bearings 716, seal 720 and bearing 717 are installed in central housing 708, and two other of bearings 716 are installed in rear pump housing 718. Then pump gears 722a and 722b are installed upon pump-quill shaft 714 and counter shaft 724, respectively, and fixedly linked for rotation therewith by keys 726. They are retained axially thereon by retaining rings 728. Next, pump-quill shaft 714 and counter shaft 724 are installed in central housing 708 and pump rear housing is installed thereon and retained by alignment pins and bolts 725 in a standard manner. Then rotor sub-assembly 730 of servo motor 704 is installed in central housing 708 with bore 732 formed in shaft 734 surrounding quill shaft 710. Quill shaft 710 is fixedly retained within reduced diametral portion 736 of bore 732 by pin 738 for rotation with rotor assembly 730. Concomitantly, rotor assembly 730 is axially positioned with reference to pump gear 722a by pin 738, pump-quill shaft 714 and retaining rings 728. Finally, stator sub-assembly 740 comprising stator housing 742, and servo motor rear housing 744 (comprising another bearing 717) are sequentially installed upon central housing 708 and retained in a standard manner by bolts 746.

Servo motor-positive displacement pump assembly 700 is, of course, ideal for powering bootstrap EHPS systems such as described herein. However, its use is not necessarily so restricted. In fact, its broader usage includes other types of EHPS systems as well as electric motor powered power steering systems not comprising variable output control.

Although the various features of the invention have been described above with reference to selected combinations, it will be appreciated that these combinations are exemplary in nature and, the combinations presented are not intended to limit the scope of the present invention. For instance, the following somewhat convoluted form of the improved pressure dividing network 132 described below could be utilized for the generation of pilot flow for utilizing pump output regulating sub-assembly 190, or alternately, variable displacement pump 232: In this case, the lower pressure one of first and second output pressures would be required whereby small metering slots would be formed in flow control edges of a closed-center control valve's input slots, a three-way valve used to pick off the lower valued one of the first and second output port pressures, and a pilot orifice would return pilot flow to a reservoir. Or, a convoluted form of control valve 480 could be used wherein input slots would be configured in a closed-center manner, return slots configured in an open-center manner, a high speed circuit would comprise bypass slots operating with reference to settings of a high speed return selector valve selectively conveying bypassed fluid to a return line via high speed slots, ports, groove and passages, and first and second check valves 148a and 148b, respectively, utilized. Or, a convoluted form of control valve 622 could be used wherein either electronically variable orifice sub-assembly 482 selectively enables high speed input ports 650 instead of supplemental intermediate return ports 682a and 682b, or flow patterns through control valve 622 could be reversed and ΔP appear as differential pressure between pump supply pressure and supplemental supply ports instead of between the supplemental intermediate return ports 682a and 682b, and reservoir pressure. (In the latter case the resulting HMPS would be configured with reference to either of the preferred or first alternate preferred embodiments).

Figure 46:
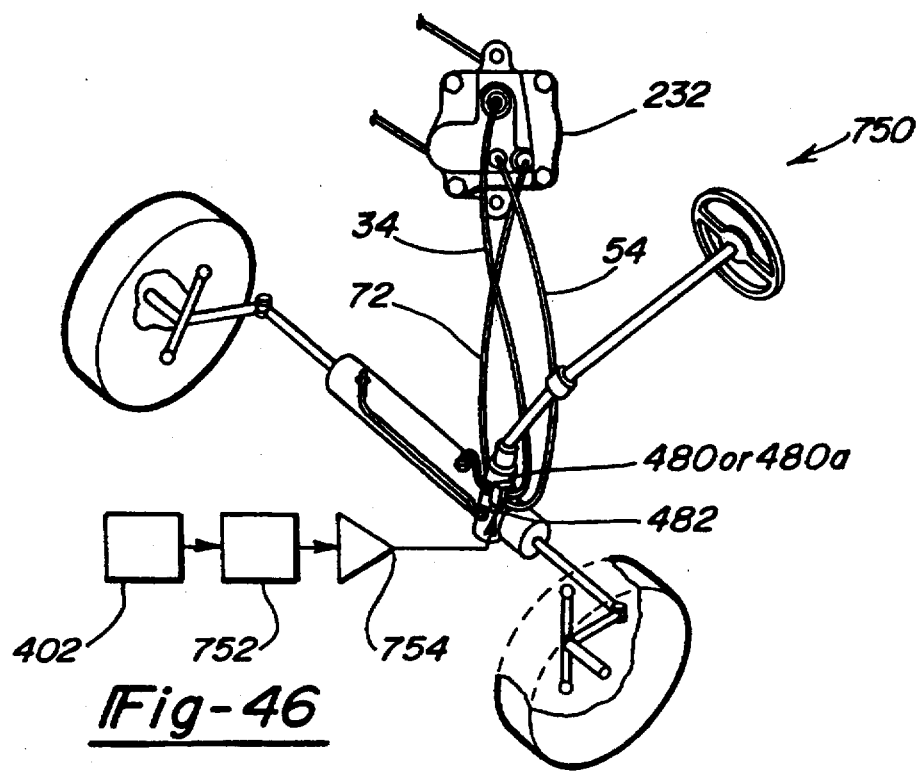
FIG. 46 is a schematic drawing of a seventeenth alternative preferred embodiment of the invention showing a bootstrap HMPS system comprising the variable displacement pump shown in FIG. 10A and the control valve shown in FIG. 27A.

Various bootstrap power steering systems can easily by configured. For instance, bootstrap HMPS system 230 shown in FIG. 9 and comprising a variable displacement pump 232 can effectively be transformed into a speed sensitive bootstrap power steering system 750 by substituting either of control valves 480 or 480a for control valve 181 as shown in a seventeenth alternative preferred embodiment of the invention depicted in FIG. 46. In speed sensitive bootstrap power steering system 750 vehicular speed transducer 402 issues a velocity signal to command signal generator 752. Command signal generator 752 issues a command signal whose value is a selected function of the velocity signal. The command signal is amplified by power amplifier 754 and applied to electronically variable orifice sub-assembly 482 in suitably amplified form according to a selected speed sensitive displacement profile.

Figure 47:
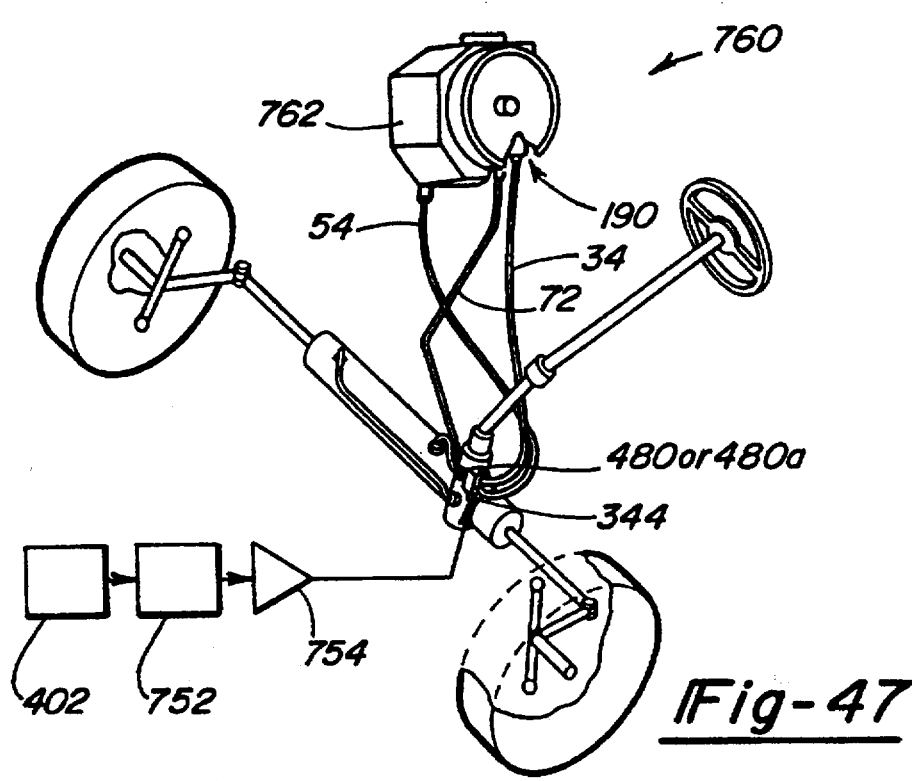
FIG. 47 is a schematic drawing of an eighteenth alternative preferred embodiment of the invention showing a bootstrap HMPS system comprising the pump output regulating sub-assembly shown in FIG. 7A and the control valve shown in FIG. 27A.

Alternately, a speed sensitive bootstrap power steering system 760 comprising an otherwise standard fixed displacement pump 762 modified to include pump output regulating sub-assembly 190 could be implemented as shown in a eighteenth alternative preferred embodiment of the invention depicted in FIG. 47. In this case fixed displacement pump 762 is substituted for variable displacement pump 232 but speed sensitive bootstrap power steering system 760 is otherwise identical to speed sensitive bootstrap power steering system 750.

Figure 48:
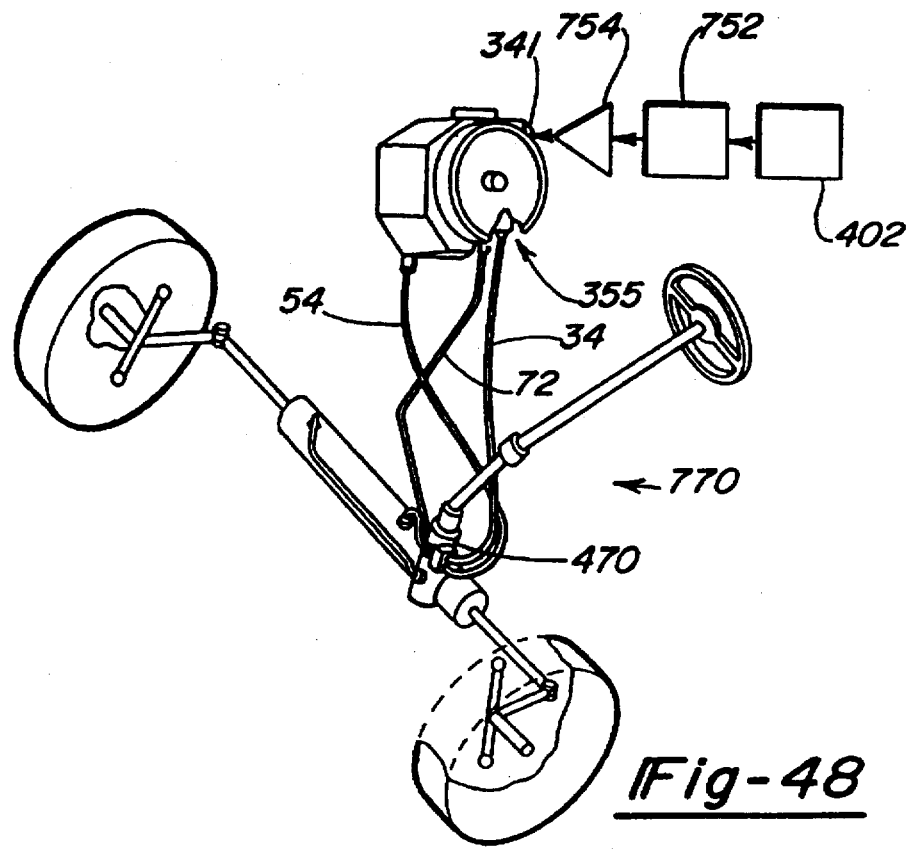
FIG. 48 is a schematic drawing of a nineteenth alternative preferred embodiment of the invention showing a bootstrap HMPS system comprising the pump output regulating sub-assembly shown in FIG. 12 and the control valve shown in FIG. 26.

In another variation, a speed sensitive bootstrap power steering system 770 comprising an otherwise standard fixed displacement pump 772 modified to include pump output regulating sub-assembly 355 and control valve 470 could be implemented as shown in a nineteenth alternative preferred embodiment of the invention depicted in FIG. 48. In this case speed sensitive control is implemented via electronically variable orifice sub-assembly 341 of pump output regulating sub-assembly 355. As before, vehicular speed transducer 402 issues a velocity signal to command signal generator 752, command signal generator 752 issues a command signal to power amplifier 754, and power amplifier 754 applies a suitably amplified power signal to electronically variable orifice sub-assembly 341.

Figure 49:
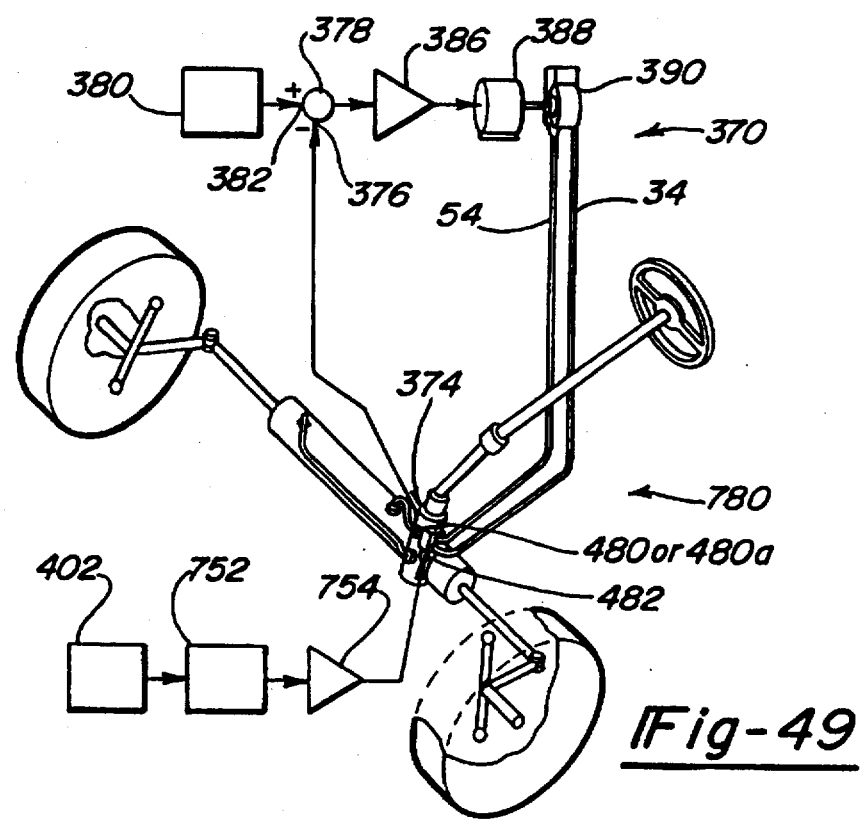
FIG. 49 is a schematic drawing of a twentieth alternative preferred embodiment of the invention showing a bootstrap EHPS system comprising the servo motor powered bootstrap hydraulic system shown in FIG. 14 and the control valve shown in FIG. 27A.

Efficient electric motor powered speed sensitive bootstrap hydraulic systems can also be implemented. A first electric motor powered speed sensitive bootstrap power steering system 780 comprises either of control valves 480 or 480a working in conjunction with servo motor powered bootstrap hydraulic system 370 as shown in an twentieth alternative preferred embodiment of the invention depicted in FIG. 49. As in servo motor powered bootstrap hydraulic system 370, command signal generator 380 issues a command signal to positive input terminal 382 of summing point 378. A control signal is issued to negative input terminal 376 thereof by pressure transducer 374. Summing point 378 issues an error signal to power amplifier 386 which provides a power signal to drive servo motor 388. Servo motor 388 drives positive displacement pump 390 which provides an appropriate flow of fluid to control valve 480 or 480a via pump delivery line 34. Concomitantly, vehicular speed transducer 402 issues a velocity signal to command signal generator 752, command signal generator 752 issues a command signal to power amplifier 754, and power amplifier 754 applies a suitably amplified command signal to electronically variable orifice sub-assembly 482 of control valve 480 or 480a.

Figure 50:
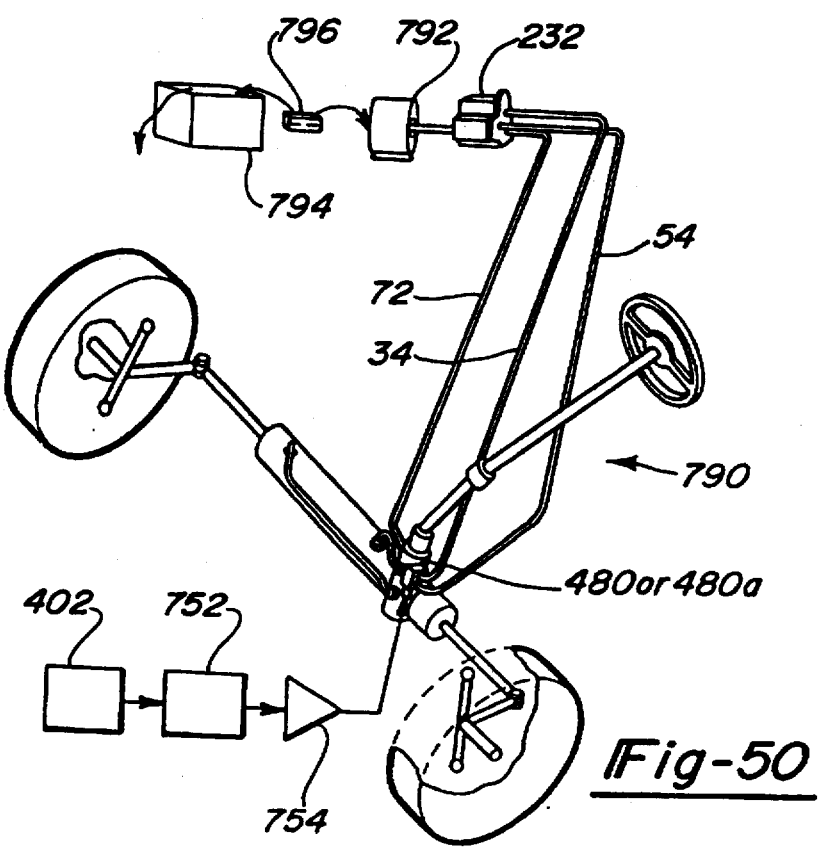
FIG. 50 is a schematic drawing of a twenty-first alternative preferred embodiment of the invention showing a bootstrap EHPS system comprising the variable displacement pump shown in FIG. 10A and the control valve shown in FIG. 27A.

A second electric motor powered speed sensitive bootstrap power steering system 790 comprises either of control valves 480 or 480a working in conjunction with variable displacement pump 232 driven by an electric motor 792 operated at constant speed as shown in an twenty-first alternative preferred embodiment of the invention depicted in FIG. 50. In electric motor powered speed sensitive bootstrap power steering system 790, operation of electric motor 792 is enabled by battery 794 and contactor 796. Using electric motor 792 operated at constant speed in conjunction with variable displacement pump 232 (instead of servo driven electric motor 388 driving positive displacement pump 390) to implement an efficient electrically driven pumping system is a viable approach because of its relative systemic simplicity.

Figure 51:
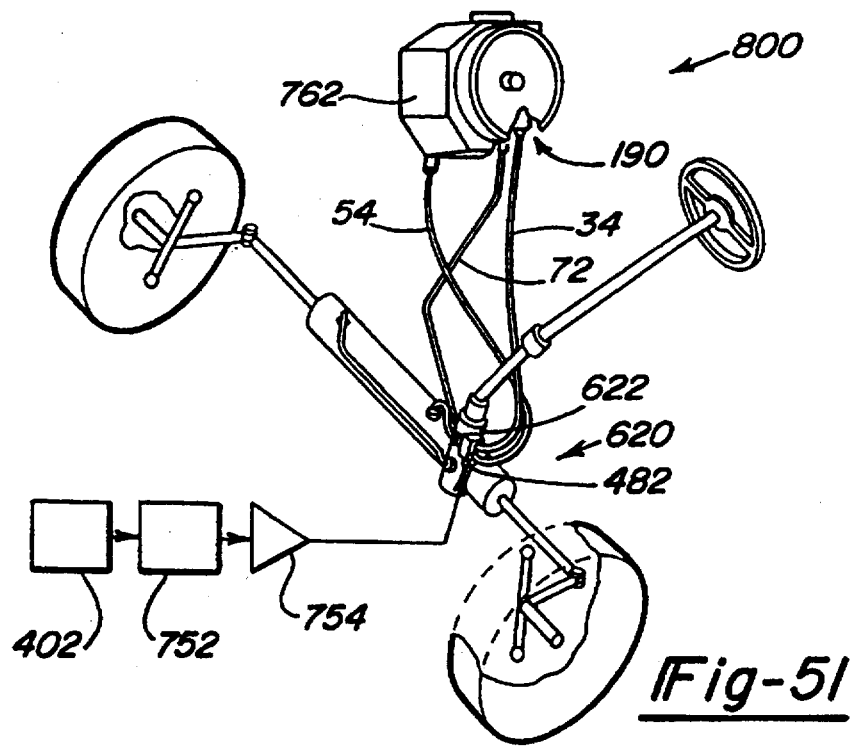
FIG. 51 is a schematic drawing of a twenty-second alternative preferred embodiment of the invention showing a bootstrap HMPS system comprising the variable displacement pump shown in FIG. 10A and the control valve shown in FIG. 38A.

In another variation, a speed sensitive bootstrap HMPS system 800 comprising bootstrap hydraulic system 620 can be implemented as shown in a twenty-second alternative preferred embodiment depicted in FIG. 51. Bootstrap HMPS system 800 is functionally similar to bootstrap power steering system 750 and includes many of the components thereof. As such, like reference numerals are used in FIGS. 46 and 51 to identify like components. In this case control valve 622 has been substituted for either of control valves 480 or 480a used in bootstrap power steering system 750 and the other portions of the systems function in an identical manner.

Figure 52:
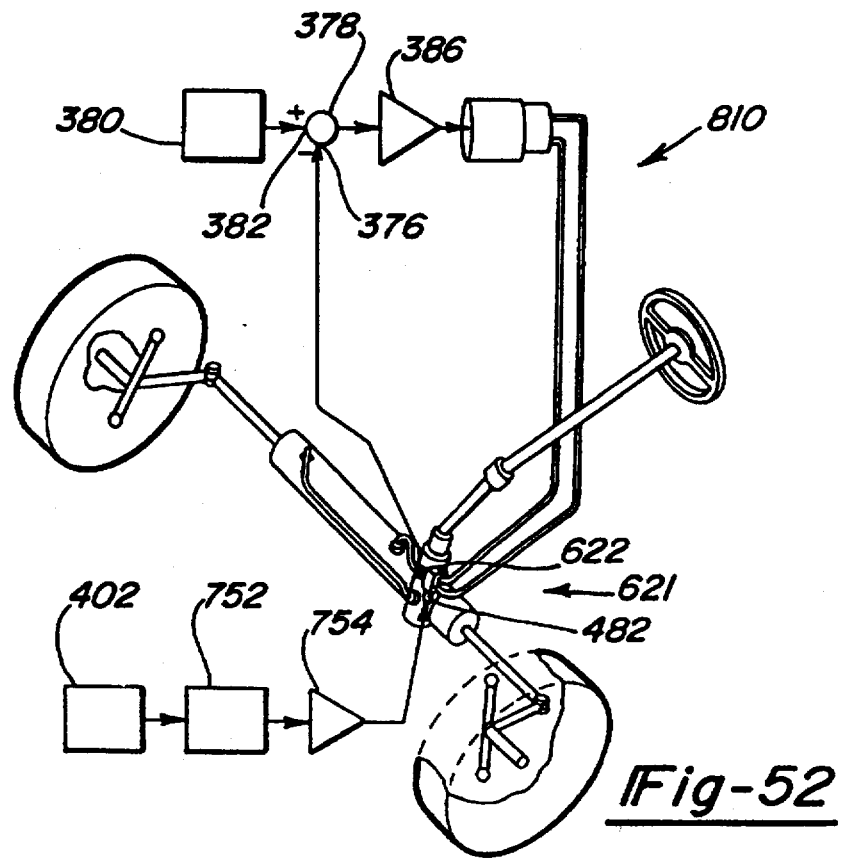
FIG. 52 is a schematic drawing of a twenty-third alternative preferred embodiment of the invention showing a bootstrap EHPS system comprising the servo motor powered bootstrap hydraulic system shown in FIG. 14 and the control valve shown in FIG. 38B.
Figure 1A:
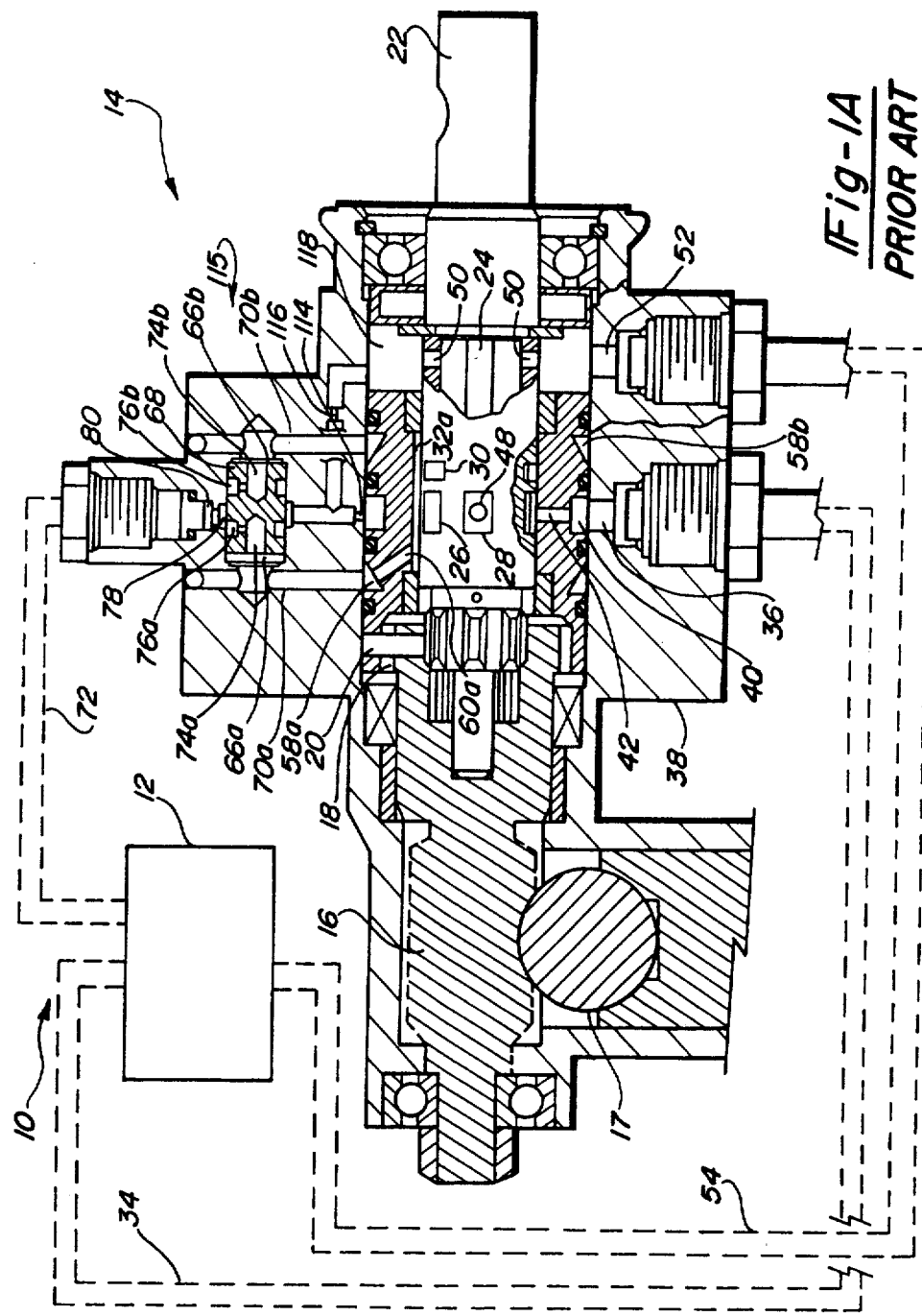
Figure 1B:
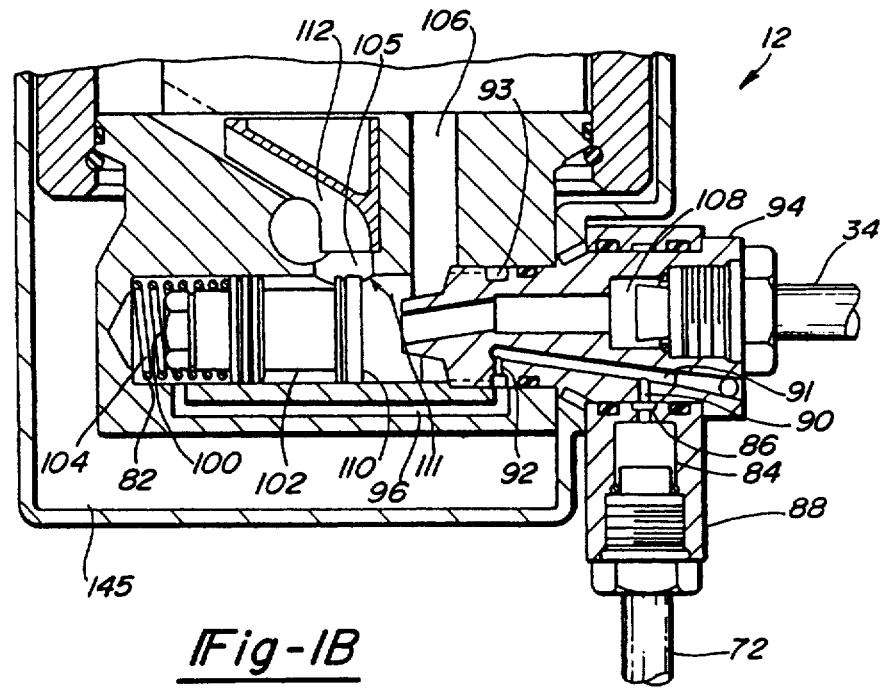
Figure 1C:
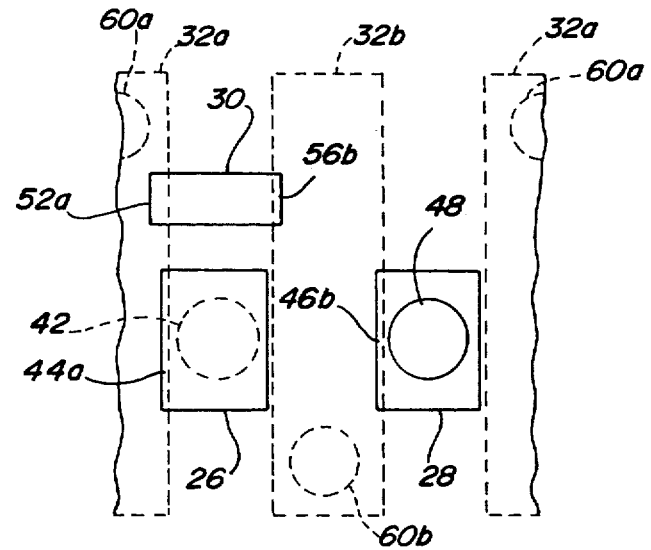

Similarly, a bootstrap EHPS system 810 comprising electric motor powered bootstrap hydraulic system 621 can be implemented as shown in a twenty-third alternative preferred embodiment depicted in FIG. 52. Bootstrap EHPS system 810 is functionally similar to electric motor powered bootstrap power steering system 780 and includes many of the components thereof. As such, like reference numerals are used in FIGS. 49 and 52 to identify like components. Control valve 622 has been substituted for either of control valves 480 or 480a and servo motor-positive displacement pump assembly 700 has been utilized as well. The other portions of the systems function in an identical manner as used above in bootstrap power steering system 780. As mentioned above, improved efficiency is becoming extremely important for electrohydraulic power steering systems to be used in electric cars. In the prior art, it is known to provide volumetric flow rates in an EHPS as a function of applied torque. However, because torque transducers are expensive and difficult to implement in conjunction with steering systems, other EHPS systems of the prior art utilize pumped fluid supplied at volumetric flow rates determined as selected functions of either steering wheel rotational velocity or system pressure. In either case, it has been respectively found that control is very difficult to establish during any given steering wheel maneuver because of the discontinuous nature of the steering wheel rotational velocity or because system pressure suffers considerable regulation as a function of differential load flow. As further mentioned above, bootstrap hydraulic systems are desirable for application in EHPS systems because system flow rates are inherently proportional to applied torque. Thus, utilizing a bootstrap EHPS system such as bootstrap EHPS system 810 (as well as electric motor powered bootstrap power steering systems 780 and 790) comprises a method of providing an EHPS system having the relative simplicity of an EHPS system controlled as a function of pressure combined with the functional performance of an EHPS system controlled as a function of applied torque.

Although each of the seventeenth, eighteenth, nineteenth, twentieth, twenty-first twenty-second and twenty-third alternative preferred embodiments of the invention described above feature speed sensitivity, they could also be implemented as non-speed sensitive systems. In fact, a wide range of other convolutions of the teachings herein is possible and the specific combinations described above should, in a sense, be considered as merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

I claim:

1. A power steering system for a vehicle, said system having at least one power cylinder, said system comprising:

a rotary control valve having a first member rotatable with respect to a second member from a centered position to non-centered position, said first and second members formed to define at least one pair of input orifices, at least one pair of output orifices, at least one return orifice and a chamber interconnecting said at least one pair of output orifices and at least one return orifice, said input orifices and said output orifices being open when valve is in said centered position, said at least one return orifice being progressivelyu opened as said rotary control valve is moved from said centered position to said non-centered position, thus enabling an increasing flow of hydraulic fluid through at least one of said at least one pair of input orifices, at least one of said at least one pair of output orifices and said chamber, and out of said opening return orifice;

a pump having a reservoir, said pump producing a variable pressurized flow of hydraulic fluid having an output pressure, said flow being delivered to said at least one pair of input orifices and being returned to said reservoir from said at least one return orifice, said pump having means for regulating said output pressure, said means for regulating being responsive to a control pressure; and means for selecting a pressure value from said chamber and delivering said pressure value as said control pressure to said means for regulating whereby said output pressure of said pump is varied response to a change in said control pressure.

2. The power steering system of claim 1, wherein said means for selecting a pressure value selecting said pressure value from an output pressure from one of said pair of said output orifices.

3. The power steering system of claim 1, wherein said means for regulating said pressure comprises a valve spool having a control end and an opposite end biased by a spring, said pump having means to deliver said control pressure to said control end of said valve spool.

4. The power steering system of claim 1, wherein said means for selecting includes three-way valve in fluid communication with said pair of output orifices.

5. The power steering system of claim 1, wherein said pump comprises a variable displacement pump having means for varying a displacement of said pump in response to a change in said control pressure.

6. The power steering system of claim 1, wherein said means for selecting the control pressure comprises a pressure transducer, said pressure transducer providing a signal proportional to a pressure in one of said output orifices; said pump being driven by an electric motor and having means for varying output pressure of said pump in response to changes in said signal.

* * * * *

UNITED STATES PATENT AND TRADEMARK OFFICE
CERTIFICATE OF CORRECTION

PATENT NO. : 5,682,745
DATED : Nov. 4, 1997
INVENTOR(S) : Edward H. Phillips

It is certified that error appears in the above-indentified patent and that said Letters Patent is hereby corrected as shown below:

Delete Drawing Sheets 1 & 2 and substitute therefor new Drawings consisting of Figs. 1A, 1B and 1C.

In Fig. 1C the reference numerals 56b has been changed to 48; and 52b has been changed to 56b.

The words Prior Art has been added underneath Figs. 1A, 1B and 1C.

Signed and Sealed this

Tenth Day of March, 1998

*Attest:*

BRUCE LEHMAN

*Attesting Officer*         Commissioner of Patents and Trademarks